United States Patent
Talebi Fard et al.

(10) Patent No.: US 11,785,668 B2
(45) Date of Patent: *Oct. 10, 2023

(54) GROUP COMMUNICATION SIGNALING OVERLOAD MITIGATION

(71) Applicant: Ofinno, LLC, Reston, VA (US)

(72) Inventors: Peyman Talebi Fard, Vienna, VA (US); Esmael Hejazi Dinan, McLean, VA (US); Jinsook Ryu, Oakton, VA (US); Kyungmin Park, Vienna, VA (US); Weihua Qiao, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/714,386

(22) Filed: Apr. 6, 2022

(65) Prior Publication Data

US 2022/0232671 A1 Jul. 21, 2022

Related U.S. Application Data

(63) Continuation of application No. 16/865,565, filed on May 4, 2020, now Pat. No. 11,330,667.

(Continued)

(51) Int. Cl.
*H04W 80/10* (2009.01)
*H04W 80/02* (2009.01)
(Continued)

(52) U.S. Cl.
CPC ............ *H04W 80/10* (2013.01); *H04W 4/08* (2013.01); *H04W 28/22* (2013.01); *H04W 80/02* (2013.01)

(58) Field of Classification Search
None
See application file for complete search history.

(56) References Cited

U.S. PATENT DOCUMENTS 9,693,205 B2   6/2017   Vaidya et al.
11,330,667 B2 *  5/2022   Talebi Fard .......... H04W 28/22
(Continued)

FOREIGN PATENT DOCUMENTS

CN          110121155 A          8/2019

OTHER PUBLICATIONS

3GPP TR 23.734 V16.1.0 (Mar. 2019); Technical Report; 3rd Generation Partnership Project; Technical Specification Group Services and System Aspects; Study on enhancement of 5G System (5GS) for vertical and Local Area Network (LAN) services; (Release 16).

(Continued)

*Primary Examiner* — Diane L Lo
(74) *Attorney, Agent, or Firm* — Sachin Kandhari; Kavon Nasabzadeh; Philip R. Smith

(57) ABSTRACT

A session management function (SMF) sends, to a user plane function (UPF), a session configuration message comprising a packet detection rule (PDR) for a group communication session. The PDR comprises a multicast address mapped to a plurality of wireless devices associated with the group communication session, and a forwarding rule associated with the multicast address. The SMF receives, from the UPF, a data notification indicating multicast data arrival for the plurality of wireless devices associated with the multicast address. The SMF sends, to the UPF, a session modification request indicating downlink tunnel information for transmission of the multicast data by the UPF.

20 Claims, 33 Drawing Sheets

Related U.S. Application Data

(60) Provisional application No. 62/843,132, filed on May 3, 2019.

(51) Int. Cl.
 *H04W 28/22* (2009.01)
 *H04W 4/08* (2009.01)

(56) References Cited

U.S. PATENT DOCUMENTS

| | | | |
|---|---|---|---|
| 2017/0142560 | A1 | 5/2017 | Ryu et al. |
| 2018/0352416 | A1 | 12/2018 | Ryu et al. |
| 2019/0158408 | A1 | 5/2019 | Li et al. |
| 2019/0191467 | A1 | 6/2019 | Dao et al. |
| 2021/0076166 | A1 | 3/2021 | Navratil et al. |
| 2021/0092641 | A1 | 3/2021 | Yang et al. |

OTHER PUBLICATIONS

3GPP TS 29.244 V15.5.0 (Mar. 2019); Technical Specification; 3rd Generation Partnership Project; Technical Specification Group Core Network and Terminals; Interface between the Control Plane and the User Plane Nodes; Stage 3; (Release 15).
S2-1900597; 3GPP TSG-SA WG2 Meeting #130; Jan. 21-25, 2019, Kochi, India; CR-Form-v11.2; Change Request; 23.502 CR 0965; rev—; Current version: 15.4.1.
S2-1901359; 3GPP TSG-SA WG2 Meeting #130; Jan. 21-25, 2019, Kochi, India; CR-Form-v11.2.1; Change Request; 23.502 CR 0987; rev 2; Current version: 15.4.1.
S2-1901554; SA WG2 Meeting #131; Feb. 25-Mar. 1, 2019, Santa Cruz-Tenerife, Spain; CR-Form-v11.4; Change Request; 23.502 CR 1018; rev; Current version: 15.4.1.
S2-1902005; 3GPP TSG-SA WG2 Meeting #131; Feb. 25-Mar. 1, 2019, Santa Cruz, Tenerife, ES; CR-Form-v11.2.1; Change Request; 23.501 CR 1000; rev—; Current version: 15.4.0.
S2-1902006; 3GPP TSG-SA WG2 Meeting #131; Feb. 25-Mar. 1, 2019, Santa Cruz, Tenerife, ES; CR-Form-v11.2.1; Change Request; 23.502 CR 1096; rev—; Current version: 15.4.1.
S2-1902007; (revision of S2-1901337, 01208); 3GPP TSG-SA WG2 Meeting #131; Santa Cruz, Spain, Feb. 25-Mar. 1, 2019; CR-Form-v11.4; Change Request; 23.501 CR 0747; rev 6; Current version: 15.4.0.
S2-1903220; 3GPP TSG-SA WG2 Meeting #132; Apr. 8-12, 2019, Xi'an, China; CR-Form-v11.4; Change Request; 23.502 CR 1159; rev; Current version: 16.0.0.
S2-1903221; 3GPP TSG-SA WG2 Meeting #132; Apr. 8-12, 2019, Xi'an, China; CR-Form-v11.4; Change Request; 23.501 CR 1077; rev; Current version: 16.0.2.
S2-1903312; (revision of S2-1903312); SA WG2 Meeting #132; Feb. 8-12, 2019, Xian, P.R. China ; Source: Nokia, Nokia Shanghai Bell; Title: 5G LAN group communication with UPF autonomous traffic forwarding; Document for: Discussion.
S2-1903623; 3GPP TSG-SA WG2 Meeting #132; Apr. 8-12, 2019, Xi'an, China; CR-Form-v11.4; Change Request; 23.501 CR 1202; rev; Current version: 16.0.2.
S2-19xxxxx; 3GPP TSG-SA WG2 Meeting #132; Apr. 8-12, 2019, Xi'an, China; CR-Form-v11.4; Change Request; 23.501; CR xxx; rev; Current version: 16.0.2.
S2-1903723; 3GPP TSG-SA WG2 Meeting #132; Apr. 8-12, 2019, Xian, P.R.China; Source: Huawei, HiSilicon; Title: IPTV solution update; Document for: Approval; Agenda Item: 6.7; Work Item / Release: 5WWC.
S2-1903854; 3GPP TSG-SA2 Meeting #132; Xi'An, China, Apr. 8-Apr. 12; CR-Form-v11.4; Change Request; 23.501 CR 1267; rev—; Current version: 16.0.0.
S2-1903856; 3GPP TSG-SA WG2 Meeting #132; Xi'an, China, Apr. 8-Apr. 12, 2019; CR-Form-v11.4; Change Request; 23.501 CR 1268; rev—; Current version: 16.0.0.
S2-1903858; 3GPP TSG-SA WG2 Meeting #131; Xi'an, China, Apr. 8-Apr. 12, 2019; CR-Form-v11.4; Change Request; 23.501 CR 1269; rev—; Current version: 16.0.0.
S2-1903859; 3GPP TSG-SA WG2 Meeting #131; Xi'an, China, Apr. 8-Apr. 12, 2019; CR-Form-v11.4; Change Request; 23.501 CR 1270; rev—; Current version: 16.0.0.
S2-1904604; (was S2-1903634); 3GPP TSG-SA WG2 Meeting #132; Apr. 8-12, 2019, Xi'an, China; CR-Form-v11.4; Change Request; 23.501; CR 1207; rev 1; Current version: 16.0.2.
S2-1904607; 3GPP TSG-SA2 Meeting #132; Xi'An, China, Apr. 8-Apr. 12; CR-Form-v11.4; Change Request; 23.501 CR 1267; rev 1; Current version: 16.0.0.
S2-1904615; (revision of S2-194615); 3GPP TSG-SA WG2 Meeting #131; Xi'an, China, Apr. 8-Apr. 12, 2019; CR-Form-v11.4; Change Request; 23.501 CR 1269; rev 1; Current version: 16.0.0.
S2-1904775; (revision of S2-1904602); 3GPP TSG-SA WG2 Meeting #132; Xi'an, China, Apr. 8-12, 2019; CR-Form-V11.4; Change Request; 23.501 CR 1052; rev 2; Current version: 16.0.0.
S2-1904776; (was S2-1904601); 3GPP TSG-SA WG2 Meeting #132; Apr. 8-12, 2019, Xi'an, China; CR-Form-v11.4; Change Request; 23.501 CR 1202; rev 2; Current version: 16.0.2.
S2-1911590; 3GPP TSG-WG SA2 Meeting #136; Reno, NV, USA, Nov. 18-22, 2019; CR-Form-v12.0; Change Request; 23.501 CR 1711; rev 1; Current version: 16.2.0.
S2-1904777; (was S2-1904604); 3GPP TSG-SA WG2 Meeting #132; Apr. 8-12, 2019, Xi'an, China; CR-Form-v11.4; Change Request; 23.501; CR 1207; rev 2; Current version: 16.0.2.
S2-1904785; (was S2-1904604); 3GPP TSG-SA WG2 Meeting #132; Apr. 8-12, 2019, Xi'an, China; CR-Form-v11.4; Change Request; 23.501 CR 1207; rev 3; Current version: 16.0.2.

\* cited by examiner

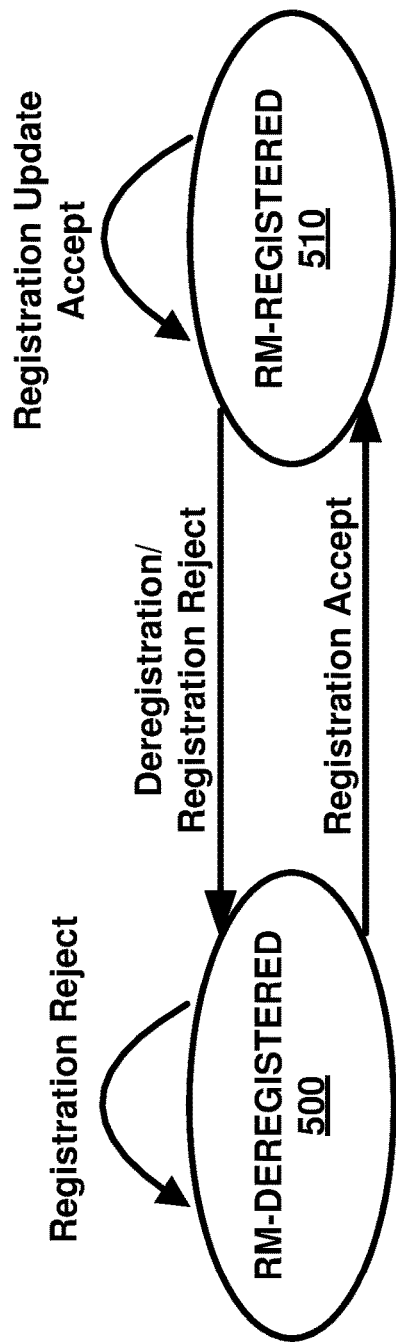
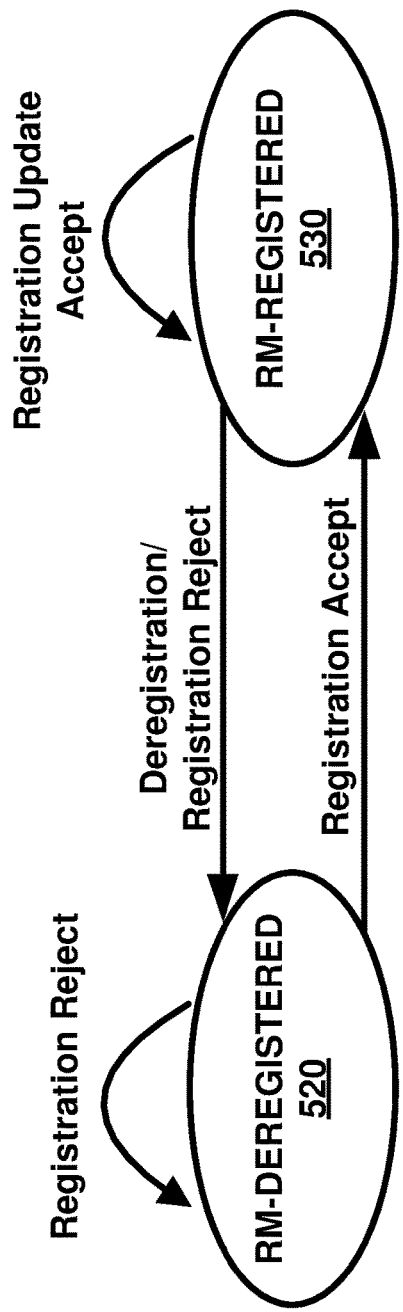
FIG. 5A
FIG. 5B

Receive, by a UPF from a SMF, a session configuration message comprising a packet detection rule (PDR) for a group communication session, where the PDR comprises: a multicast address mapped to a plurality of wireless devices associated with the group communication session; and a forwarding rule for packets associated with the multicast address
3310

Receive, by a UPF, data packets comprising the multicast address
3320

Send, by the UPF based on the PDR, the data packets to the plurality of wireless devices
3330

FIG. 33

GROUP COMMUNICATION SIGNALING OVERLOAD MITIGATION

CROSS-REFERENCE TO RELATED APPLICATIONS

This application is a continuation of U.S. patent application Ser. No. 16/865,565, filed May 4, 2020, which claims the benefit of U.S. Provisional Application No. 62/843,132, filed May 3, 2019, all of which are hereby incorporated by reference in their entirety.

BRIEF DESCRIPTION OF THE SEVERAL VIEWS OF THE DRAWINGS

Examples of several of the various embodiments of the present invention are described herein with reference to the drawings.

FIG. 5A and FIG. 5B depict two registration management state models in UE 100 and AMF 155 as per an aspect of embodiments of the present disclosure.

FIG. 33 is a flow diagram of an aspect of an example embodiment of the present disclosure.

DETAILED DESCRIPTION OF EMBODIMENTS

Example embodiments of the present invention enable implementation of enhanced features and functionalities in 5G systems. Embodiments of the technology disclosed herein may be employed in the technical field of 5G systems and network slicing for communication systems. More particularly, the embodiments of the technology disclosed herein may relate to 5G core network and 5G systems for network slicing in communication systems. Throughout the present disclosure, UE, wireless device, and mobile device are used interchangeably.

The following acronyms are used throughout the present disclosure:

| | |
|---|---|
| 5G | 5th generation mobile networks |
| 5GC | 5G Core Network |
| 5GS | 5G System |
| 5G-AN | 5G Access Network |
| 5QI | 5G QoS Indicator |
| AF | Application Function |
| AMF | Access and Mobility Management Function |
| AN | Access Network |
| CDR | Charging Data Record |
| CCNF | Common Control Network Functions |
| CIoT | Cellular IoT |
| CN | Core Network |
| CP | Control Plane |
| DDN | Downlink Data Notification |
| DL | Downlink |
| DN | Data Network |
| DNN | Data Network Name |
| F-TEID | Fully Qualified TEID |
| GPSI | Generic Public Subscription Identifier |
| GTP | GPRS Tunneling Protocol |
| GUTI | Globally Unique Temporary Identifier |
| IMSI | International Mobile Subscriber Identity |
| LADN | Local Area Data Network |
| LI | Lawful Intercept |
| MEI | Mobile Equipment Identifier |
| MICO | Mobile Initiated Connection Only |
| MME | Mobility Management Entity |
| MO | Mobile Originated |
| MSISDN | Mobile Subscriber ISDN |
| MT | Mobile Terminating |
| N3IWF | Non-3GPP InterWorking Function |
| NAI | Network Access Identifier |
| NAS | Non-Access Stratum |
| NB-IoT | Narrow Band IoT |
| NEF | Network Exposure Function |
| NF | Network Function |

| | |
|---|---|
| NGAP | Next Generation Application Protocol |
| NR | New Radio |
| NRF | Network Repository Function |
| NSI | Network Slice Instance |
| NSSAI | Network Slice Selection Assistance Information |
| NSSF | Network Slice Selection Function |
| OCS | Online Charging System |
| OFCS | Offline Charging System |
| PCF | Policy Control Function |
| PDU | Packet/Protocol Data Unit |
| PEI | Permanent Equipment Identifier |
| PLMN | Public Land Mobile Network |
| RAN | Radio Access Network |
| QFI | QoS Flow Identity |
| RM | Registration Management |
| S1-AP | S1 Application Protocol |
| SBA | Service Based Architecture |
| SEA | Security Anchor Function |
| SCM | Security Context Management |
| SMF | Session Management Function |
| SMSF | SMS Function |
| S-NSSAI | Single Network Slice Selection Assistance information |
| SUCI | Served User Correlation ID |
| SUPI | Subscriber Permanent Identifier |
| TEID | Tunnel Endpoint Identifier |
| TSN | Time Sensitive Networking |
| UE | User Equipment |
| UL | Uplink |
| UL CL | Uplink Classifier |
| UPF | User Plane Function |

Figure 1:
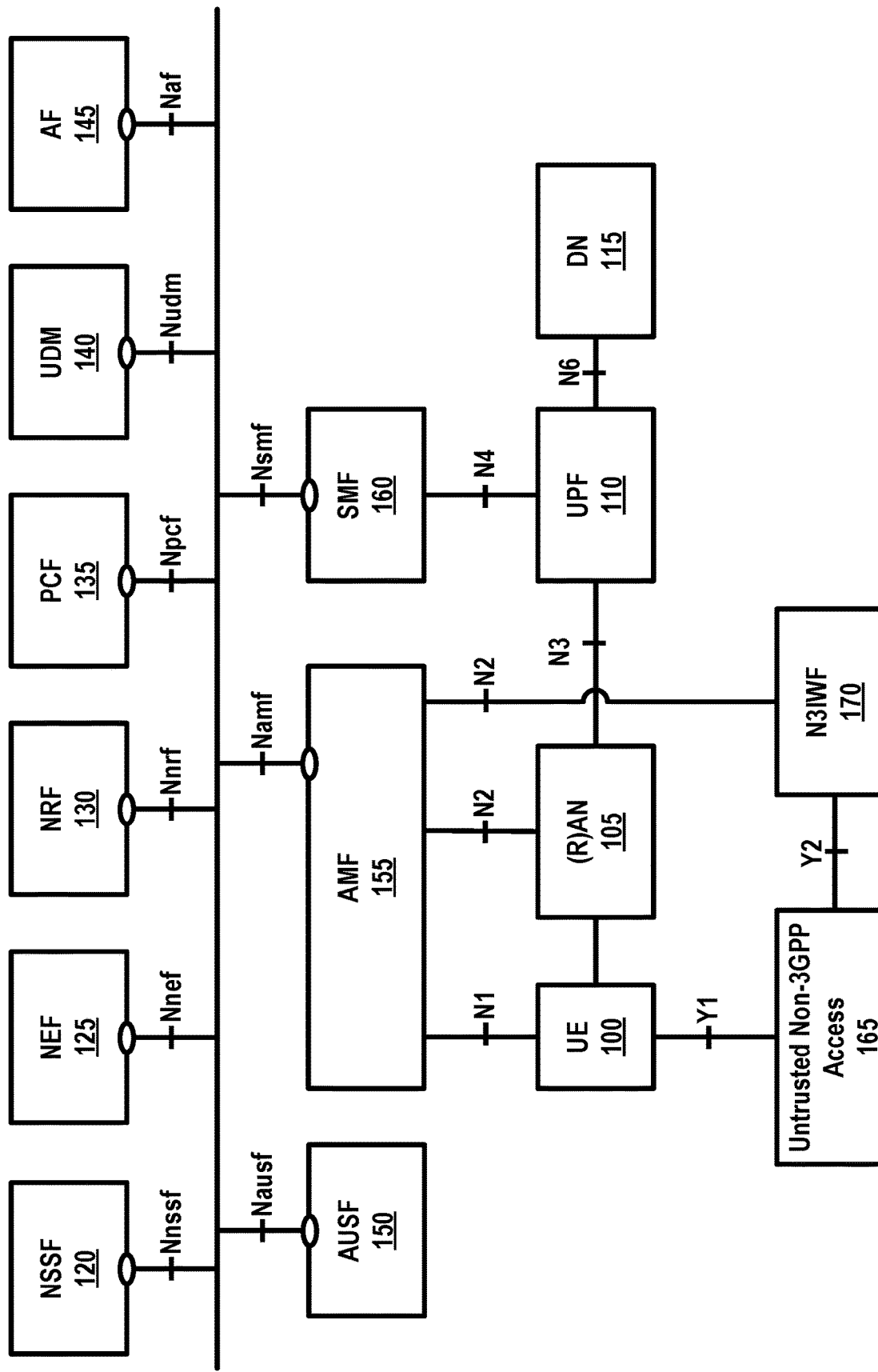
FIG. 1 is a diagram of an example 5G system architecture as per an aspect of an embodiment of the present disclosure.
Figure 2:
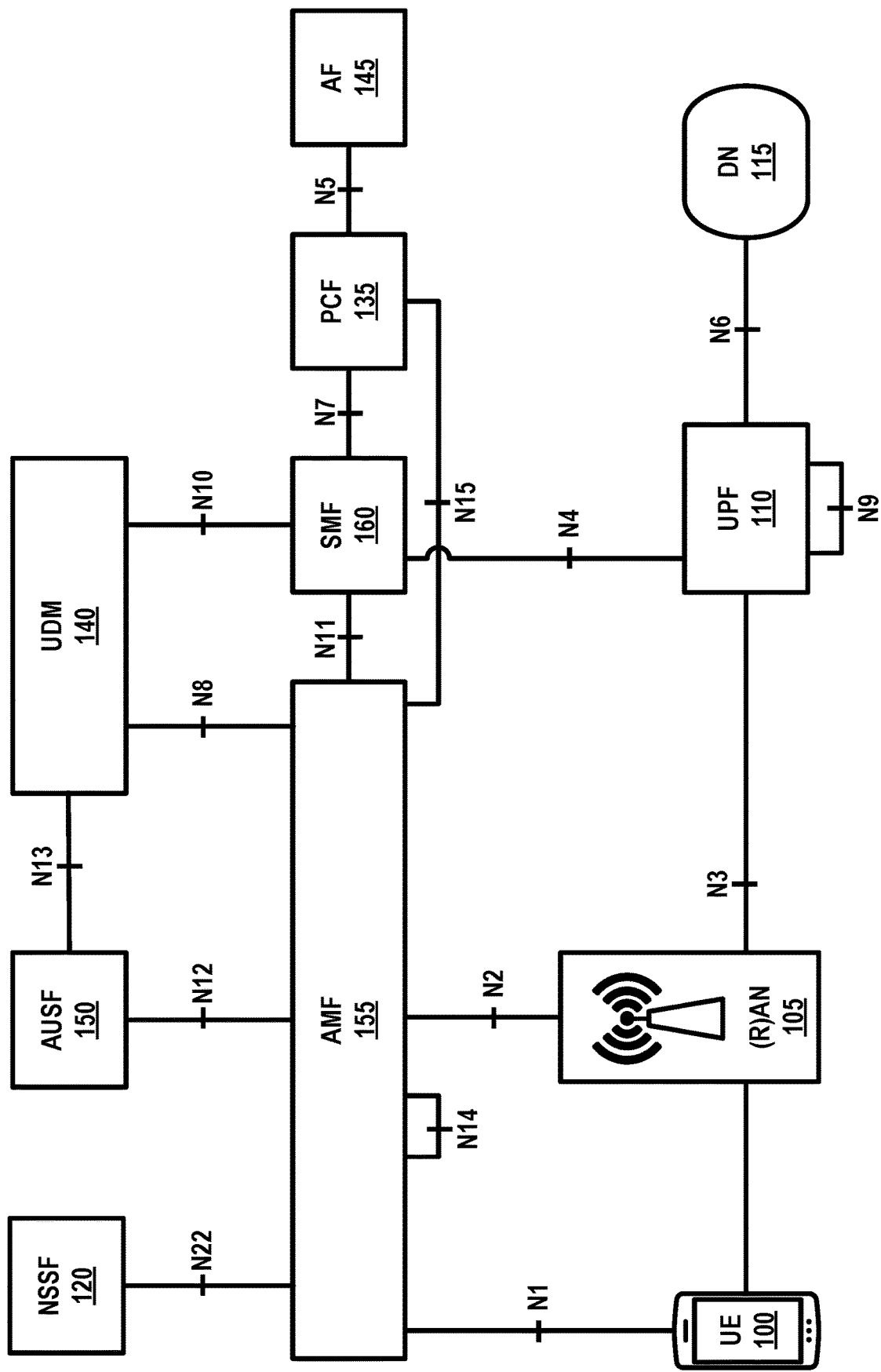
FIG. 2 is a diagram of an example 5G System architecture as per an aspect of an embodiment of the present disclosure.

Example FIG. 1 and FIG. 2 depict a 5G system comprising of access networks and 5G core network. An example 5G access network may comprise an access network connecting to a 5G core network. An access network may comprise an NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces may be employed for communication among the functional elements and/or network elements.

Figure 3:
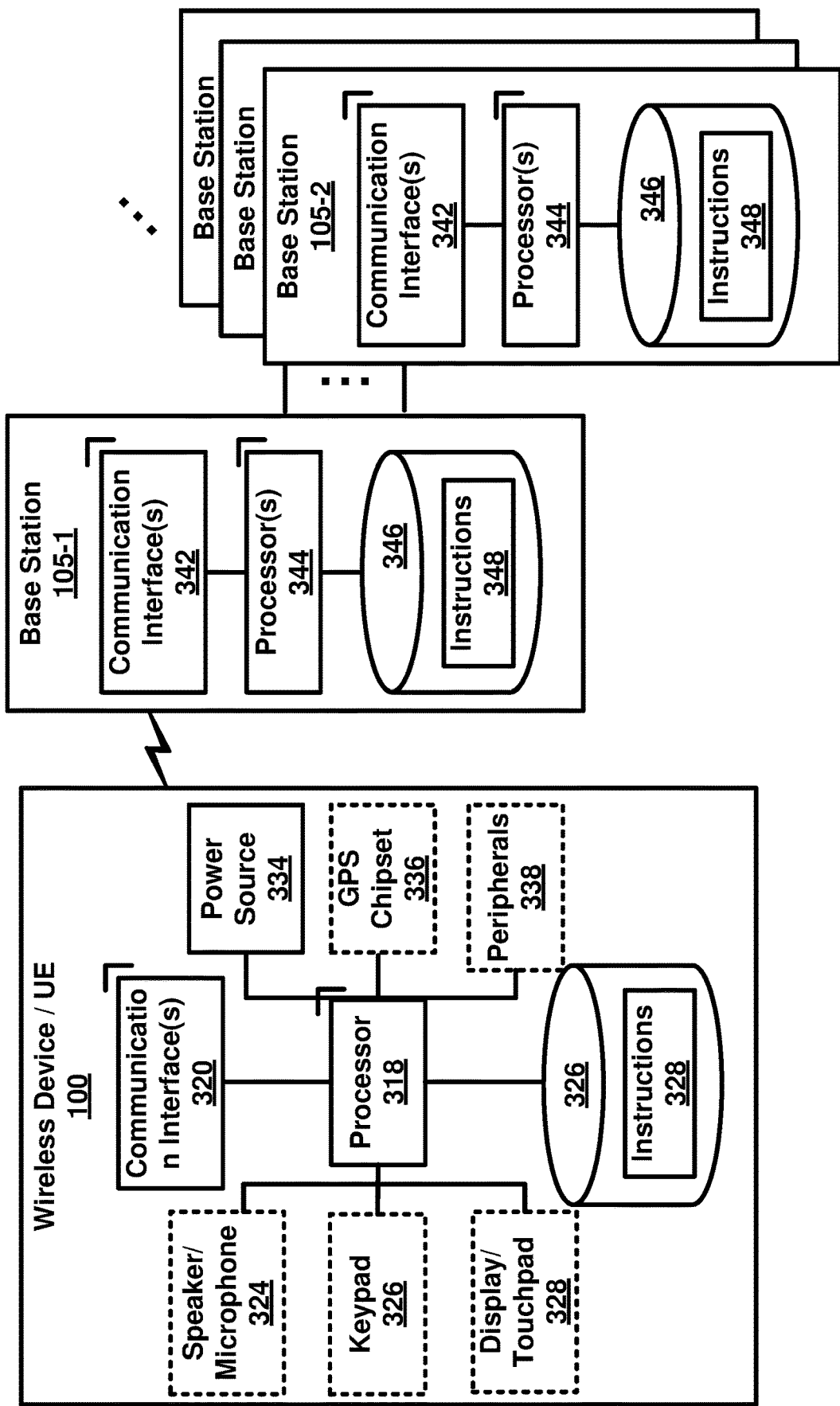
FIG. 3 is a system diagram of an example wireless device and a network node in a 5G system as per an aspect of an embodiment of the present disclosure.
Figure 4:
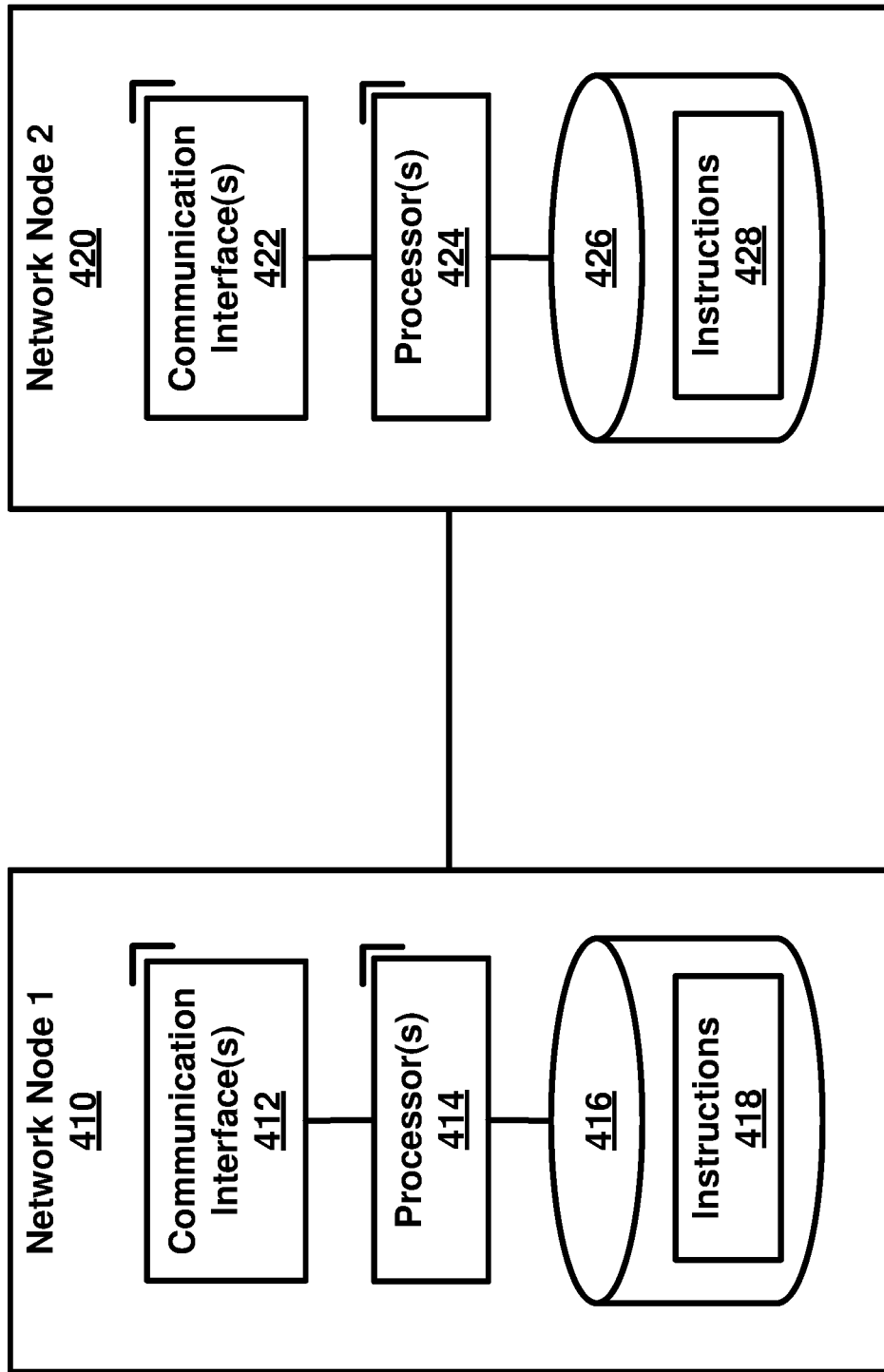
FIG. 4 is a system diagram of an example network node as per an aspect of an embodiment of the present disclosure.

In an example, a network function may be a processing function in a network, which may have a functional behavior and/or interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

In an example, access and mobility management function, AMF 155, may include the following functionalities (some of the AMF 155 functionalities may be supported in a single instance of an AMF 155): termination of RAN 105 CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys, and/or the like.

In an example, the AMF 155 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP access 105 and non-3GPP access 165 simultaneously, support of a coordinated RM context valid over 3GPP access 105 and non 3GPP access 165, support of CM management contexts for the UE 100 for connectivity over non-3GPP access, and/or the like.

In an example, an AMF 155 region may comprise one or multiple AMF 155 sets. The AMF 155 set may comprise some AMF 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that may be provisioned in a UE 100. DN 115 access identifier (DNAI), for a DNN, may be an identifier of a user plane access to a DN 115. Initial registration may be related to a UE 100 registration in RM-DEREGISTERED 500, 520 states. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

In an example, session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115, and/or the like.

In an example, a user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, downlink data notification triggering, and/or the like.

In an example, the UE 100 IP address management may include allocation and release of the UE 100 IP address and/or renewal of the allocated IP address. The UE 100 may set a requested PDU type during a PDU session establishment procedure based on its IP stack capabilities and/or configuration. In an example, the SMF 160 may select PDU type of a PDU session. In an example, if the SMF 160 receives a request with PDU type set to IP, the SMF 160 may select PDU type IPv4 or IPv6 based on DNN configuration and/or operator policies. In an example, the SMF 160 may provide a cause value to the UE 100 to indicate whether the other IP version is supported on the DNN. In an example, if the SMF 160 receives a request for PDU type IPv4 or IPv6 and the requested IP version is supported by the DNN the SMF 160 may select the requested PDU type.

In an example embodiment, the 5GC elements and UE 100 may support the following mechanisms: during a PDU session establishment procedure, the SMF 160 may send the IP address to the UE 100 via SM NAS signaling. The IPv4 address allocation and/or IPv4 parameter configuration via DHCPv4 may be employed once PDU session may be established. IPv6 prefix allocation may be supported via IPv6 stateless autoconfiguration, if IPv6 is supported. In an example, 5GC network elements may support IPv6 parameter configuration via stateless DHCPv6.

The 5GC may support the allocation of a static IPv4 address and/or a static IPv6 prefix based on subscription information in a UDM 140 and/or based on the configuration on a per-subscriber, per-DNN basis.

User plane function(s) (UPF 110) may handle the user plane path of PDU sessions. A UPF 110 that provides the interface to a data network may support functionality of a PDU session anchor.

In an example, a policy control function, PCF 135, may support unified policy framework to govern network behavior, provide policy rules to control plane function(s) to enforce policy rules, implement a front end to access subscription information relevant for policy decisions in a user data repository (UDR), and/or the like.

A network exposure function, NEF 125, may provide means to securely expose the services and capabilities provided by the 3GPP network functions, translate between information exchanged with the AF 145 and information exchanged with the internal network functions, receive information from other network functions, and/or the like.

In an example, an network repository function, NRF 130 may support service discovery function that may receive NF discovery request from NF instance, provide information about the discovered NF instances (be discovered) to the NF instance, and maintain information about available NF instances and their supported services, and/or the like.

In an example, an NSSF 120 may select a set of network slice instances serving the UE 100, may determine allowed NSSAI. In an example, the NSSF 120 may determine the AMF 155 set to be employed to serve the UE 100, and/or, based on configuration, determine a list of candidate AMF 155(s) 155 by querying the NRF 130.

In an example, stored data in a UDR may include at least user subscription data, including at least subscription identifiers, security credentials, access and mobility related subscription data, session related subscription data, policy data, and/or the like.

In an example, an AUSF 150 may support authentication server function (AUSF 150).

In an example, an application function, AF 145, may interact with the 3GPP core network to provide services. In an example, based on operator deployment, application functions may be trusted by the operator to interact directly with relevant network functions. Application functions not allowed by the operator to access directly the network functions may use an external exposure framework (e.g., via the NEF 125) to interact with relevant network functions.

In an example, control plane interface between the (R)AN 105 and the 5G core may support connection of multiple different kinds of AN(s) (e.g. 3GPP RAN 105, N3IWF 170 for Un-trusted access 165) to the 5GC via a control plane protocol. In an example, an N2 AP protocol may be employed for both the 3GPP access 105 and non-3GPP access 165. In an example, control plane interface between the (R)AN 105 and the 5G core may support decoupling between AMF 155 and other functions such as SMF 160 that may need to control the services supported by AN(s) (e.g. control of the UP resources in the AN 105 for a PDU session).

In an example, the 5GC may provide policy information from the PCF 135 to the UE 100. In an example, the policy information may comprise: access network discovery and selection policy, UE 100 route selection policy (URSP), SSC mode selection policy (SSCMSP), network slice selection policy (NSSP), DNN selection policy, non-seamless offload policy, and/or the like.

In an example, as depicted in example FIG. 5A and FIG. 5B, the registration management, RM may be employed to register or de-register a UE/user 100 with the network, and establish the user context in the network. Connection management may be employed to establish and release the signaling connection between the UE 100 and the AMF 155.

In an example, a UE 100 may register with the network to receive services that require registration. In an example, the UE 100 may update its registration with the network periodically in order to remain reachable (periodic registration update), or upon mobility (e.g., mobility registration update), or to update its capabilities or to re-negotiate protocol parameters.

Figure 8:
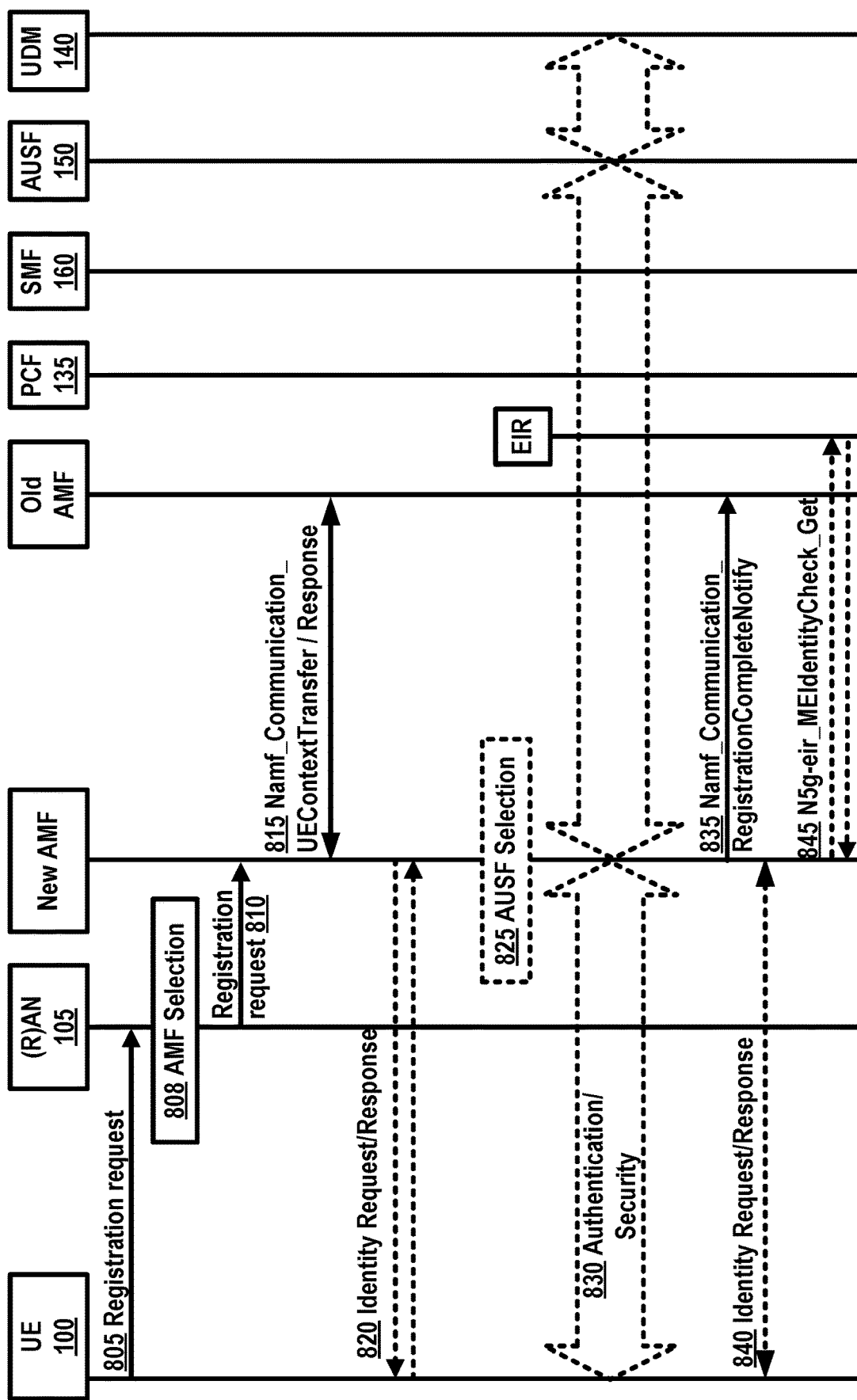
FIG. 8 is an example call flow as per an aspect of an embodiment of the present disclosure.
Figure 9:
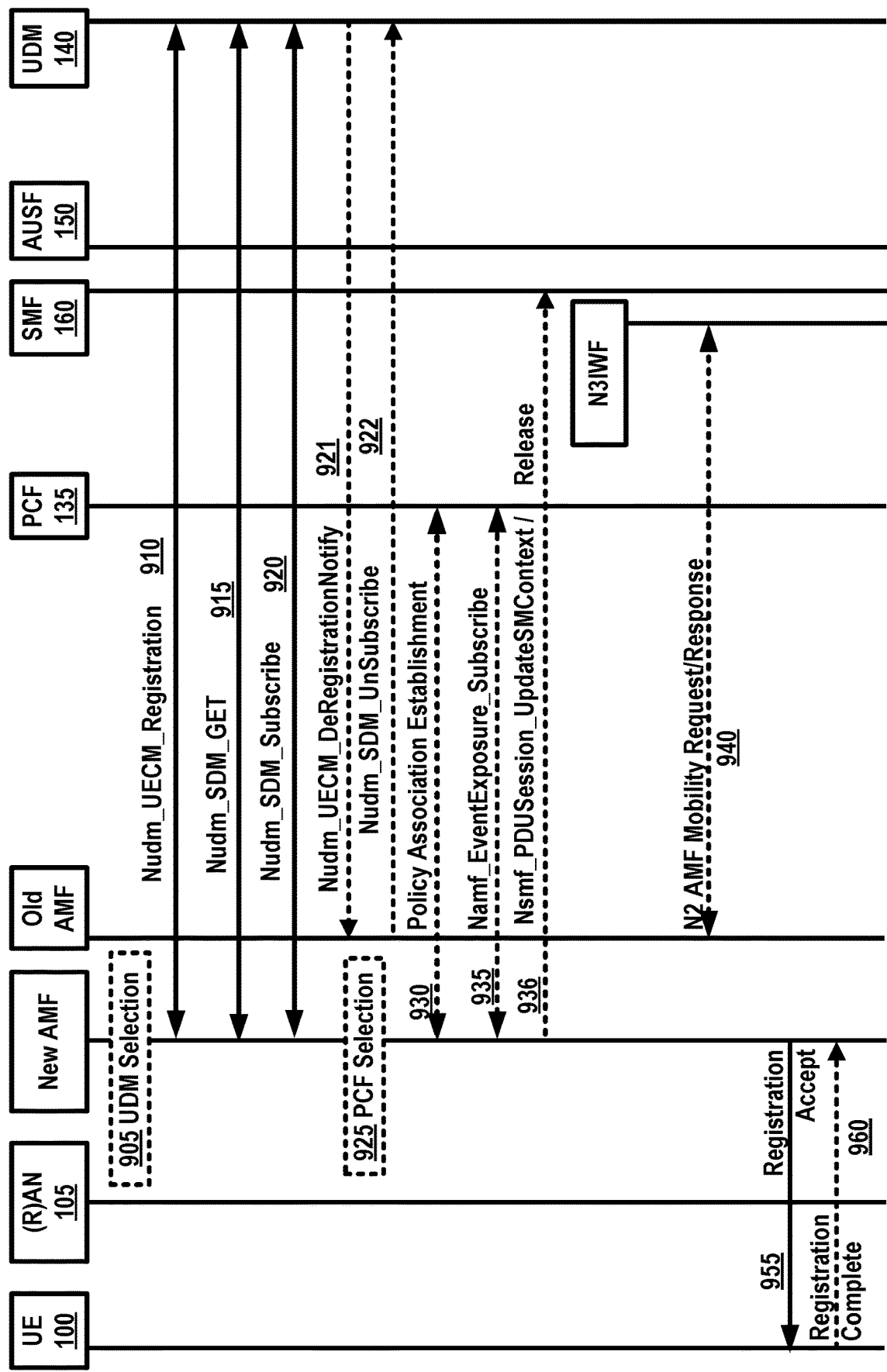
FIG. 9 is an example call flow as per an aspect of an embodiment of the present disclosure.

In an example, an initial registration procedure as depicted in example FIG. 8 and FIG. 9 may involve execution of network access control functions (e.g. user authentication and access authorization based on subscription profiles in UDM 140). Example FIG. 9 is a continuation of the initial registration procedure depicted in FIG. 8. As a result of the initial registration procedure, the identity of the serving AMF 155 may be registered in a UDM 140.

In an example, the registration management, RM procedures may be applicable over both 3GPP access 105 and non 3GPP access 165.

An example FIG. 5A may depict the RM states of a UE 100 as observed by the UE 100 and AMF 155. In an example embodiment, two RM states may be employed in the UE 100 and the AMF 155 that may reflect the registration status of the UE 100 in the selected PLMN: RM-DEREGISTERED 500, and RM-REGISTERED 510. In an example, in the RM DEREGISTERED state 500, the UE 100 may not be registered with the network. The UE 100 context in the AMF 155 may not hold valid location or routing information for the UE 100 so the UE 100 may not be reachable by the AMF 155. In an example, the UE 100 context may be stored in the UE 100 and the AMF 155. In an example, in the RM REGISTERED state 510, the UE 100 may be registered with the network. In the RM-REGISTERED 510 state, the UE 100 may receive services that may require registration with the network.

In an example embodiment, two RM states may be employed in AMF 155 for the UE 100 that may reflect the registration status of the UE 100 in the selected PLMN: RM-DEREGISTERED 520, and RM-REGISTERED 530.

Figure 6A:
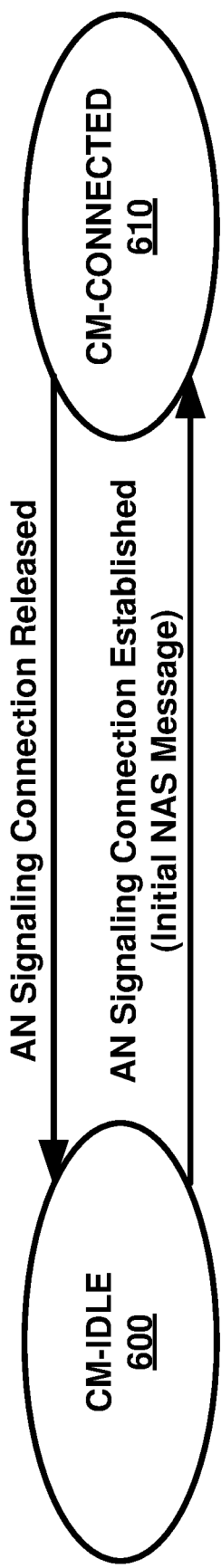
FIG. 6A and FIG. 6B depict two connection management state models in UE 100 and AMF 155 as per an aspect of embodiments of the present disclosure.
Figure 6B:
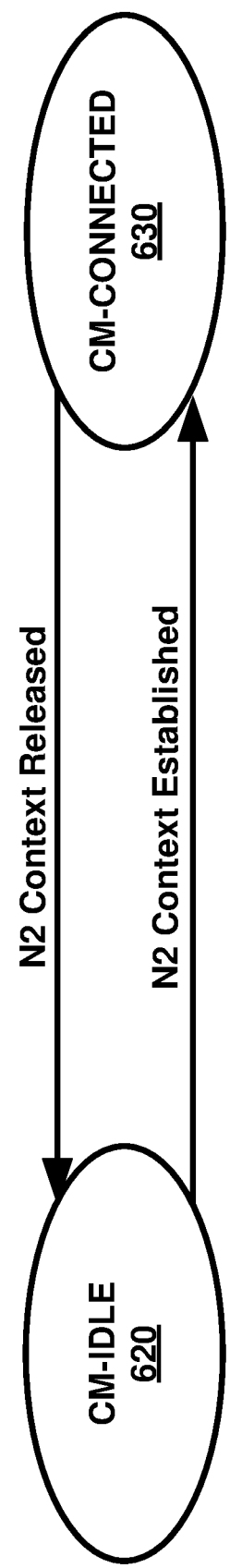

As depicted in example FIG. 6A and FIG. 6B, connection management, CM, may comprise establishing and releasing a signaling connection between a UE 100 and an AMF 155 over N1 interface. The signaling connection may be employed to enable NAS signaling exchange between the UE 100 and the core network. The signaling connection between the UE 100 and the AMF 155 may comprise both the AN signaling connection between the UE 100 and the (R)AN 105 (e.g. RRC connection over 3GPP access) and the N2 connection for the UE 100 between the AN and the AMF 155.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state may be in RM-REGISTERED 510 state and may have no NAS signaling connection established with the AMF 155 over N1. The UE 100 may perform cell selection, cell reselection, PLMN selection, and/or the like. A UE 100 in CM-CONNECTED 610 state may have a NAS signaling connection with the AMF 155 over N1.

In an example embodiment two CM states may be employed for the UE 100 at the AMF 155, CM-IDLE 620 and CM-CONNECTED 630.

In an example, an RRC inactive state may apply to NG-RAN (e.g. it may apply to NR and E-UTRA connected to 5G CN). The AMF 155, based on network configuration, may provide assistance information to the NG RAN 105, to assist the NG RAN's 105 decision whether the UE 100 may be sent to RRC inactive state. When a UE 100 is CM-CONNECTED 610 with RRC inactive state, the UE 100 may resume the RRC connection due to uplink data pending, mobile initiated signaling procedure, as a response to RAN 105 paging, to notify the network that it has left the RAN 105 notification area, and/or the like.

In an example, a NAS signaling connection management may include establishing and releasing a NAS signaling connection. A NAS signaling connection establishment function may be provided by the UE 100 and the AMF 155 to establish the NAS signaling connection for the UE 100 in CM-IDLE 600 state. The procedure of releasing the NAS signaling connection may be initiated by the 5G (R)AN 105 node or the AMF 155.

In an example, reachability management of a UE 100 may detect whether the UE 100 is reachable and may provide the UE 100 location (e.g. access node) to the network to reach the UE 100. Reachability management may be done by paging the UE 100 and the UE 100 location tracking. The UE 100 location tracking may include both UE 100 registration area tracking and UE 100 reachability tracking. The UE 100 and the AMF 155 may negotiate UE 100 reachability characteristics in CM-IDLE 600, 620 state during registration and registration update procedures.

In an example, two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between the UE 100 and a data network identified by a DNN. The PDU connectivity service may be supported via PDU sessions that are established upon request from the UE 100.

In an example, a PDU session may support one or more PDU session types. PDU sessions may be established (e.g. upon UE 100 request), modified (e.g. upon UE 100 and 5GC request) and/or released (e.g. upon UE 100 and 5GC request) using NAS SM signaling exchanged over N1 between the UE 100 and the SMF 160. Upon request from an application server, the 5GC may be able to trigger a specific application in the UE 100. When receiving the trigger, the UE 100 may send it to the identified application in the UE 100. The identified application in the UE 100 may establish a PDU session to a specific DNN.

Figure 7:
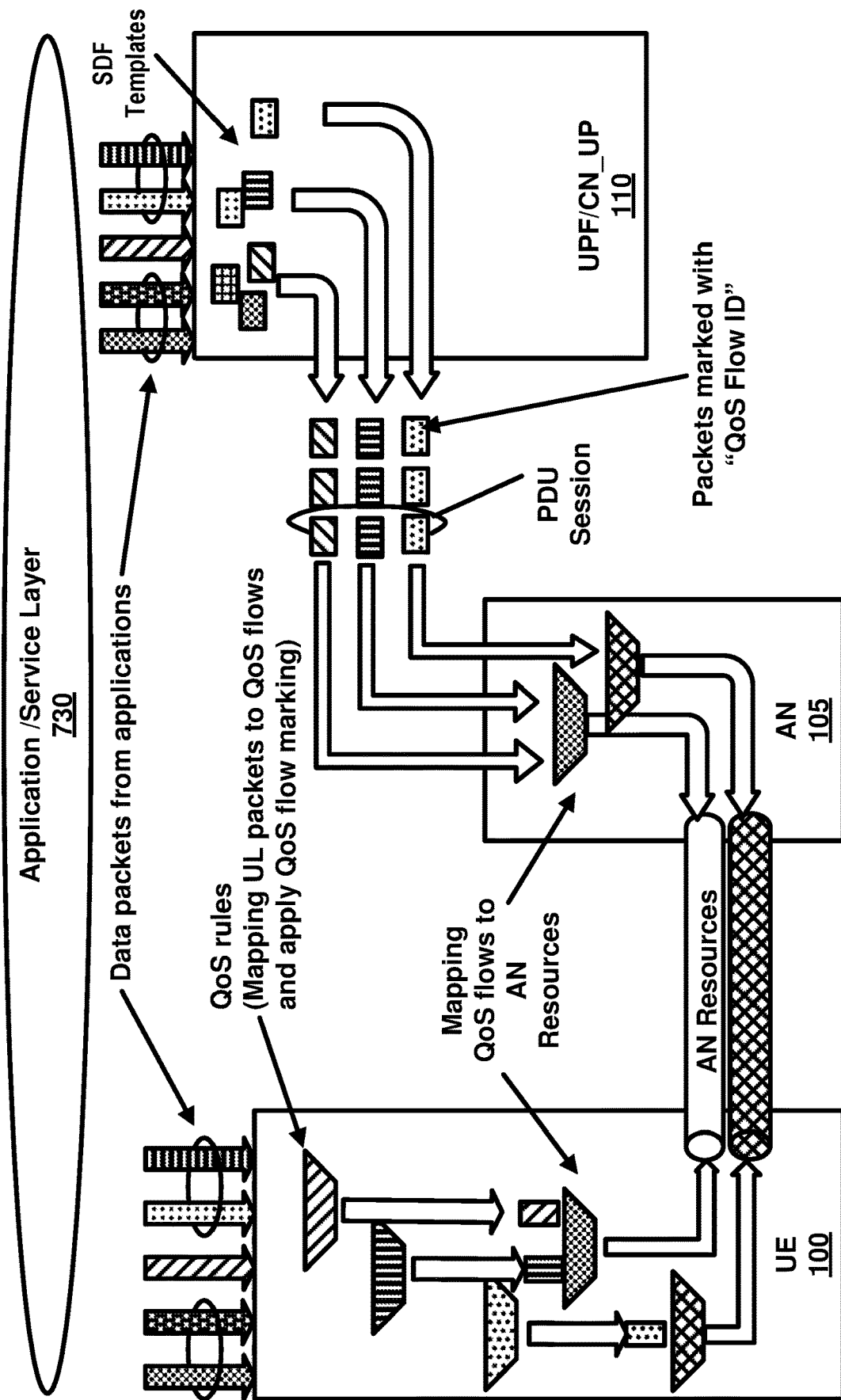
FIG. 7 is diagram for classification and marking traffic as per an aspect of an embodiment of the present disclosure.

In an example, the 5G QoS model may support a QoS flow based framework as depicted in example FIG. 7. The 5G QoS model may support both QoS flows that require a guaranteed flow bit rate and QoS flows that may not require a guaranteed flow bit rate. In an example, the 5G QoS model may support reflective QoS. The QoS model may comprise flow mapping or packet marking at the UPF 110 (CN_UP) 110, AN 105 and/or the UE 100. In an example, packets may arrive from and/or destined to the application/service layer 730 of UE 100, UPF 110 (CN_UP) 110, and/or the AF 145.

In an example, the QoS flow may be a granularity of QoS differentiation in a PDU session. A QoS flow ID, QFI, may be employed to identify the QoS flow in the 5G system. In an example, user plane traffic with the same QFI within a PDU session may receive the same traffic forwarding treatment. The QFI may be carried in an encapsulation header on N3 and/or N9 (e.g. without any changes to the end-to-end packet header). In an example, the QFI may be applied to PDUs with different types of payload. The QFI may be unique within a PDU session.

In an example, the QoS parameters of a QoS flow may be provided to the (R)AN 105 as a QoS profile over N2 at PDU session establishment, QoS flow establishment, or when NG-RAN is used at every time the user plane is activated. In an example, a default QoS rule may be required for every PDU session. The SMF 160 may allocate the QFI for a QoS flow and may derive QoS parameters from the information provided by the PCF 135. In an example, the SMF 160 may provide the QFI together with the QoS profile containing the QoS parameters of a QoS flow to the (R)AN 105.

In an example, 5G QoS flow may be a granularity for QoS forwarding treatment in the 5G system. Traffic mapped to the same 5G QoS flow may receive the same forwarding treatment (e.g. scheduling policy, queue management policy, rate shaping policy, RLC configuration, and/or the like). In an example, providing different QoS forwarding treatment may require separate 5G QoS flows.

In an example, a 5G QoS indicator may be a scalar that may be employed as a reference to a specific QoS forwarding behavior (e.g. packet loss rate, packet delay budget) to be provided to a 5G QoS flow. In an example, the 5G QoS indicator may be implemented in the access network by the 5QI referencing node specific parameters that may control the QoS forwarding treatment (e.g. scheduling weights, admission thresholds, queue management thresholds, link layer protocol configuration, and/or the like).

In an example, 5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. In an example, the selection and traffic steering may be based on the UE's 100 subscription data, UE 100 location, the information from application function AF 145, policy, other related traffic rules, and/or the like. In an example, the 5G core network may expose network information and capabilities to an edge computing application function. The functionality support for edge computing may include local routing where the 5G core network may select a UPF 110 to route the user traffic to the local data network, traffic steering where the 5G core network may select the traffic to be routed to the applications in the local data network, session and service continuity to enable UE 100 and application mobility, user plane selection and reselection, e.g. based on input from application function, network capability exposure where 5G core network and application function may provide information to each other via NEF 125, QoS and charging where PCF 135 may provide rules for QoS control and charging for the traffic routed to the local data network, support of local area data network where 5G core network may provide support to connect to the LADN in a certain area where the applications are deployed, and/or the like.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

In an example, a PDU connectivity service may provide exchange of PDUs between a UE 100 and a data network. A PDU session may be an association between the UE 100 and the data network, DN 115, that may provide the PDU connectivity service. The type of association may be IP, Ethernet and/or unstructured.

Establishment of user plane connectivity to a data network via network slice instance(s) may comprise the following: performing a RM procedure to select an AMF 155 that supports the required network slices, and establishing one or more PDU session(s) to the required data network via the network slice instance(s).

In an example, the set of network slices for a UE 100 may be changed at any time while the UE 100 may be registered with the network, and may be initiated by the network, or the UE 100.

In an example, a periodic registration update may be UE 100 re-registration at expiry of a periodic registration timer. A requested NSSAI may be a NSSAI that the UE 100 may provide to the network.

In an example, a service based interface may represent how a set of services may be provided/exposed by a given NF.

In an example, a service continuity may be an uninterrupted user experience of a service, including the cases where the IP address and/or anchoring point may change. In an example, a session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by the SMF 160, towards data network, DN 115.

In an example, the 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

In an example, the 5G system may reduce dependencies between the access network (AN) and the core network (CN). The architecture may comprise a converged access-agnostic core network with a common AN-CN interface which may integrate different 3GPP and non-3GPP access types.

In an example, the 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

In an example, the 5G system may support roaming with home routed traffic and/or local breakout traffic in the visited PLMN. An example 5G architecture may be service-based and the interaction between network functions may be represented in two ways. (1) As service-based representation (depicted in example FIG. 1), where network functions within the control plane, may enable other authorized network functions to access their services. This representation may also include point-to-point reference points where necessary. (2) Reference point representation, showing the interaction between the NF services in the network functions described by point-to-point reference point (e.g. N11) between any two network functions.

In an example, a network slice may comprise the core network control plane and user plane network functions, the 5G Radio Access Network; the N3IWF functions to the non-3GPP Access Network, and/or the like. Network slices may differ for supported features and network function implementation. The operator may deploy multiple network slice instances delivering the same features but for different groups of UEs, e.g. as they deliver a different committed service and/or because they may be dedicated to a customer. The NSSF 120 may store the mapping information between slice instance ID and NF ID (or NF address).

In an example, a UE 100 may simultaneously be served by one or more network slice instances via a 5G-AN. In an example, the UE 100 may be served by k network slices (e.g. k=8, 16, etc.) at a time. An AMF 155 instance serving the UE 100 logically may belong to a network slice instance serving the UE 100.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a network slice. An S-NSSAI may comprise a slice/service type (SST), which may refer to the expected network slice behavior in terms of features and services; and/or a slice differentiator (SD). A slice differentiator may be optional information that may complement the slice/service type(s) to allow further differentiation for selecting a network slice instance from potentially multiple network slice instances that comply with the indicated slice/service type. In an example, the same network slice instance may be selected employing different S-NSSAIs. The CN part of a network slice instance(s) serving a UE 100 may be selected by CN.

In an example, subscription data may include the S-NSSAI(s) of the network slices that the UE 100 subscribes to. One or more S-NSSAIs may be marked as default S-NSSAI. In an example, k S-NSSAI may be marked default S-NSSAI (e.g. k=8, 16, etc.). In an example, the UE 100 may subscribe to more than 8 S-NSSAIs.

In an example, a UE 100 may be configured by the HPLMN with a configured NSSAI per PLMN. Upon successful completion of a UE's registration procedure, the UE 100 may obtain from the AMF 155 an Allowed NSSAI for this PLMN, which may include one or more S-NSSAIs.

In an example, the Allowed NSSAI may take precedence over the configured NSSAI for a PLMN. The UE 100 may use the S-NSSAIs in the allowed NSSAI corresponding to a network slice for the subsequent network slice selection related procedures in the serving PLMN.

In an example, the establishment of user plane connectivity to a data network via a network slice instance(s) may comprise: performing a RM procedure to select an AMF 155 that may support the required network slices, establishing one or more PDU sessions to the required data network via the network slice instance(s), and/or the like.

In an example, when a UE 100 registers with a PLMN, if the UE 100 for the PLMN has a configured NSSAI or an allowed NSSAI, the UE 100 may provide to the network in RRC and NAS layer a requested NSSAI comprising the S-NSSAI(s) corresponding to the slice(s) to which the UE 100 attempts to register, a temporary user ID if one was assigned to the UE, and/or the like. The requested NSSAI may be configured-NSSAI, allowed-NSSAI, and/or the like.

In an example, when a UE 100 registers with a PLMN, if for the PLMN the UE 100 has no configured NSSAI or allowed NSSAI, the RAN 105 may route NAS signaling from/to the UE 100 to/from a default AMF 155.

In an example, the network, based on local policies, subscription changes and/or UE 100 mobility, may change the set of permitted network slice(s) to which the UE 100 is registered. In an example, the network may perform the change during a registration procedure or trigger a notification towards the UE 100 of the change of the supported network slices using an RM procedure (which may trigger a registration procedure). The network may provide the UE 100 with a new allowed NSSAI and tracking area list.

In an example, during a registration procedure in a PLMN, in case the network decides that the UE 100 may be served by a different AMF 155 based on network slice(s) aspects, the AMF 155 that first received the registration request may redirect the registration request to another AMF 155 via the RAN 105 or via direct signaling between the initial AMF 155 and the target AMF 155.

In an example, the network operator may provision the UE 100 with network slice selection policy (NSSP). The NSSP may comprise one or more NSSP rules.

In an example, if a UE 100 has one or more PDU sessions established corresponding to a specific S-NSSAI, the UE 100 may route the user data of the application in one of the PDU sessions, unless other conditions in the UE 100 may prohibit the use of the PDU sessions. If the application provides a DNN, then the UE 100 may consider the DNN to determine which PDU session to use. In an example, if the UE 100 does not have a PDU session established with the specific S-NSSAI, the UE 100 may request a new PDU session corresponding to the S-NSSAI and with the DNN that may be provided by the application. In an example, in order for the RAN 105 to select a proper resource for supporting network slicing in the RAN 105, the RAN 105 may be aware of the network slices used by the UE 100.

In an example, an AMF 155 may select an SMF 160 in a network slice instance based on S-NSSAI, DNN and/or other information e.g. UE 100 subscription and local operator policies, and/or the like, when the UE 100 triggers the establishment of a PDU session. The selected SMF 160 may establish the PDU session based on S-NSSAI and DNN.

In an example, in order to support network-controlled privacy of slice information for the slices the UE 100 may access, when the UE 100 is aware or configured that privacy considerations may apply to NSSAI, the UE 100 may not include NSSAI in NAS signaling unless the UE 100 has a NAS security context and the UE 100 may not include NSSAI in unprotected RRC signaling.

In an example, for roaming scenarios, the network slice specific network functions in VPLMN and HPLMN may be selected based on the S-NSSAI provided by the UE 100 during PDU connection establishment. If a standardized S-NSSAI is used, selection of slice specific NF instances may be done by one or more PLMN(s) based on the provided S-NSSAI. In an example, the VPLMN may map the S-NSSAI of HPLMN to a S-NSSAI of VPLMN based on roaming agreement (e.g., including mapping to a default S-NSSAI of VPLMN). In an example, the selection of slice specific NF instance in VPLMN may be done based on the S-NSSAI of VPLMN. In an example, the selection of any slice specific NF instance in HPLMN may be based on the S-NSSAI of HPLMN.

As depicted in example FIG. 8 and FIG. 9, a registration procedure may be performed by the UE 100 to get authorized to receive services, to enable mobility tracking, to enable reachability, and/or the like.

In an example, the UE 100 may send to the (R)AN 105 an AN message 805 (comprising AN parameters, RM-NAS registration request (registration type, SUCI or SUPI or 5G-GUTI, last visited TAI (if available), security parameters, requested NSSAI, mapping of requested NSSAI, UE 100 5GC capability, PDU session status, PDU session(s) to be re-activated, Follow on request, MICO mode preference, and/or the like), and/or the like). In an example, in case of NG-RAN, the AN parameters may include e.g. SUCI or SUPI or the 5G-GUTI, the Selected PLMN ID and requested NSSAI, and/or the like. In an example, the AN parameters may comprise establishment cause. The establishment cause may provide the reason for requesting the establishment of an RRC connection. In an example, the registration type may indicate if the UE 100 wants to perform an initial registration (i.e. the UE 100 is in RM-DEREGISTERED state), a mobility registration update (e.g., the UE 100 is in RM-REGISTERED state and initiates a registration procedure due to mobility), a periodic registration update (e.g., the UE 100 is in RM-REGISTERED state and may initiate a registration procedure due to the periodic registration update timer expiry) or an emergency registration (e.g., the UE 100 is in limited service state). In an example, if the UE 100 performing an initial registration (i.e., the UE 100 is in RM-DEREGISTERED state) to a PLMN for which the UE 100 does not already have a 5G-GUTI, the UE 100 may include its SUCI or SUPI in the registration request. The SUCI may be included if the home network has provisioned the public key to protect SUPI in the UE. If the UE 100 received a UE 100 configuration update command indicating that the UE 100 needs to re-register and the 5G-GUTI is invalid, the UE 100 may perform an initial registration and may include the SUPI in the registration request message. For an emergency registration, the SUPI may be included if the UE 100 does not have a valid 5G-GUTI available; the PEI may be included when the UE 100 has no SUPI and no valid 5G-GUTI. In other cases, the 5G-GUTI may be included and it may indicate the last serving AMF 155. If the UE 100 is already registered via a non-3GPP access in a PLMN different from the new PLMN (e.g., not the registered PLMN or an equivalent PLMN of the registered PLMN) of the 3GPP access, the UE 100 may not provide over the 3GPP access the 5G-GUTI allocated by the AMF 155 during the registration procedure over the non-3GPP access. If the UE 100 is already registered via a 3GPP access in a PLMN (e.g., the registered PLMN), different from the new PLMN (i.e. not the registered PLMN or an equivalent PLMN of the registered PLMN) of the non-3GPP access, the UE 100 may not provide over the non-3GPP access the 5G-GUTI allocated by the AMF 155 during the registration procedure over the 3GPP access. The UE 100 may provide the UE's usage setting based on its configuration. In case of initial registration or mobility registration update, the UE 100 may include the mapping of requested NSSAI, which may be the mapping of one or more S-NSSAI of the requested NSSAI to the S-NSSAIs of the configured NSSAI for the HPLMN, to ensure that the network is able to verify whether the S-NSSAI(s) in the requested NSSAI are permitted based on the subscribed S-NSSAIs. If available, the last visited TAI may be included in order to help the AMF 155 produce registration area for the UE. In an example, the security parameters may be used for authentication and integrity protection. requested NSSAI may indicate the network slice selection assistance information. The PDU session status may indicates the previously established PDU sessions in the UE. When the UE 100 is connected to the two AMF 155 belonging to different PLMN via 3GPP access and non-3GPP access then the PDU session status may indicate the established PDU session of the current PLMN in the UE. The PDU session(s) to be re-activated may be included to indicate the PDU session(s) for which the UE 100 may intend to activate UP connections. A PDU session corresponding to a LADN may not be included in the PDU session(s) to be re-activated when the UE 100 is outside the area of availability of the LADN. The follow on request may be included when the UE 100 may have pending uplink signaling and the UE 100 may not include PDU session(s) to be re-activated, or the registration type may indicate the UE 100 may want to perform an emergency registration.

In an example, if a SUPI is included or the 5G-GUTI does not indicate a valid AMF 155, the (R)AN 105, based on (R)AT and requested NSSAI, if available, may selects 808 an AMF 155. If UE 100 is in CM-CONNECTED state, the (R)AN 105 may forward the registration request message to the AMF 155 based on the N2 connection of the UE. If the (R)AN 105 may not select an appropriate AMF 155, it may forward the registration request to an AMF 155 which has been configured, in (R)AN 105, to perform AMF 155 selection 808.

In an example, the (R)AN 105 may send to the new AMF 155 an N2 message 810 (comprising: N2 parameters, RM-NAS registration request (registration type, SUPI or 5G-GUTI, last visited TAI (if available), security parameters, requested NSSAI, mapping of requested NSSAI, UE 100 5GC capability, PDU session status, PDU session(s) to be re-activated, follow on request, and MICO mode preference), and/or the like). In an example, when NG-RAN is used, the N2 parameters may comprise the selected PLMN ID, location information, cell identity and the RAT type related to the cell in which the UE 100 is camping. In an example, when NG-RAN is used, the N2 parameters may include the establishment cause.

In an example, the new AMF 155 may send to the old AMF 155 an Namf_Communication_UEContextTransfer (complete registration request) 815. In an example, if the UE's 5G-GUTI was included in the registration request and the serving AMF 155 has changed since last registration procedure, the new AMF 155 may invoke the Namf_Communication_UEContextTransfer service operation 815 on the old AMF 155 including the complete registration request IE, which may be integrity protected, to request the UE's SUPI and MM Context. The old AMF 155 may use the integrity protected complete registration request IE to verify if the context transfer service operation invocation corresponds to the UE 100 requested. In an example, the old AMF 155 may transfer the event subscriptions information by one or more NF consumer, for the UE, to the new AMF 155. In an example, if the UE 100 identifies itself with PEI, the SUPI request may be skipped.

In an example, the old AMF 155 may send to new AMF 155 a response 815 to Namf_Communication_UEContextTransfer (SUPI, MM context, SMF 160 information, PCF ID). In an example, the old AMF 155 may respond to the new AMF 155 for the Namf_Communication_UEContextTransfer invocation by including the UE's SUPI and MM context. In an example, if old AMF 155 holds information about established PDU sessions, the old AMF 155 may include SMF 160 information including S-NSSAI(s), SMF 160 identities and PDU session ID. In an example, if old AMF 155 holds information about active NGAP UE-TNLA bindings to N3IWF, the old AMF 155 may include information about the NGAP UE-TNLA bindings.

In an example, if the SUPI is not provided by the UE 100 nor retrieved from the old AMF 155 the identity request procedure 820 may be initiated by the AMF 155 sending an identity request message to the UE 100 requesting the SUCI.

In an example, the UE 100 may respond with an identity response message 820 including the SUCI. The UE 100 may derive the SUCI by using the provisioned public key of the HPLMN.

In an example, the AMF 155 may decide to initiate UE 100 authentication 825 by invoking an AUSF 150. The AMF 155 may select an AUSF 150 based on SUPI or SUCI. In an example, if the AMF 155 is configured to support emergency registration for unauthenticated SUPIs and the UE 100 indicated registration type emergency registration the AMF 155 may skip the authentication and security setup or the AMF 155 may accept that the authentication may fail and may continue the registration procedure.

In an example, the authentication 830 may be performed by Nudm_UEAuthenticate_Get operation. The AUSF 150 may discover a UDM 140. In case the AMF 155 provided a SUCI to AUSF 150, the AUSF 150 may return the SUPI to AMF 155 after the authentication is successful. In an example, if network slicing is used, the AMF 155 may decide if the registration request needs to be rerouted where the initial AMF 155 refers to the AMF 155. In an example, the AMF 155 may initiate NAS security functions. In an example, upon completion of NAS security function setup, the AMF 155 may initiate NGAP procedure to enable 5G-AN use it for securing procedures with the UE. In an example, the 5G-AN may store the security context and may acknowledge to the AMF 155. The 5G-AN may use the security context to protect the messages exchanged with the UE.

In an example, new AMF 155 may send to the old AMF 155 Namf_Communication_RegistrationCompleteNotify 835. If the AMF 155 has changed, the new AMF 155 may notify the old AMF 155 that the registration of the UE 100 in the new AMF 155 may be completed by invoking the Namf_Communication_RegistrationCompleteNotify service operation. If the authentication/security procedure fails, then the registration may be rejected, and the new AMF 155 may invoke the Namf_Communication_RegistrationCompleteNotify service operation with a reject indication reason code towards the old AMF 155. The old AMF 155 may continue as if the UE 100 context transfer service operation was never received. If one or more of the S-NSSAIs used in the old registration area may not be served in the target registration area, the new AMF 155 may determine which PDU session may not be supported in the new registration area. The new AMF 155 may invoke the Namf_Communication_RegistrationCompleteNotify service operation including the rejected PDU session ID and a reject cause (e.g. the S-NSSAI becomes no longer available) towards the old AMF 155. The new AMF 155 may modify the PDU session status correspondingly. The old AMF 155 may inform the corresponding SMF 160(*s*) to locally release the UE's SM context by invoking the Nsmf_PDUSession_ReleaseSMContext service operation.

In an example, the new AMF 155 may send to the UE 100 an identity request/response 840 (e.g., PEI). If the PEI was not provided by the UE 100 nor retrieved from the old AMF 155, the identity request procedure may be initiated by AMF 155 sending an identity request message to the UE 100 to retrieve the PEI. The PEI may be transferred encrypted unless the UE 100 performs emergency registration and may not be authenticated. For an emergency registration, the UE 100 may have included the PEI in the registration request.

In an example, the new AMF 155 may initiate ME identity check 845 by invoking the N5g-eir_EquipmentIdentityCheck_Get service operation 845.

In an example, the new AMF 155, based on the SUPI, may select 905 a UDM 140. The UDM 140 may select a UDR instance. In an example, the AMF 155 may select a UDM 140.

In an example, if the AMF 155 has changed since the last registration procedure, or if the UE 100 provides a SUPI which may not refer to a valid context in the AMF 155, or if the UE 100 registers to the same AMF 155 it has already registered to a non-3GPP access (e.g., the UE 100 is registered over a non-3GPP access and may initiate the registration procedure to add a 3GPP access), the new AMF 155 may register with the UDM 140 using Nudm_UECM_Registration 910 and may subscribe to be notified when the UDM 140 may deregister the AMF 155. The UDM 140 may store the AMF 155 identity associated to the access type and may not remove the AMF 155 identity associated to the other access type. The UDM 140 may store information provided at registration in UDR, by Nudr_UDM_Update. In an example, the AMF 155 may retrieve the access and mobility subscription data and SMF 160 selection subscription data using Nudm_SDM_Get 915. The UDM 140 may retrieve this information from UDR by Nudr_UDM_Query (access and mobility subscription data). After a successful response is received, the AMF 155 may subscribe to be notified using Nudm_SDM_Subscribe 920 when the data requested may be modified. The UDM 140 may subscribe to UDR by Nudr_UDM_Subscribe. The GPSI may be provided to the AMF 155 in the subscription data from the UDM 140 if the GPSI is available in the UE 100 subscription data. In an example, the new AMF 155 may provide the access type it serves for the UE 100 to the UDM 140 and the access type may be set to 3GPP access. The UDM 140 may store the associated access type together with the serving AMF 155 in UDR by Nudr_UDM_Update. The new AMF 155 may create an MM context for the UE 100 after getting the mobility subscription data from the UDM 140. In an example, when the UDM 140 stores the associated access type together with the serving AMF 155, the UDM 140 may initiate a Nudm_UECM_DeregistrationNotification 921 to the old AMF 155 corresponding to 3GPP access. The old AMF 155 may remove the MM context of the UE. If the serving NF removal reason indicated by the UDM 140 is initial registration, then the old AMF 155 may invoke the Namf_EventExposure_Notify service operation towards all the associated SMF 160*s* of the UE 100 to notify that the UE 100 is deregistered from old AMF 155. The SMF 160 may release the PDU session(s) on getting this notification. In an example, the old AMF 155 may unsubscribe with the UDM 140 for subscription data using Nudm_SDM_unsubscribe 922.

In an example, if the AMF 155 decides to initiate PCF 135 communication, e.g. the AMF 155 has not yet obtained access and mobility policy for the UE 100 or if the access and mobility policy in the AMF 155 are no longer valid, the AMF 155 may select 925 a PCF 135. If the new AMF 155 receives a PCF ID from the old AMF 155 and successfully contacts the PCF 135 identified by the PCF ID, the AMF 155 may select the (V-)PCF identified by the PCF ID. If the PCF 135 identified by the PCF ID may not be used (e.g. no response from the PCF 135) or if there is no PCF ID received from the old AMF 155, the AMF 155 may select 925 a PCF 135.

In an example, the new AMF 155 may perform a policy association establishment 930 during registration procedure. If the new AMF 155 contacts the PCF 135 identified by the (V-)PCF ID received during inter-AMF 155 mobility, the new AMF 155 may include the PCF-ID in the Npcf_AMPolicyControl Get operation. If the AMF 155 notifies the mobility restrictions (e.g. UE 100 location) to the PCF 135 for adjustment, or if the PCF 135 updates the mobility restrictions itself due to some conditions (e.g. application in use, time and date), the PCF 135 may provide the updated mobility restrictions to the AMF 155.

In an example, the PCF 135 may invoke Namf_EventExposure_Subscribe service operation 935 for UE 100 event subscription.

In an example, the AMF 155 may send to the SMF 160 a Nsmf_PDUSession_UpdateSMContext 936. In an example, the AMF 155 may invoke the Nsmf_PDUSession_UpdateSMContext if the PDU session(s) to be re-activated is included in the registration request. The AMF 155 may send Nsmf_PDUSession_UpdateSMContext request to SMF 160(*s*) associated with the PDU session(s) to activate user plane connections of the PDU session(s). The SMF 160 may decide to trigger e.g. the intermediate UPF 110 insertion, removal or change of PSA. In the case that the intermediate UPF 110 insertion, removal, or relocation is performed for the PDU session(s) not included in PDU session(s) to be re-activated, the procedure may be performed without N11 and N2 interactions to update the N3 user plane between (R)AN 105 and 5GC. The AMF 155 may invoke the Nsmf_PDUSession_ReleaseSMContext service operation towards the SMF 160 if any PDU session status indicates that it is released at the UE 100. The AMF 155 may invoke the Nsmf_PDUSession_ReleaseSMContext service operation towards the SMF 160 in order to release any network resources related to the PDU session.

In an example, the new AMF 155155 may send to a N3IWF an N2 AMF 155 mobility request 940. If the AMF 155 has changed, the new AMF 155 may create an NGAP UE 100 association towards the N3IWF to which the UE 100 is connected. In an example, the N3IWF may respond to the new AMF 155 with an N2 AMF 155 mobility response 940.

In an example, the new AMF 155 may send to the UE 100 a registration accept 955 (comprising: 5G-GUTI, registration area, mobility restrictions, PDU session status, allowed NSSAI, [mapping of allowed NSSAI], periodic registration update timer, LADN information and accepted MICO mode, IMS voice over PS session supported indication, emergency service support indicator, and/or the like). In an example, the AMF 155 may send the registration accept message to the UE 100 indicating that the registration request has been accepted. 5G-GUTI may be included if the AMF 155 allocates a new 5G-GUTI. If the AMF 155 allocates a new registration area, it may send the registration area to the UE 100 via registration accept message 955. If there is no registration area included in the registration accept message, the UE 100 may consider the old registration area as valid. In an example, mobility restrictions may be included in case mobility restrictions may apply for the UE 100 and registration type may not be emergency registration. The AMF 155 may indicate the established PDU sessions to the UE 100 in the PDU session status. The UE 100 may remove locally any internal resources related to PDU sessions that are not marked as established in the received PDU session status. In an example, when the UE 100 is connected to the two AMF 155 belonging to different PLMN via 3GPP access and non-3GPP access then the UE 100 may remove locally any internal resources related to the PDU session of the current PLMN that are not marked as established in received PDU session status. If the PDU session status information was in the registration request, the AMF 155 may indicate the PDU session status to the UE. The mapping of allowed NSSAI may be the mapping of one or more S-NSSAI of the allowed NSSAI to the S-NSSAIs of the configured NSSAI for the HPLMN. The AMF 155 may include in the registration accept message 955 the LADN information for LADNs that are available within the registration area determined by the AMF 155 for the UE. If the UE 100 included MICO mode in the request, then AMF 155 may respond whether MICO mode may be used. The AMF 155 may set the IMS voice over PS session supported Indication. In an example, in order to set the IMS voice over PS session supported indication, the AMF 155 may perform a UE/RAN radio information and compatibility request procedure to check the compatibility of the UE 100 and RAN radio capabilities related to IMS voice over PS. In an example, the emergency service support indicator may inform the UE 100 that emergency services are supported, e.g., the UE 100 may request PDU session for emergency services. In an example, the handover restriction list and UE-AMBR may be provided to NG-RAN by the AMF 155.

In an example, the UE 100 may send to the new AMF 155 a registration complete 960 message. In an example, the UE 100 may send the registration complete message 960 to the AMF 155 to acknowledge that a new 5G-GUTI may be assigned. In an example, when information about the PDU session(s) to be re-activated is not included in the registration request, the AMF 155 may release the signaling connection with the UE 100. In an example, when the follow-on request is included in the registration request, the AMF 155 may not release the signaling connection after the completion of the registration procedure. In an example, if the AMF 155 is aware that some signaling is pending in the AMF 155 or between the UE 100 and the 5GC, the AMF 155 may not release the signaling connection after the completion of the registration procedure.

Figure 10:
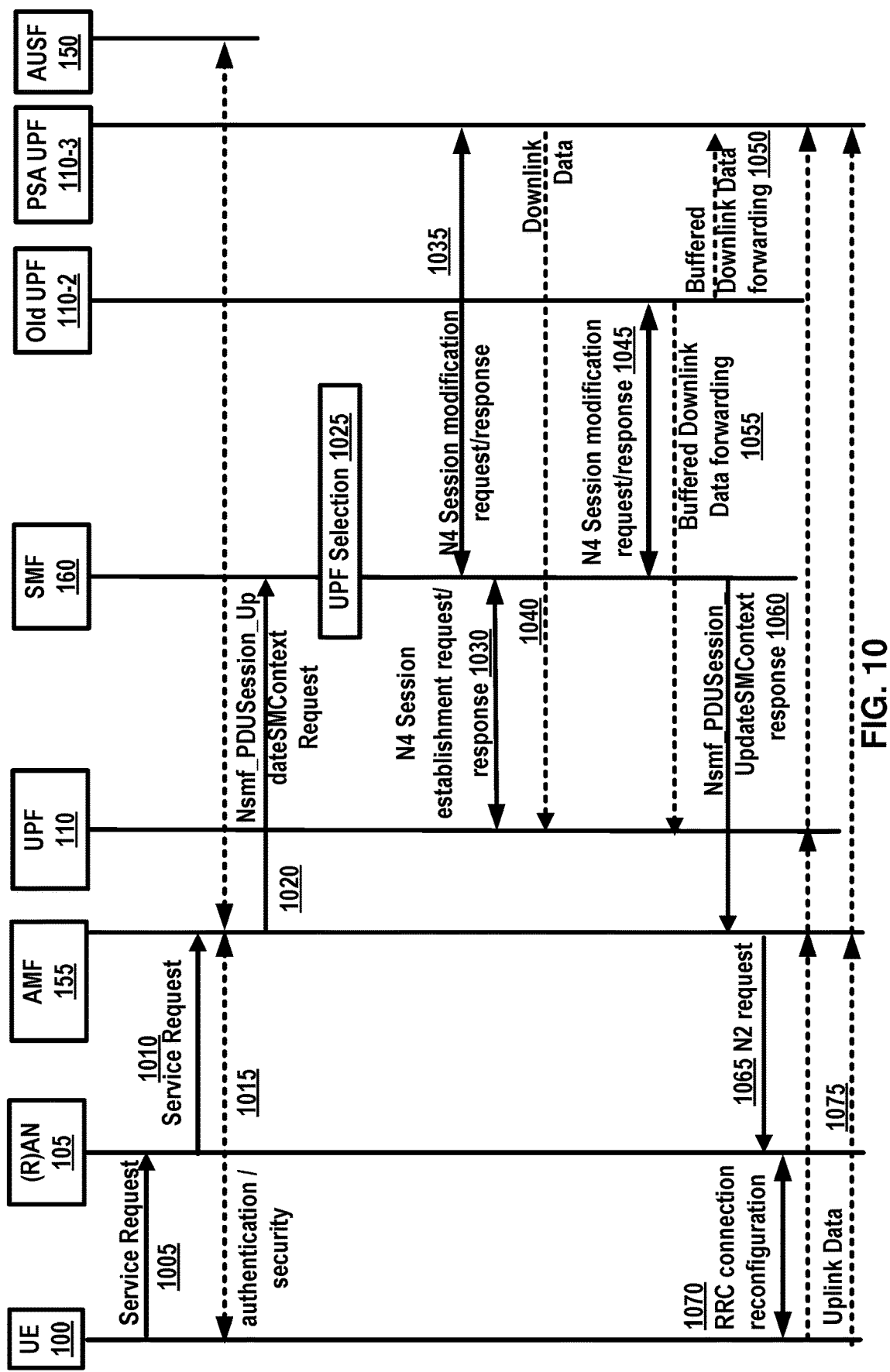
FIG. 10 is an example call flow as per an aspect of an embodiment of the present disclosure.
Figure 11:
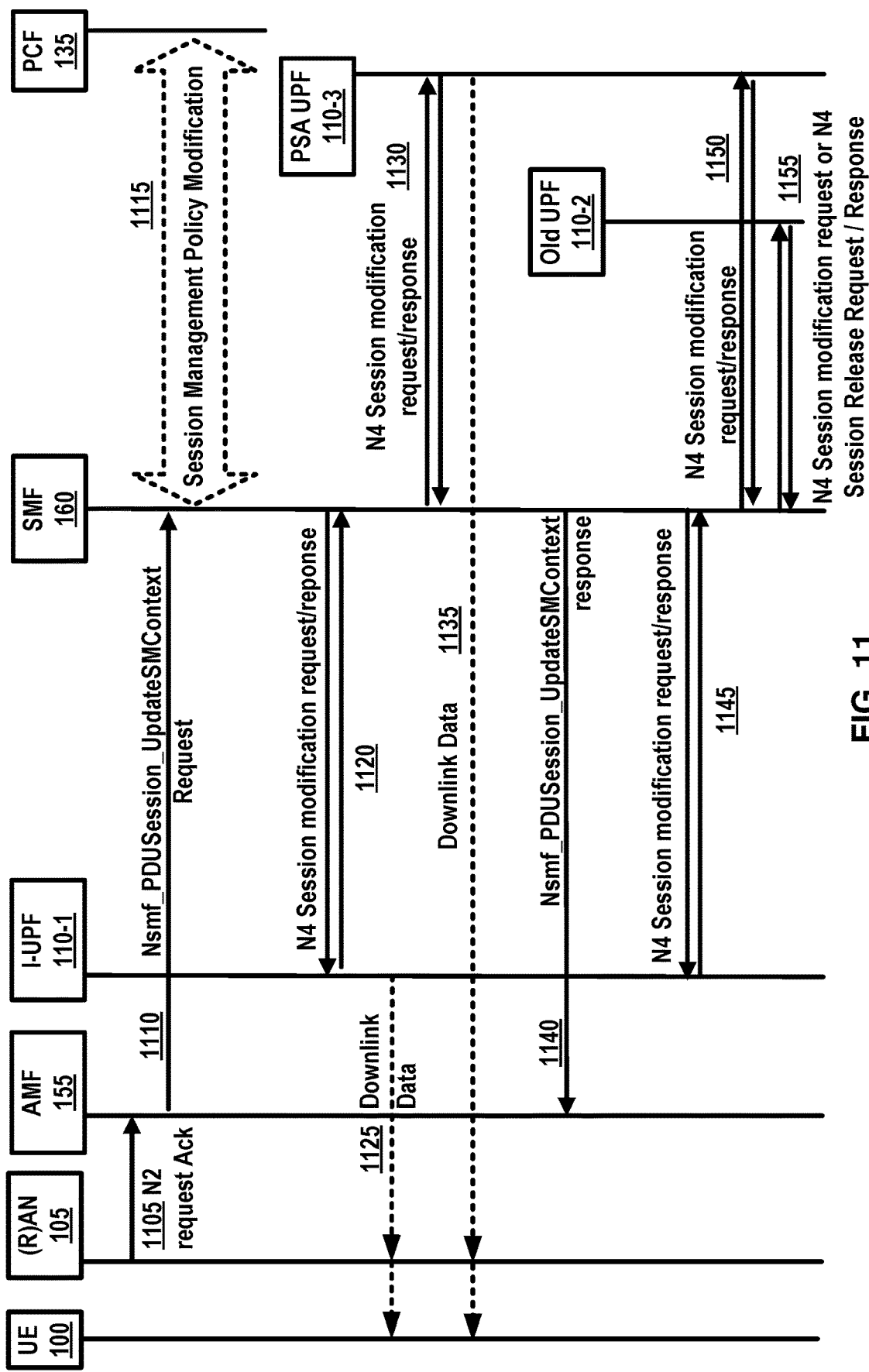
FIG. 11 is an example call flow as per an aspect of an embodiment of the present disclosure.

As depicted in example FIG. 10 and FIG. 11, a service request procedure e.g., a UE 100 triggered service request procedure may be used by a UE 100 in CM-IDLE state to request the establishment of a secure connection to an AMF 155. FIG. 11 is continuation of FIG. 10 depicting the service request procedure. The service request procedure may be used to activate a user plane connection for an established PDU session. The service request procedure may be triggered by the UE 100 or the 5GC, and may be used when the UE 100 is in CM-IDLE and/or in CM-CONNECTED and may allow selectively to activate user plane connections for some of the established PDU sessions.

In an example, a UE 100 in CM IDLE state may initiate the service request procedure to send uplink signaling messages, user data, and/or the like, as a response to a network paging request, and/or the like. In an example, after receiving the service request message, the AMF 155 may perform authentication. In an example, after the establishment of signaling connection to the AMF 155, the UE 100 or network may send signaling messages, e.g. PDU session establishment from the UE 100 to a SMF 160, via the AMF 155.

In an example, for any service request, the AMF 155 may respond with a service accept message to synchronize PDU session status between the UE 100 and network. The AMF 155 may respond with a service reject message to the UE 100, if the service request may not be accepted by the network. The service reject message may include an indication or cause code requesting the UE 100 to perform a registration update procedure. In an example, for service request due to user data, network may take further actions if user plane connection activation may not be successful. In an example FIG. 10 and FIG. 11, more than one UPF, e.g., old UPF 110-2 and PDU session Anchor PSA UPF 110-3 may be involved.

In an example, the UE 100 may send to a (R)AN 105 an AN message comprising AN parameters, mobility management, MM NAS service request 1005 (e.g., list of PDU sessions to be activated, list of allowed PDU sessions, security parameters, PDU session status, and/or the like), and/or the like. In an example, the UE 100 may provide the list of PDU sessions to be activated when the UE 100 may re-activate the PDU session(s). The list of allowed PDU sessions may be provided by the UE 100 when the service request may be a response of a paging or a NAS notification, and may identify the PDU sessions that may be transferred or associated to the access on which the service request may be sent. In an example, for the case of NG-RAN, the AN parameters may include selected PLMN ID, and an establishment cause. The establishment cause may provide the reason for requesting the establishment of an RRC connection. The UE 100 may send NAS service request message towards the AMF 155 encapsulated in an RRC message to the RAN 105.

In an example, if the service request may be triggered for user data, the UE 100 may identify, using the list of PDU sessions to be activated, the PDU session(s) for which the UP connections are to be activated in the NAS service request message. If the service request may be triggered for signaling, the UE 100 may not identify any PDU session(s). If this procedure may be triggered for paging response, and/or the UE 100 may have at the same time user data to be transferred, the UE 100 may identify the PDU session(s) whose UP connections may be activated in MM NAS service request message, by the list of PDU sessions to be activated.

In an example, if the service request over 3GPP access may be triggered in response to a paging indicating non-3GPP access, the NAS service request message may identify in the list of allowed PDU sessions the list of PDU sessions associated with the non-3GPP access that may be re-activated over 3GPP. In an example, the PDU session status may indicate the PDU sessions available in the UE 100. In an example, the UE 100 may not trigger the service request procedure for a PDU session corresponding to a LADN when the UE 100 may be outside the area of availability of the LADN. The UE 100 may not identify such PDU session(s) in the list of PDU sessions to be activated if the service request may be triggered for other reasons.

In an example, the (R)AN 105 may send to AMF 155 an N2 Message 1010 (e.g., a service request) comprising N2 parameters, MM NAS service request, and/or the like. The AMF 155 may reject the N2 message if it may not be able to handle the service request. In an example, if NG-RAN may be used, the N2 parameters may include the 5G-GUTI, selected PLMN ID, location information, RAT type, establishment cause, and/or the like. In an example, the 5G-GUTI may be obtained in RRC procedure and the (R)AN 105 may select the AMF 155 according to the 5G-GUTI. In an example, the location information and RAT type may relate to the cell in which the UE 100 may be camping. In an example, based on the PDU session status, the AMF 155 may initiate PDU session release procedure in the network for the PDU sessions whose PDU session ID(s) may be indicated by the UE 100 as not available.

In an example, if the service request was not sent integrity protected or integrity protection verification failed, the AMF 155 may initiate a NAS authentication/security procedure 1015.

In an example, if the UE 100 triggers the service request to establish a signaling connection, upon successful establishment of the signaling connection, the UE 100 and the network may exchange NAS signaling.

In an example the AMF 155 may send to the SMF 160 a PDU session update context request 1020 e.g., Nsmf_PDUSession_UpdateSMContext request comprising PDU session ID(s), Cause(s), UE 100 location information, access type, and/or the like.

In an example, the Nsmf_PDUSession_UpdateSMContext request may be invoked by the AMF 155 if the UE 100 may identify PDU session(s) to be activated in the NAS service request message. In an example, the Nsmf_PDUSession_UpdateSMContext request may be triggered by the SMF 160 wherein the PDU session(s) identified by the UE 100 may correlate to other PDU session ID(s) than the one triggering the procedure. In an example, the Nsmf_PDUSession_UpdateSMContext request may be triggered by the SMF 160 wherein the current UE 100 location may be outside the area of validity for the N2 information provided by the SMF 160 during a network triggered service request procedure. The AMF 155 may not send the N2 information provided by the SMF 160 during the network triggered service request procedure.

In an example, the AMF 155 may determine the PDU session(s) to be activated and may send an Nsmf_PDUSession_UpdateSMContext request to SMF 160(*s*) associated with the PDU session(s) with cause set to indicate establishment of user plane resources for the PDU session(s).

In an example, if the procedure may be triggered in response to paging indicating non-3GPP access, and the list of allowed PDU sessions provided by the UE 100 may not include the PDU session for which the UE 100 was paged, the AMF 155 may notify the SMF 160 that the user plane for the PDU session may not be re-activated. The service request procedure may succeed without re-activating the user plane of any PDU sessions, and the AMF 155 may notify the UE 100.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) keep the PDU session, may reject the activation of user plane connection for the PDU session and may inform the AMF 155. In an example, if the procedure may be triggered by a network triggered service request, the SMF 160 may notify the UPF 110 that originated the data notification to discard downlink data for the PDU sessions and/or to not provide further data notification messages. The SMF 160 may respond to the AMF 155 with an appropriate reject cause and the user plane activation of PDU session may be stopped.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) release the PDU session. The SMF 160 may locally release the PDU session and may inform the AMF 155 that the PDU session may be released. The SMF 160 may respond to the AMF 155 with an appropriate reject cause and the user plane Activation of PDU session may be stopped.

In an example, if the UP activation of the PDU session may be accepted by the SMF 160, based on the location info received from the AMF 155, the SMF 160 may check the UPF 110 Selection 1025 Criteria (e.g., slice isolation requirements, slice coexistence requirements, UPF's 110 dynamic load, UPF's 110 relative static capacity among UPFs supporting the same DNN, UPF 110 location available at the SMF 160, UE 100 location information, Capability of the UPF 110 and the functionality required for the particular UE 100 session. In an example, an appropriate UPF 110 may be selected by matching the functionality and features required for a UE 100, DNN, PDU session type (i.e. IPv4, IPv6, ethernet type or unstructured type) and if applicable, the static IP address/prefix, SSC mode selected for the PDU session, UE 100 subscription profile in UDM 140, DNAI as included in the PCC rules, local operator policies, S-NSSAI, access technology being used by the UE 100, UPF 110 logical topology, and/or the like), and may determine to perform one or more of the following: continue using the current UPF(s); may select a new intermediate UPF 110 (or add/remove an intermediate UPF 110), if the UE 100 has moved out of the service area of the UPF 110 that was previously connecting to the (R)AN 105, while maintaining the UPF(s) acting as PDU session anchor; may trigger re-establishment of the PDU session to perform relocation/reallocation of the UPF 110 acting as PDU session anchor, e.g. the UE 100 has moved out of the service area of the anchor UPF 110 which is connecting to RAN 105.

In an example, the SMF 160 may send to the UPF 110 (e.g., new intermediate UPF 110) an N4 session establishment request 1030. In an example, if the SMF 160 may select a new UPF 110 to act as intermediate UPF 110-2 for the PDU session, or if the SMF 160 may select to insert an intermediate UPF 110 for a PDU session which may not have an intermediate UPF 110-2, an N4 session establishment request 1030 message may be sent to the new UPF 110, providing packet detection, data forwarding, enforcement and reporting rules to be installed on the new intermediate UPF. The PDU session anchor addressing information (on N9) for this PDU session may be provided to the intermediate UPF 110-2.

In an example, if a new UPF 110 is selected by the SMF 160 to replace the old (intermediate) UPF 110-2, the SMF 160 may include a data forwarding indication. The data forwarding indication may indicate to the UPF 110 that a second tunnel endpoint may be reserved for buffered DL data from the old I-UPF.

In an example, the new UPF 110 (intermediate) may send to SMF 160 an N4 session establishment response message 1030. In case the UPF 110 may allocate CN tunnel info, the UPF 110 may provide DL CN tunnel info for the UPF 110 acting as PDU session anchor and UL CN tunnel info (e.g., CN N3 tunnel info) to the SMF 160. If the data forwarding indication may be received, the new (intermediate) UPF 110 acting as N3 terminating point may send DL CN tunnel info for the old (intermediate) UPF 110-2 to the SMF 160. The SMF 160 may start a timer, to release the resource in the old intermediate UPF 110-2.

In an example, if the SMF 160 may selects a new intermediate UPF 110 for the PDU session or may remove the old I-UPF 110-2, the SMF 160 may send N4 session modification request message 1035 to PDU session anchor, PSA UPF 110-3, providing the data forwarding indication and DL tunnel information from new intermediate UPF 110.

In an example, if the new intermediate UPF 110 may be added for the PDU session, the (PSA) UPF 110-3 may begin to send the DL data to the new I-UPF 110 as indicated in the DL tunnel information.

In an example, if the service request may be triggered by the network, and the SMF 160 may remove the old I-UPF 110-2 and may not replace the old I-UPF 110-2 with the new I-UPF 110, the SMF 160 may include the data forwarding indication in the request. The data forwarding indication may indicate to the (PSA) UPF 110-3 that a second tunnel endpoint may be reserved for buffered DL data from the old I-UPF 110-2. In this case, the PSA UPF 110-3 may begin to buffer the DL data it may receive at the same time from the N6 interface.

In an example, the PSA UPF 110-3 (PSA) may send to the SMF 160 an N4 session modification response 1035. In an example, if the data forwarding indication may be received, the PSA UPF 110-3 may become as N3 terminating point and may send CN DL tunnel info for the old (intermediate) UPF 110-2 to the SMF 160. The SMF 160 may start a timer, to release the resource in old intermediate UPF 110-2 if there is one.

In an example, the SMF 160 may send to the old UPF 110-2 an N4 session modification request 1045 (e.g., may comprise new UPF 110 address, new UPF 110 DL tunnel ID, and/or the like). In an example, if the service request may be triggered by the network, and/or the SMF 160 may remove the old (intermediate) UPF 110-2, the SMF 160 may send the N4 session modification request message to the old (intermediate) UPF 110-2, and may provide the DL tunnel information for the buffered DL data. If the SMF 160 may allocate new I-UPF 110, the DL tunnel information is from the new (intermediate) UPF 110 may act as N3 terminating point. If the SMF 160 may not allocate a new I-UPF 110, the DL tunnel information may be from the new UPF 110 (PSA) 110-3 acting as N3 terminating point. The SMF 160 may start a timer to monitor the forwarding tunnel. In an example, the old (intermediate) UPF 110-2 may send N4 session modification response message to the SMF 160.

In an example, if the I-UPF 110-2 may be relocated and forwarding tunnel was established to the new I-UPF 110, the old (intermediate) UPF 110-2 may forward its buffered data to the new (intermediate) UPF 110 acting as N3 terminating point. In an example, if the old I-UPF 110-2 may be removed and the new I-UPF 110 may not be assigned for the PDU session and forwarding tunnel may be established to the UPF 110 (PSA) 110-3, the old (intermediate) UPF 110-2 may forward its buffered data to the UPF 110 (PSA) 110-3 acting as N3 terminating point.

In an example, the SMF 160 may send to the AMF 155 an N11 message 1060 e.g., a Nsmf_PDUSession_UpdateSMContext response (comprising: N1 SM container (PDU session ID, PDU session re-establishment indication), N2 SM information (PDU session ID, QoS profile, CN N3 tunnel info, S-NSSAI), Cause), upon reception of the Nsmf_PDUSession_UpdateSMContext request with a cause including e.g., establishment of user plane resources. The SMF 160 may determine whether UPF 110 reallocation may be performed, based on the UE 100 location information, UPF 110 service area and operator policies. In an example, for a PDU session that the SMF 160 may determine to be served by the current UPF 110, e.g., PDU session anchor or intermediate UPF, the SMF 160 may generate N2 SM information and may send an Nsmf_PDUSession_UpdateSMContext response 1060 to the AMF 155 to establish the user plane(s). The N2 SM information may contain information that the AMF 155 may provide to the RAN 105. In an example, for a PDU session that the SMF 160 may determine as requiring a UPF 110 relocation for PDU session anchor UPF, the SMF 160 may reject the activation of UP of the PDU session by sending Nsmf_PDUSession_UpdateSMContext response that may contain N1 SM container to the UE 100 via the AMF 155. The N1 SM container may include the corresponding PDU session ID and PDU session re-establishment indication.

Upon reception of the Namf_EventExposure_Notify from the AMF 155 to the SMF 160, with an indication that the UE 100 is reachable, if the SMF 160 may have pending DL data, the SMF 160 may invoke the Namf_Communication_N1N2MessageTransfer service operation to the AMF 155 to establish the user plane(s) for the PDU sessions. In an example, the SMF 160 may resume sending DL data notifications to the AMF 155 in case of DL data.

In an example, the SMF 160 may send a message to the AMF 155 to reject the activation of UP of the PDU session by including a cause in the Nsmf_PDUSession_UpdateSMContext response if the PDU session may correspond to a LADN and the UE 100 may be outside the area of availability of the LADN, or if the AMF 155 may notify the SMF 160 that the UE 100 may be reachable for regulatory prioritized service, and the PDU session to be activated may not for a regulatory prioritized service; or if the SMF 160 may decide to perform PSA UPF 110-3 relocation for the requested PDU session.

In an example, the AMF 155 may send to the (R)AN 105 an N2 request message 1065 (e.g., N2 SM information received from SMF 160, security context, AMF 155 signaling connection ID, handover restriction list, MM NAS service accept, list of recommended cells/TAs/NG-RAN node identifiers). In an example, the RAN 105 may store the security context, AMF 155 signaling connection Id, QoS information for the QoS flows of the PDU sessions that may be activated and N3 tunnel IDs in the UE 100 RAN 105 context. In an example, the MM NAS service accept may include PDU session status in the AMF 155. If the activation of UP of a PDU session may be rejected by the SMF 160, the MM NAS service accept may include the PDU session ID and the reason why the user plane resources may not be activated (e.g. LADN not available). Local PDU session release during the session request procedure may be indicated to the UE 100 via the session Status.

In an example, if there are multiple PDU sessions that may involve multiple SMF 160s, the AMF 155 may not wait for responses from all SMF 160s before it may send N2 SM information to the UE 100. The AMF 155 may wait for all responses from the SMF 160s before it may send MM NAS service accept message to the UE 100.

In an example, the AMF 155 may include at least one N2 SM information from the SMF 160 if the procedure may be triggered for PDU session user plane activation. AMF 155 may send additional N2 SM information from SMF 160s in separate N2 message(s) (e.g. N2 tunnel setup request), if there is any. Alternatively, if multiple SMF 160s may be involved, the AMF 155 may send one N2 request message to (R)AN 105 after all the Nsmf_PDUSession_UpdateSMContext response service operations from all the SMF 160s associated with the UE 100 may be received. In such case, the N2 request message may include the N2 SM information received in one or more of the Nsmf_PDUSession_UpdateSMContext response and PDU session ID to enable AMF 155 to associate responses to relevant SMF 160.

In an example, if the RAN 105 (e.g., NG RAN) node may provide the list of recommended cells/TAs/NG-RAN node identifiers during the AN release procedure, the AMF 155 may include the information from the list in the N2 request. The RAN 105 may use this information to allocate the RAN 105 notification area when the RAN 105 may decide to enable RRC inactive state for the UE 100.

If the AMF 155 may receive an indication, from the SMF 160 during a PDU session establishment procedure that the UE 100 may be using a PDU session related to latency sensitive services, for any of the PDU sessions established for the UE 100 and the AMF 155 has received an indication from the UE 100 that may support the CM-CONNECTED with RRC inactive state, then the AMF 155 may include the UE's RRC inactive assistance information. In an example, the AMF 155 based on network configuration, may include the UE's RRC inactive assistance information.

In an example, the (R)AN 105 may send to the UE 100 a message to perform RRC connection reconfiguration 1070 with the UE 100 depending on the QoS information for all the QoS flows of the PDU sessions whose UP connections may be activated and data radio bearers. In an example, the user plane security may be established.

In an example, if the N2 request may include a MM NAS service accept message, the RAN 105 may forward the MM NAS service accept to the UE 100. The UE 100 may locally delete context of PDU sessions that may not be available in 5GC.

In an example, if the N1 SM information may be transmitted to the UE 100 and may indicate that some PDU session(s) may be re-established, the UE 100 may initiate PDU session re-establishment for the PDU session(s) that may be re-established after the service request procedure may be complete.

In an example, after the user plane radio resources may be setup, the uplink data from the UE 100 may be forwarded to the RAN 105. The RAN 105 (e.g., NG-RAN) may send the uplink data to the UPF 110 address and tunnel ID provided.

In an example, the (R)AN 105 may send to the AMF 155 an N2 request Ack 1105 (e.g., N2 SM information (comprising: AN tunnel info, list of accepted QoS flows for the PDU sessions whose UP connections are activated, list of rejected QoS flows for the PDU sessions whose UP connections are activated)). In an example, the N2 request message may include N2 SM information(s), e.g. AN tunnel info. RAN 105 may respond N2 SM information with separate N2 message (e.g. N2 tunnel setup response). In an example, if multiple N2 SM information are included in the N2 request message, the N2 request Ack may include multiple N2 SM information and information to enable the AMF 155 to associate the responses to relevant SMF 160.

In an example, the AMF 155 may send to the SMF 160 a Nsmf_PDUSession_UpdateSMContext request 1110 (N2 SM information (AN tunnel info), RAT type) per PDU session. If the AMF 155 may receive N2 SM information (one or multiple) from the RAN 105, then the AMF 155 may forward the N2 SM information to the relevant SMF 160. If the UE 100 time zone may change compared to the last reported UE 100 Time Zone then the AMF 155 may include the UE 100 time zone IE in the Nsmf_PDUSession_UpdateSMContext request message.

In an example, if dynamic PCC is deployed, the SMF 160 may initiate notification about new location information to the PCF 135 (if subscribed) by invoking an event exposure notification operation (e.g., a Nsmf_EventExposure_Notify service operation). The PCF 135 may provide updated policies by invoking a policy control update notification message 1115 (e.g., a Npcf_SMPolicyControl_UpdateNotify operation).

In an example, if the SMF 160 may select a new UPF 110 to act as intermediate UPF 110 for the PDU session, the SMF 160 may initiates an N4 session modification procedure 1120 to the new I-UPF 110 and may provide AN tunnel info. The downlink data from the new I-UPF 110 may be forwarded to RAN 105 and UE 100. In an example, the UPF 110 may send to the SMF 160, an N4 session modification response 1120. In an example, the SMF 160 may send to the AMF 155, an Nsmf_PDUSession_UpdateSMContext response 1140.

In an example, if forwarding tunnel may be established to the new I-UPF 110 and if the timer SMF 160 set for forwarding tunnel may be expired, the SMF 160 may sends N4 session modification request 1145 to new (intermediate) UPF 110 acting as N3 terminating point to release the forwarding tunnel. In an example, the new (intermediate) UPF 110 may send to the SMF 160 an N4 session modification response 1145. In an example, the SMF 160 may send to the PSA UPF 110-3 an N4 session modification request 1150, or N4 session release request. In an example, if the SMF 160 may continue using the old UPF 110-2, the SMF 160 may send an N4 session modification request 1155, providing AN tunnel info. In an example, if the SMF 160 may select a new UPF 110 to act as intermediate UPF 110, and the old UPF 110-2 may not be PSA UPF 110-3, the SMF 160 may initiate resource release, after timer expires, by sending an N4 session release request (release cause) to the old intermediate UPF 110-2.

In an example, the old intermediate UPF 110-2 may send to the SMF 160 an N4 session modification response or N4 session release response 1155. The old UPF 110-2 may acknowledge with the N4 session modification response or N4 session release response message to confirm the modification or release of resources. The AMF 155 may invoke the Namf_EventExposure_Notify service operation to notify the mobility related events, after this procedure may complete, towards the NFs that may have subscribed for the events. In an example, the AMF 155 may invoke the Namf_EventExposure_Notify towards the SMF 160 if the SMF 160 had subscribed for UE 100 moving into or out of area of interest and if the UE's current location may indicate that it may be moving into or moving outside of the area of interest subscribed, or if the SMF 160 had subscribed for LADN DNN and if the UE 100 may be moving into or outside of an area where the LADN is available, or if the UE 100 may be in MICO mode and the AMF 155 had notified an SMF 160 of the UE 100 being unreachable and that SMF 160 may not send DL data notifications to the AMF 155, and the AMF 155 may informs the SMF 160 that the UE 100 is reachable, or if the SMF 160 had subscribed for UE 100 reachability status, then the AMF 155 may notify the UE 100 reachability.

Figure 12:
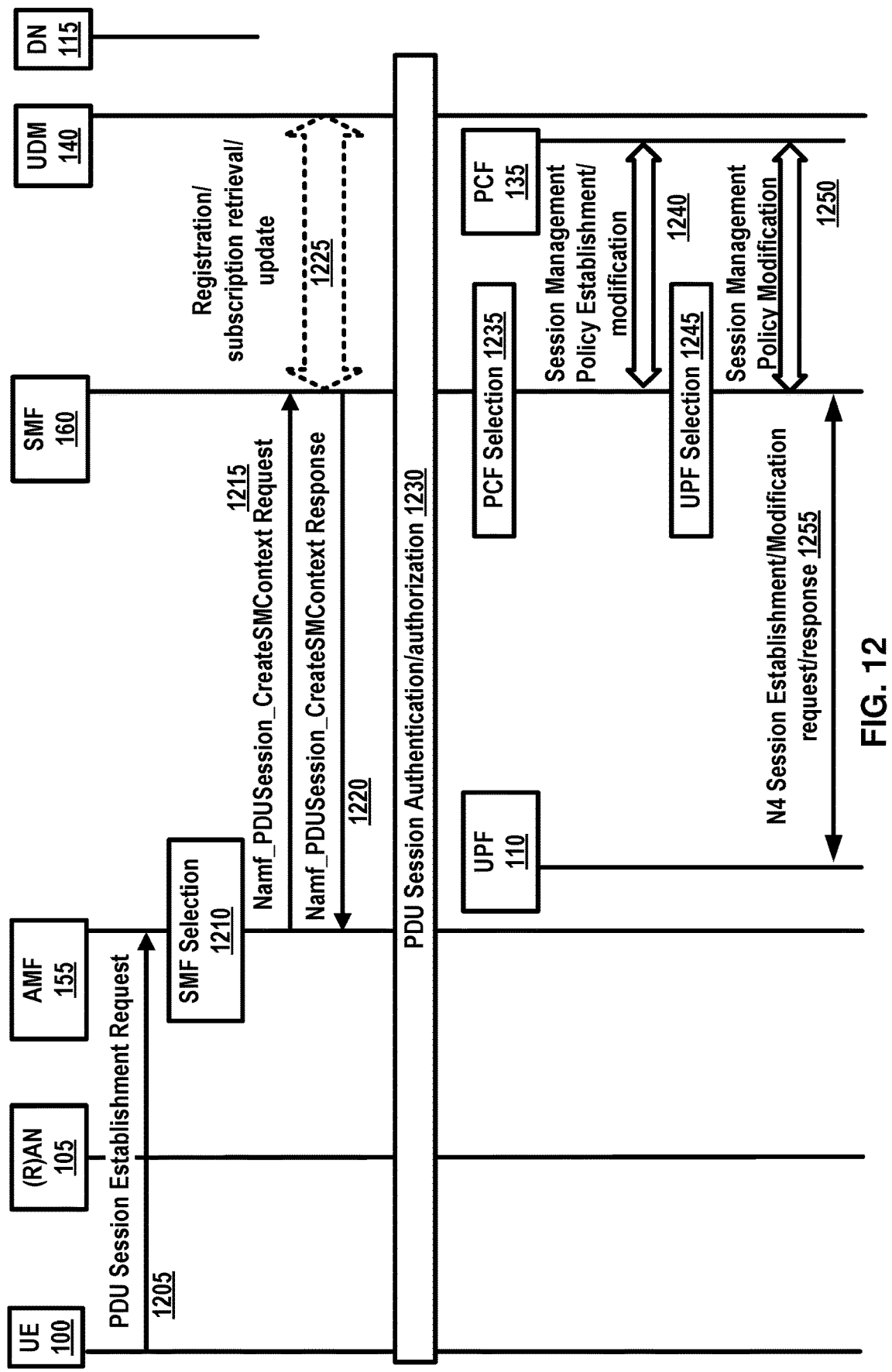
FIG. 12 is an example call flow as per an aspect of an embodiment of the present disclosure.
Figure 13:
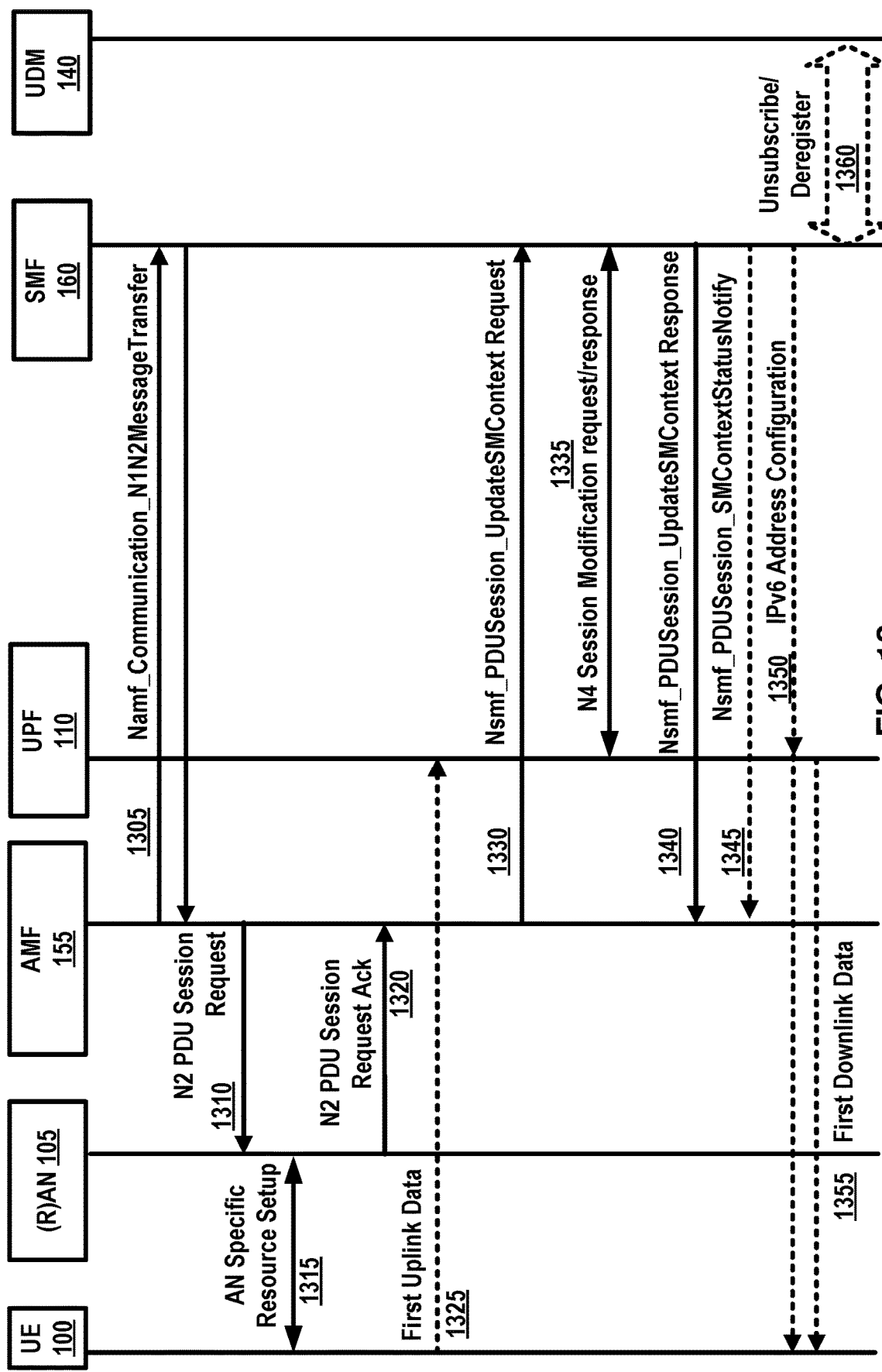
FIG. 13 is an example call flow as per an aspect of an embodiment of the present disclosure.

An example PDU session establishment procedure depicted in FIG. 12 and FIG. 13. In an example embodiment, when the PDU session establishment procedure may be employed, the UE 100 may send to the AMF 155 a NAS Message 1205 (or a SM NAS message) comprising NSSAI, S-NSSAI (e.g., requested S-NSSAI, allowed S-NSSAI, subscribed S-NSSAI, and/or the like), DNN, PDU session ID, request type, old PDU session ID, N1 SM container (PDU session establishment request), and/or the like. In an example, the UE 100, in order to establish a new PDU session, may generate a new PDU session ID. In an example, when emergency service may be required and an emergency PDU session may not already be established, the UE 100 may initiate the UE 100 requested PDU session establishment procedure with a request type indicating emergency request. In an example, the UE 100 may initiate the UE 100 requested PDU session establishment procedure by the transmission of the NAS message containing a PDU session establishment request within the N1 SM container. The PDU session establishment request may include a PDU type, SSC mode, protocol configuration options, and/or the like. In an example, the request type may indicate initial request if the PDU session establishment is a request to establish the new PDU session and may indicate existing PDU session if the request refers to an existing PDU session between 3GPP access and non-3GPP access or to an existing PDN connection in EPC. In an example, the request type may indicate emergency request if the PDU session establishment may be a request to establish a PDU session for emergency services. The request type may indicate existing emergency PDU session if the request refers to an existing PDU session for emergency services between 3GPP access and non-3GPP access. In an example, the NAS message sent by the UE 100 may be encapsulated by the AN in a N2 message towards the AMF 155 that may include user location information and access technology type information. In an example, the PDU session establishment request message may contain SM PDU DN request container containing information for the PDU session authorization by the external DN. In an example, if the procedure may be triggered for SSC mode 3 operation, the UE 100 may include the old PDU session ID which may indicate the PDU session ID of the on-going PDU session to be released, in the NAS message. The old PDU session ID may be an optional parameter which may be included in this case. In an example, the AMF 155 may receive from the AN the NAS message (e.g., NAS SM message) together with user location information (e.g. cell ID in case of the RAN 105). In an example, the UE 100 may not trigger a PDU session establishment for a PDU session corresponding to a LADN when the UE 100 is outside the area of availability of the LADN.

In an example, the AMF 155 may determine that the NAS message or the SM NAS message may correspond to the request for the new PDU session based on that request type indicates initial request and that the PDU session ID may not be used for any existing PDU session(s) of the UE 100. If the NAS message does not contain an S-NSSAI, the AMF 155 may determine a default S-NSSAI for the requested PDU session either according to the UE 100 subscription, if it may contain only one default S-NSSAI, or based on operator policy. In an example, the AMF 155 may perform SMF 160 selection 1210 and select an SMF 160. If the request type may indicate initial request or the request may be due to handover from EPS, the AMF 155 may store an association of the S-NSSAI, the PDU session ID and a SMF 160 ID. In an example, if the request type is initial request and if the old PDU session ID indicating the existing PDU session may be contained in the message, the AMF 155 may select the SMF 160 and may store an association of the new PDU session ID and the selected SMF 160 ID.

In an example, the AMF 155 may send to the SMF 160, an N11 message 1215, e.g., Nsmf_PDUSession_CreateSM-Context request (comprising: SUPI or PEI, DNN, S-NSSAI, PDU session ID, AMF 155 ID, request type, N1 SM container (PDU session establishment request), user location information, access type, PEI, GPSI), or Nsmf_PDUSession_UpdateSMContext request (SUPI, DNN, S-NSSAI, PDU session ID, AMF 155 ID, request type, N1 SM container (PDU session establishment request), user location information, access type, RAT type, PEI). In an example, if the AMF 155 may not have an association with the SMF 160 for the PDU session ID provided by the UE 100 (e.g. when request type indicates initial request), the AMF 155 may invoke the Nsmf_PDUSession_CreateSMContext request, but if the AMF 155 already has an association with an SMF 160 for the PDU session ID provided by the UE 100 (e.g. when request type indicates existing PDU session), the AMF 155 may invoke the Nsmf_PDUSession_UpdateSMContext request. In an example, the AMF 155 ID may be the UE's GUAMI which uniquely identifies the AMF 155 serving the UE 100. The AMF 155 may forward the PDU session ID together with the N1 SM container containing the PDU session establishment request received from the UE 100. The AMF 155 may provide the PEI instead of the SUPI when the UE 100 has registered for emergency services without providing the SUPI. In case the UE 100 has registered for emergency services but has not been authenticated, the AMF 155 may indicate that the SUPI has not been authenticated.

In an example, if the request type may indicate neither emergency request nor existing emergency PDU session and, if the SMF 160 has not yet registered and subscription data may not be available, the SMF 160 may register with the UDM 140, and may retrieve subscription data 1225 and subscribes to be notified when subscription data may be modified. In an example, if the request type may indicate existing PDU session or existing emergency PDU session, the SMF 160 may determine that the request may be due to handover between 3GPP access and non-3GPP access or due to handover from EPS. The SMF 160 may identify the existing PDU session based on the PDU session ID. The SMF 160 may not create a new SM context but instead may update the existing SM context and may provide the representation of the updated SM context to the AMF 155 in the response. if the request type may be initial request and if the old PDU session ID may be included in Nsmf_PDUSession_CreateSMContext request, the SMF 160 may identify the existing PDU session to be released based on the old PDU session ID.

In an example, the SMF 160 may send to the AMF 155, the N11 message response 1220, e.g., either a PDU session create/update response, Nsmf_PDUSession_CreateSMContext response 1220 (cause, SM context ID or N1 SM container (PDU session reject(cause))) or an Nsmf_PDUSession_UpdateSMContext response.

In an example, if the SMF 160 may perform secondary authorization/authentication 1230 during the establishment of the PDU session by a DN-AAA server, the SMF 160 may select a UPF 110 and may trigger a PDU session establishment authentication/authorization.

In an example, if the request type may indicate initial request, the SMF 160 may select an SSC mode for the PDU session. The SMF 160 may select one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For Unstructured PDU type the SMF 160 may allocate an IPv6 prefix for the PDU session and N6 point-to-point tunneling (based on UDP/IPv6).

In an example, if dynamic PCC is deployed, the may SMF 160 performs PCF 135 selection 1235. If the request type indicates existing PDU session or existing emergency PDU session, the SMF 160 may use the PCF 135 already selected for the PDU session. If dynamic PCC is not deployed, the SMF 160 may apply local policy.

In an example, the SMF 160 may perform a session management policy establishment procedure 1240 to establish a PDU session with the PCF 135 and may get the default PCC Rules for the PDU session. The GPSI may be included if available at the SMF 160. If the request type in 1215 indicates existing PDU session, the SMF 160 may notify an event previously subscribed by the PCF 135 by a session management policy modification procedure and the PCF 135 may update policy information in the SMF 160. The PCF 135 may provide authorized session-AMBR and the authorized 5QI and ARP to SMF 160. The PCF 135 may subscribe to the IP allocation/release event in the SMF 160 (and may subscribe other events).

In an example, the PCF 135, based on the emergency DNN, may set the ARP of the PCC rules to a value that may be reserved for emergency services.

In an example, if the request type in 1215 indicates initial request, the SMF 160 may select an SSC mode for the PDU session. The SMF 160 may select 1245 one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For unstructured PDU type the SMF 160 may allocate an IPv6 prefix for the PDU session and N6 point-to-point tunneling (e.g., based on UDP/IPv6). In an example, for Ethernet PDU type PDU session, neither a MAC nor an IP address may be allocated by the SMF 160 to the UE 100 for this PDU session.

In an example, if the request type in 1215 is existing PDU session, the SMF 160 may maintain the same IP address/prefix that may be allocated to the UE 100 in the source network.

In an example, if the request type in 1215 indicates existing PDU session referring to an existing PDU session moved between 3GPP access and non-3GPP access, the SMF 160 may maintain the SSC mode of the PDU session, e.g., the current PDU session Anchor and IP address. In an example, the SMF 160 may trigger e.g. new intermediate UPF 110 insertion or allocation of a new UPF 110. In an example, if the request type indicates emergency request, the SMF 160 may select 1245 the UPF 110 and may select SSC mode 1.

In an example, the SMF 160 may perform a session management policy modification 1250 procedure to report some event to the PCF 135 that has previously subscribed. If request type is initial request and dynamic PCC is deployed and PDU type is IPv4 or IPv6, the SMF 160 may notify the PCF 135 (that has previously subscribed) with the allocated UE 100 IP address/prefix.

In an example, the PCF 135 may provide updated policies to the SMF 160. The PCF 135 may provide authorized session-AMBR and the authorized 5QI and ARP to the SMF 160.

In an example, if request type indicates initial request, the SMF 160 may initiate an N4 session establishment procedure 1255 with the selected UPF 110. The SMF 160 may initiate an N4 session modification procedure with the selected UPF 110. In an example, the SMF 160 may send an N4 session establishment/modification request 1255 to the UPF 110 and may provide packet detection, enforcement, reporting rules, and/or the like to be installed on the UPF 110 for this PDU session. If CN tunnel info is allocated by the SMF 160, the CN tunnel info may be provided to the UPF 110. If the selective user plane deactivation is required for this PDU session, the SMF 160 may determine the Inactivity Timer and may provide it to the UPF 110. In an example, the UPF 110 may acknowledges by sending an N4 session establishment/modification response 1255. If CN tunnel info is allocated by the UPF, the CN tunnel info may be provided to SMF 160. In an example, if multiple UPFs are selected for the PDU session, the SMF 160 may initiate N4 session establishment/modification procedure 1255 with one or more UPF 110 of the PDU session.

In an example, the SMF 160 may send to the AMF 155 an Namf_Communication_N1N2MessageTransfer 1305 message (comprising PDU session ID, access type, N2 SM information (PDU session ID, QFI(s), QoS profile(s), CN tunnel info, S-NSSAI, session-AMBR, PDU session type, and/or the like), N1 SM container (PDU session establishment accept (QoS Rule(s), selected SSC mode, S-NSSAI, allocated IPv4 address, interface identifier, session-AMBR, selected PDU session type, and/or the like))). In case of multiple UPFs are used for the PDU session, the CN tunnel info may comprise tunnel information related with the UPF 110 that terminates N3. In an example, the N2 SM information may carry information that the AMF 155 may forward to the (R)AN 105 (e.g., the CN tunnel info corresponding to the core network address of the N3 tunnel corresponding to the PDU session, one or multiple QoS profiles and the corresponding QFIs may be provided to the (R)AN 105, the PDU session ID may be used by AN signaling with the UE 100 to indicate to the UE 100 the association between AN resources and a PDU session for the UE 100, and/or the like). In an example, a PDU session may be associated to an S-NSSAI and a DNN. In an example, the N1 SM container may contain the PDU session establishment accept that the AMF 155 may provide to the UE 100. In an example, multiple QoS rules and QoS profiles may be included in the PDU session establishment accept within the N1 SM and in the N2 SM information. In an example, the Namf_Communication_N1N2MessageTransfer 1305 may further comprise the PDU session ID and information allowing the AMF 155 to know which access towards the UE 100 to use.

In an example, the AMF 155 may send to the (R)AN 105 an N2 PDU session request 1310 (comprising N2 SM information, NAS message (PDU session ID, N1 SM container (PDU session establishment accept, and/or the like))). In an example, the AMF 155 may send the NAS message 1310 that may comprise PDU session ID and PDU session establishment accept targeted to the UE 100 and the N2 SM information received from the SMF 160 within the N2 PDU session request 1310 to the (R)AN 105.

In an example, the (R)AN 105 may issue AN specific signaling exchange 1315 with the UE 100 that may be related with the information received from SMF 160. In an example, in case of a 3GPP RAN 105, an RRC connection reconfiguration procedure may take place with the UE 100 to establish the necessary RAN 105 resources related to the QoS Rules for the PDU session request 1310. In an example, (R)AN 105 may allocate (R)AN 105 N3 tunnel information for the PDU session. In case of dual connectivity, the master RAN 105 node may assign some (zero or more) QFIs to be setup to a master RAN 105 node and others to the secondary RAN 105 node. The AN tunnel info may comprise a tunnel endpoint for one or more involved RAN 105 nodes, and the QFIs assigned to one or more tunnel endpoints. A QFI may be assigned to either the master RAN 105 node or the secondary RAN 105 node. In an example, (R)AN 105 may forward the NAS message 1310 (PDU session ID, N1 SM container (PDU session establishment accept)) to the UE 100. The (R)AN 105 may provide the NAS message to the UE 100 if the necessary RAN 105 resources are established and the allocation of (R)AN 105 tunnel information are successful.

In an example, the N2 PDU session response 1320 may comprise a PDU session ID, cause, N2 SM information (PDU session ID, AN tunnel info, list of accepted/rejected QFI(s)), and/or the like. In an example, the AN tunnel info may correspond to the access network address of the N3 tunnel corresponding to the PDU session.

In an example, the AMF 155 may forward the N2 SM information received from (R)AN 105 to the SMF 160 via a Nsmf_PDUSession_UpdateSMContext request 1330 (comprising: N2 SM information, request type, and/or the like). In an example, if the list of rejected QFI(s) is included in N2 SM information, the SMF 160 may release the rejected QFI(s) associated QoS profiles.

In an example, the SMF 160 may initiate an N4 session modification procedure 1335 with the UPF 110. The SMF 160 may provide AN tunnel info to the UPF 110 as well as the corresponding forwarding rules. In an example, the UPF 110 may provide an N4 session modification response 1335 to the SMF 160.

In an example, the SMF 160 may send to the AMF 155 an Nsmf_PDUSession_UpdateSMContext response 1340 (Cause). In an example, the SMF 160 may subscribe to the UE 100 mobility event notification from the AMF 155 (e.g. location reporting, UE 100 moving into or out of area of interest), after this step by invoking Namf_Event Exposure_Subscribe service operation. For LADN, the SMF 160 may subscribe to the UE 100 moving into or out of LADN service area event notification by providing the LADN DNN as an indicator for the area of interest. The AMF 155 may forward relevant events subscribed by the SMF 160.

In an example, the SMF 160 may send to the AMF 155, a Nsmf_PDUSession_SMContextStatusNotify (release) 1345. In an example, if during the procedure, any time the PDU session establishment is not successful, the SMF 160 may inform the AMF 155 by invoking Nsmf_PDUSession_SMContextStatusNotify(release) 1345. The SMF 160 may releases any N4 session(s) created, any PDU session address if allocated (e.g. IP address) and may release the association with the PCF 135.

In an example, in case of PDU type IPv6, the SMF 160 may generate an IPv6 Router Advertisement 1350 and may send it to the UE 100 via N4 and the UPF 110.

In an example, if the PDU session may not be established, the SMF 160 may unsubscribe 1360 to the modifications of session management subscription data for the corresponding (SUPI, DNN, S-NSSAI), using Nudm_SDM_Unsubscribe (SUPI, DNN, S-NSSAI), if the SMF 160 is no more handling a PDU session of the UE 100 for this (DNN, S-NSSAI). In an example, if the PDU session may not be established, the SMF 160 may deregister 1360 for the given PDU session using Nudm_UECM_Deregistration (SUPI, DNN, PDU session ID).

Figure 14:
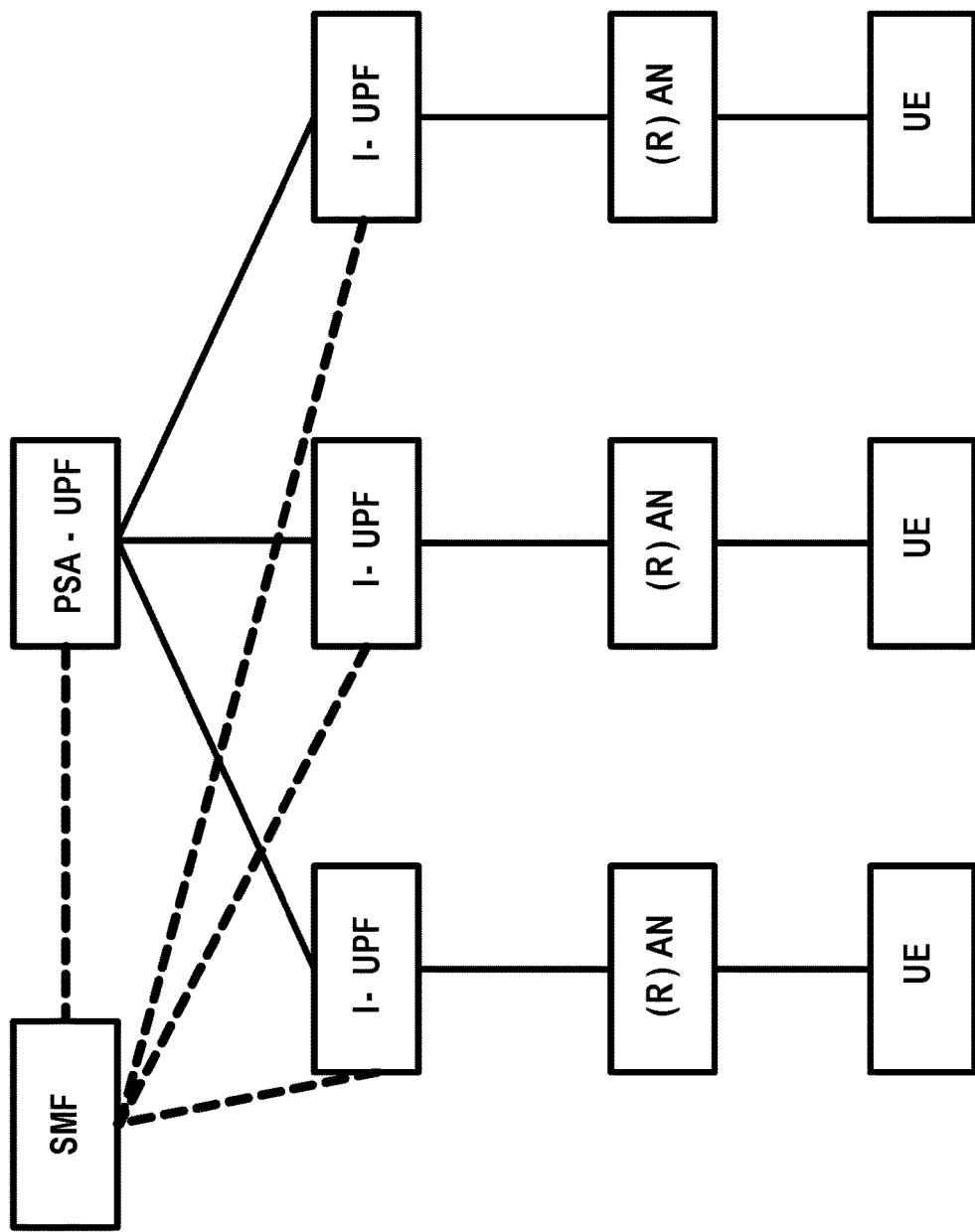
FIG. 14 is an example diagram as per an aspect of an embodiment of the present disclosure.

In an example, a wireless communication system (e.g., 5GS, 3GPP system, 3GPP communication system, 4G, LTE, and/or the like) may support 5G LAN communication. A 5GLAN group communication session may be identified by a tuple of S-NSSAI and/or DNN. In an example, the 5GLAN group may be identified by a group identifier, VLAN ID, DNN, S-NSSAI, and/or the like. In case of supporting VLAN tags for 5G LAN communications, the 5G LAN group communication session may be identified by a tuple of S-NSSAI, DNN and VLAN Tag. In an example, the 5G LAN group, 5G LAN group communication session, and/or the like may be identified by an identifier of a group (e.g., a group id, internal group id, external group id, a group index, group information, and/or the like). In an example, a PDU session, a PDU session establishment, and/or the like may be employed for the 5G LAN group communication session. The PDU session establishment may employ the tuple of S-NSSAI, DNN, a group id, and/or the like. In an example, area restriction of the 5G LAN service may be done by configuring a DNN as the LADN DNN with LADN service area (e.g., a list of tracking areas, and/or the like). In an example, a UE may connect to a virtual network that may connect one or more UEs within the group as depicted in example FIG. 14. As depicted in Example FIG. 14, same SMF (one common SMF) may be employed for the group communication session. In an example, a data network may be employed for group communication. In an example, a PDU session anchor UPF (PSA-UPF) may be employed to transmission/sending/receiving/forwarding of 5G LAN communication packets. The PSA-UPF may enforce group AMBR, group quota, individual UE's AMBR or QoS enforcement, and/or the like. The PSA-UPF may be functionally/logically/physically collocated with an intermediate UPF (I-UPF). The SMF may manage/check/determine one or more established and/or activated PDU sessions.

Figure 15:
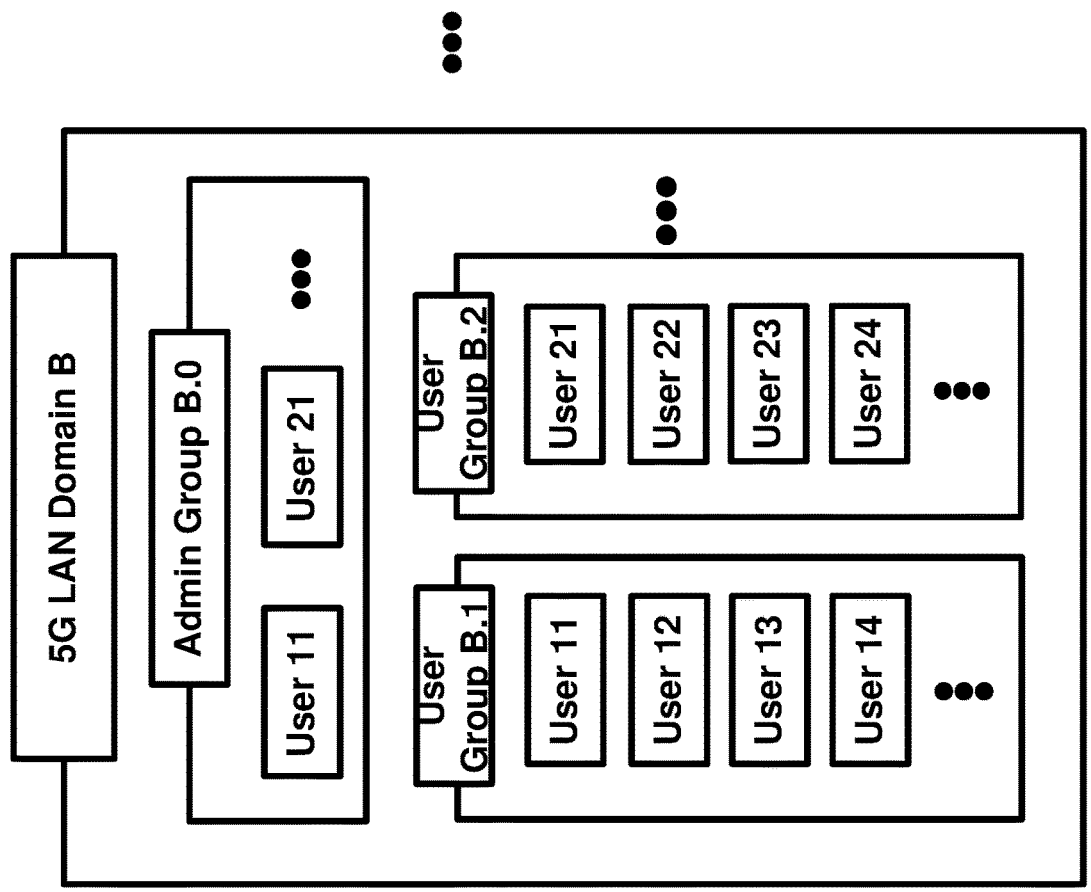
FIG. 15 is an example diagram as per an aspect of an embodiment of the present disclosure.
Figure 15:
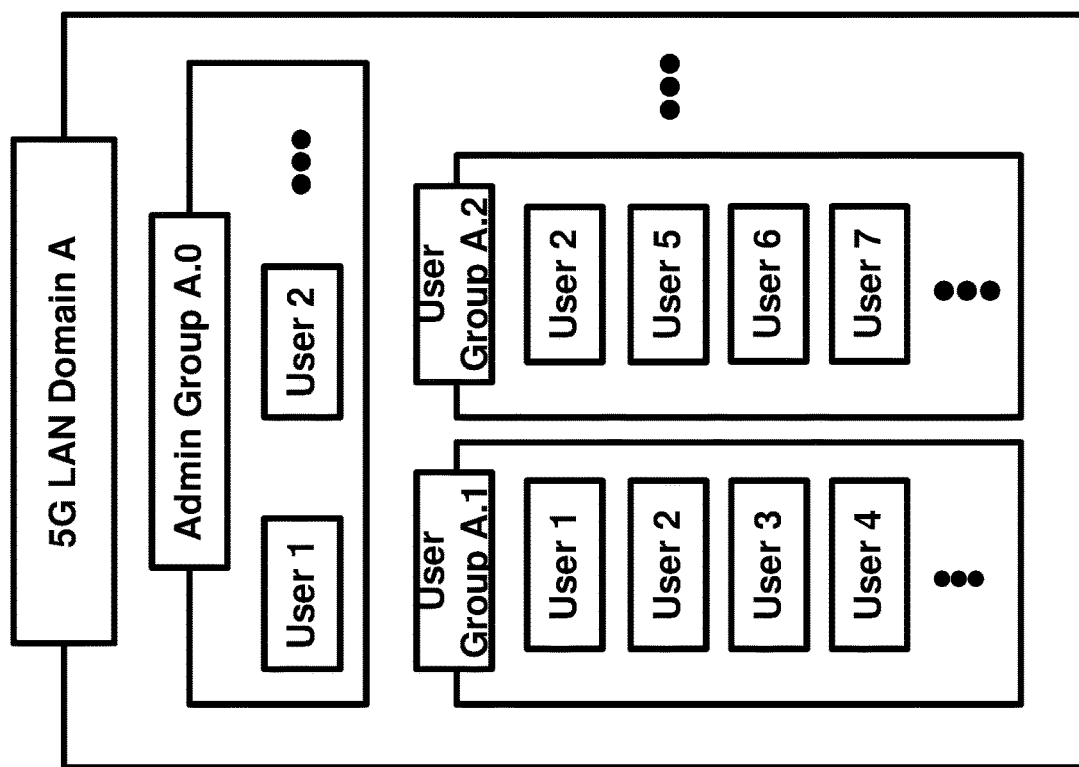

In an example as depicted in FIG. 15, an admin user (e.g., administrator, a UE which belongs to a 5GLAN admin group, and/or the like) may request addition/deletion of a 5GLAN user group and add (or delete) a member to the 5GLAN user group. A UE may belong to one or more groups and the subscription data for the UE in a UDR may associate the subscriber with groups. In an example, an internal group identifier in the UDR may identify a group. A group management may be a management functionality on manipulating the UDR records. For example, creating a group with list of group members may be implemented as creating a record of group subscription data. In an example, addition, adding or deleting a member in the group may be defined as adding or deleting a SUPI in the group subscription data. A domain may be a logical administrative area within which a member of the admin group may manage the user groups and their membership. A domain may be employed to refer a tenant (e.g., a customer of 5G LAN service provided by an operator). A domain may comprise a domain identifier, an admin group identifier, one or more group identifiers, and/or the like.

An example FIG. 15, depicts the relationship of domain, admin group and user group for 5G LAN group. A domain may comprise an admin group and one or more user groups. A user in the admin group may manage the user group and membership of the admin/user group in the domain and manage (e.g., provision, activate, deactivate, and/or the like) the 5GLAN communication session. A user may belong to one or more groups (e.g., a user 2 may be a member of admin group, a member of user group A.1 and a member of user group A.2 as depicted in example FIG. 15.

Figure 16:
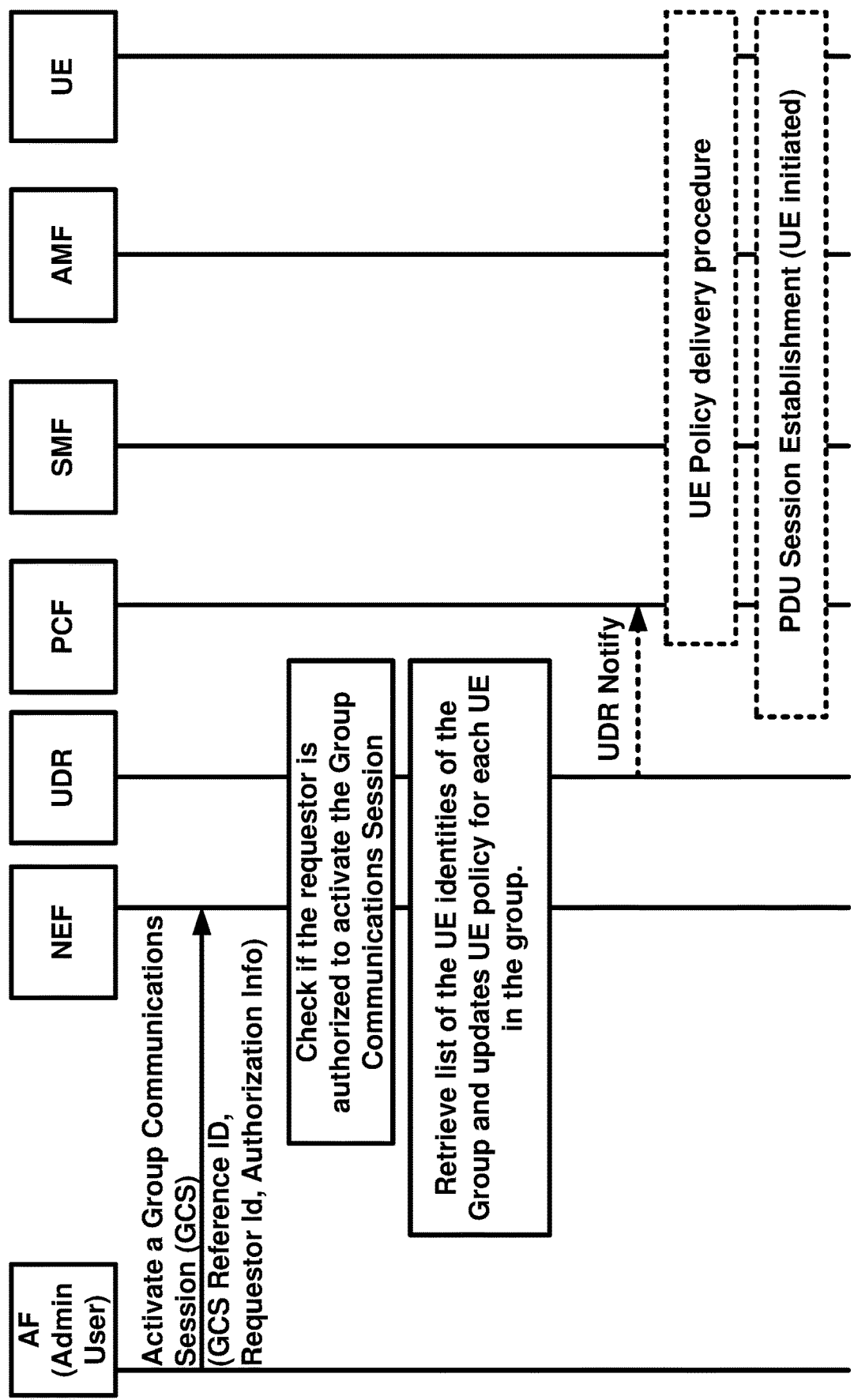
FIG. 16 is an example call flow as per an aspect of an embodiment of the present disclosure.

In an example embodiment as depicted in FIG. 16, an AF (e.g., an admin subscriber, and/or the like) may request an NEF to activate a group communication session. The request may comprise a UE identifier of the requestor, a requestor id, and/or the like with an authorization information. The NEF may check if the requestor is authorized to activate the group communication session. The NEF may retrieve a list of the UE identifiers of the group and may update the UE policy for one or more UE(s) in the group. A UDR may notify a PCF for updating the policy data since the PCF subscribed the UDR on the change of the policy data. The PCF may initiate a UE policy delivery procedure e.g., delivery of a UE route selection policy (URSP). In order for the UE to establish the PDU session after the UE policy is delivered, the URSP may comprise a policy enforcement parameter that may indicate a request for establishment of the PDU session. The UE may receive the UE policy and if the UE policy includes the establishment request of the PDU session, the UE may perform a PDU session establishment procedure with the configured parameters as encoded as route selection components in the URSP rules.

In an example, for one to many communication in a virtual network group, during the UE policy delivery procedure, the SMF may allocate a multicast information, multicast address, and or the like for the group. The URSP may comprise the multicast address and the UE may be configured to send data to the multicast address when determining to send data for the group communication. The multicast information may further comprise a set of wireless device identifiers in a group, an identifier of the group, and/or the like.

Figure 17:
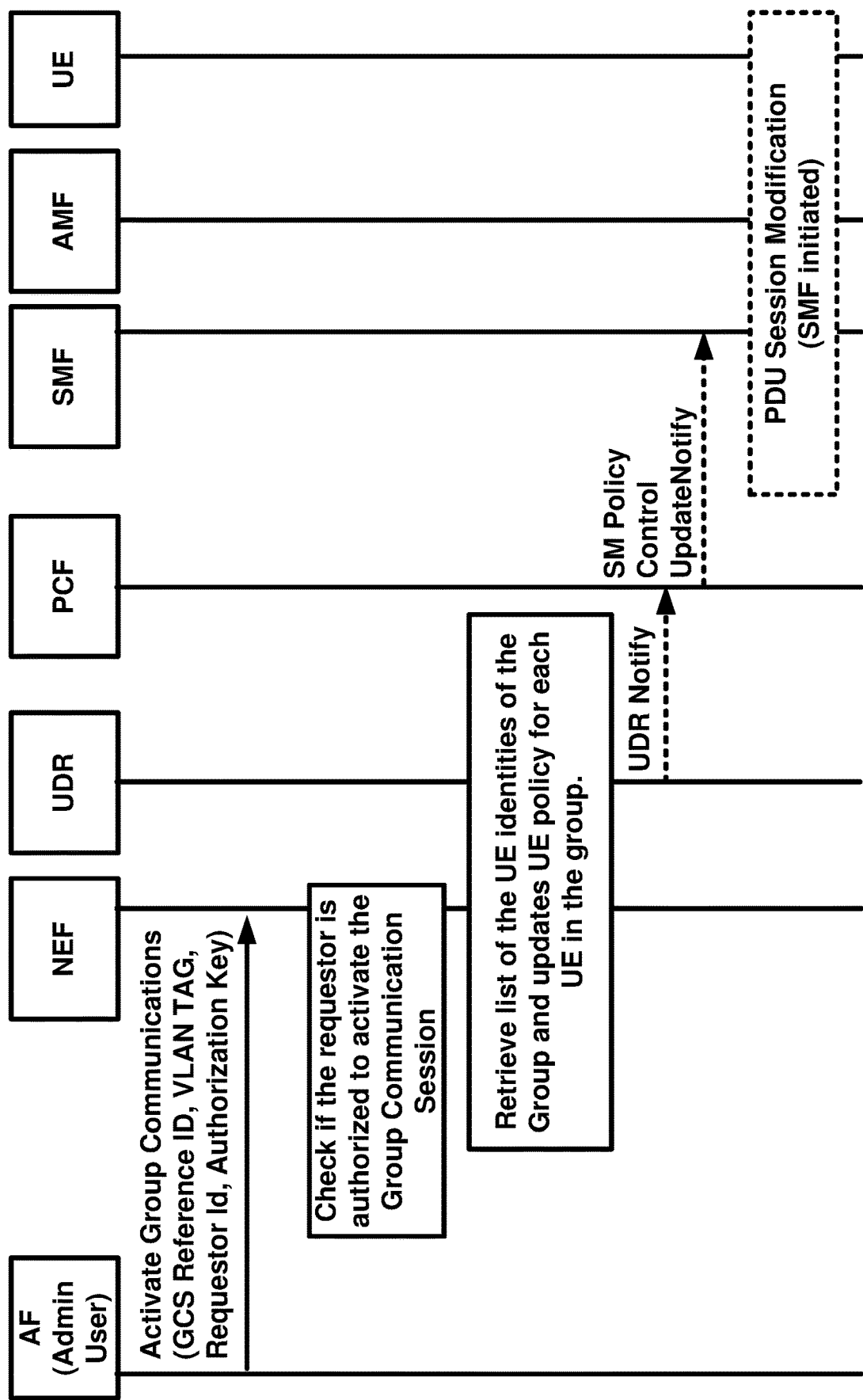
FIG. 17 is an example call flow as per an aspect of an embodiment of the present disclosure.

In an example embodiment as depicted in FIG. 17, the AF (e.g., admin user) may request the NEF to activate a group communication. The procedure may be based on a PDU session modification procedure. The request may comprise the UE identifier of the requestor with the authorization information. The NEF may check if the requestor is authorized to activate the group communication session. The NEF may retrieve the list of the UE identifiers of the group and may update the UE policy for one or more UE(s) in the group. The UDR may notify the PCF for updating the policy data since the PCF subscribed the UDR on the change of the policy data. The PCF may perform the SM policy control update notification procedure to deliver the update policy information for the established session for example, the addition of a VLAG TAG, and/or the like. The SMF may initiate the PDU session modification procedure to send the VLAN TAG, and/or the like to the UE.

Figure 19:
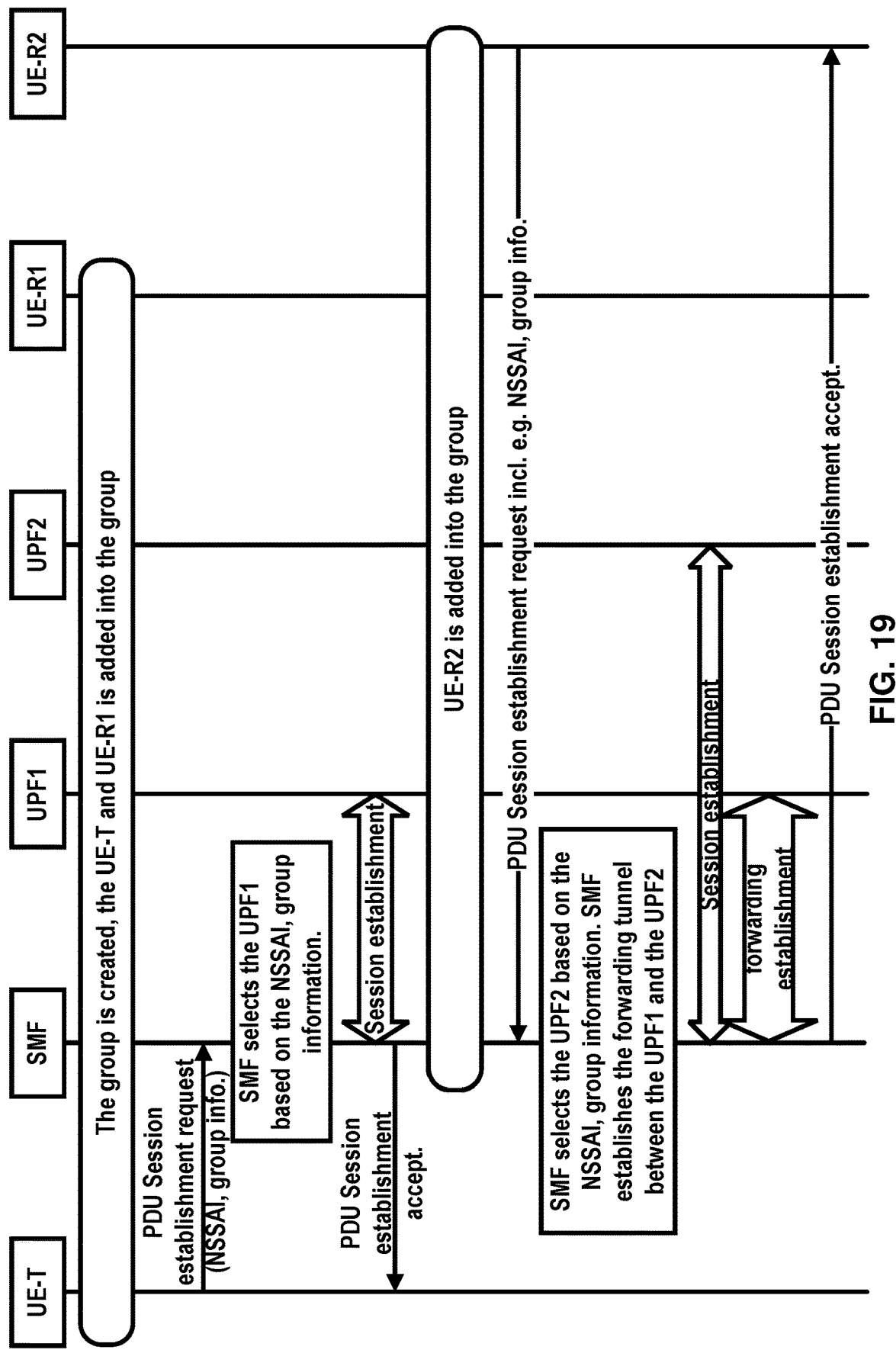
FIG. 19 is an example call flow as per an aspect of an embodiment of the present disclosure.

In an example embodiment as depicted in FIG. 19, a group may be created, and group member UE-T and UE-R1 may be added into the group, and UE-T is authorized to send one to many data to the members in the group. UE-T may initiate group specific PDU Session establishment request, including the requested S-NSSAI, group information, and/or the like. In an example, the group information may be a group index, a group specific DNN information or group specific application server information, and/or the like. After receiving the request from UE-T, the SMF may select the UPF1 as the serving UPF for the specific group and may assign addresses (e.g., multicast address) for one to many data communication based on the S-NSSAI information and the group information. The SMF may send session establishment request to UPF1, including the allocated CN tunnel information on N3 interface. UPF1 may acknowledge by sending Session establishment response message. The SMF may send a PDU Session Accept message to the UE-T with the addresses, multicast address, and/or the like for one to many data communication. In case of PDU Session Type IPv4 or IPv6 or IPv4v6, the SMF may allocate an IP address/prefix for the PDU Session. When UE-R2 is added into the group, UE-R2 may initiate PDU Session establishment request to the SMF, that may comprise S-NSSAI information and group information. The SMF may select UPF2 as the serving UPF for UE-R2 and may assign same addresses for one to many data communication based on the S-NSSAI information and group information, and may determines to establish the forwarding tunnel between UPF1 serving UE-T and the UPF2. The SMF may send session establishment request to UPF2, including the allocated CN tunnel information and the allocated addresses for one to many data communication. The CN tunnel information may comprise the UPF2 address of the tunnel between UPF1 and UPF2 and the UPF2 address of N3 tunnel. UPF2 may acknowledge by sending Session establishment response message. The SMF may establish a group forwarding tunnel between UPF1 and UPF2, and may provide the UPF2 address of the tunnel between UPF1 and UPF2, as well as addresses for one to many data communication to UPF1. The SMF may associate the forwarding tunnel, addresses for one to many data communication and PDU Session for UE-T to group path and may provide the group forwarding path to UPF1. The SMF may send a PDU Session Accept to UE-R2 with the addresses for one to many data communication. In case of PDU Session Type IPv4 or IPv6 or IPv4v6, the SMF may allocate an IP address/prefix for the PDU Session, and the address/prefix is the group specific for UE-R2. If there is existing PDU Session for another group for UE-R2, the existing PDU Session may be re-used for the newly joined group, e.g., multiple groups may share one PDU Session for the receiving member in the group. The UE-T may send the group data to the UPF1, UPF 1 may determine the receiving UE-R1, UE-R2 according to the destination addresses, the group paths, and/or the like and may route the data to the tunnel corresponding to UE-R1 and UE-R2 respectively.

Figure 18:
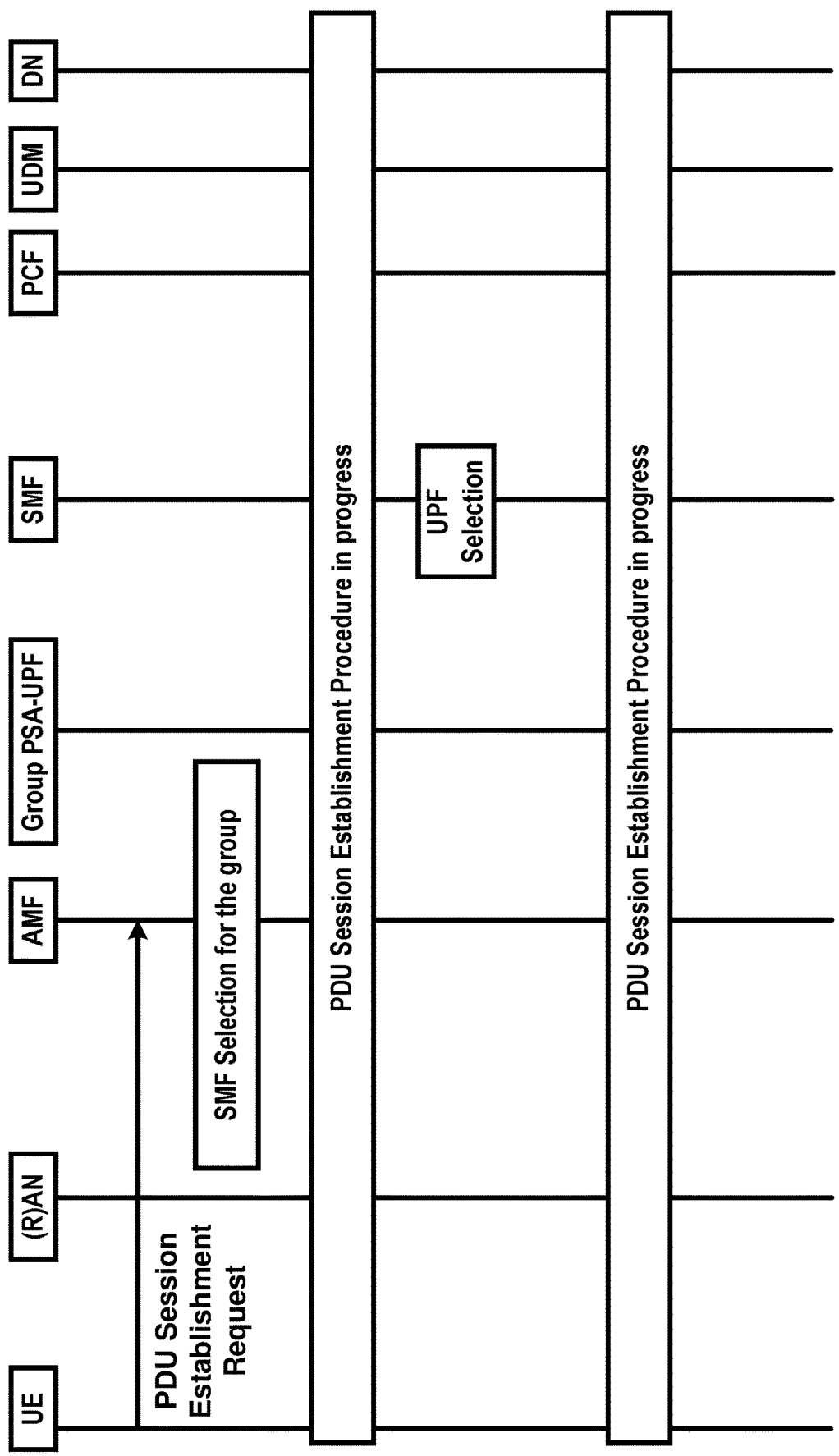
FIG. 18 is an example call flow as per an aspect of an embodiment of the present disclosure.

In an example FIG. 18, a UE may establish a PDU session to join a group. After establishment of the PDU session, the UE may transition to idle (e.g., CM-IDLE). The UE may perform a service request procedure to transmit signaling, data, and/or the like. Upon successful completion of the service request procedure, the UE may transmit data packets for one or more UEs of a group. The UPF may forward the data packets via N6 interface, Nx interface or directly to the receiving UEs (e.g., local switch).

Figure 23:
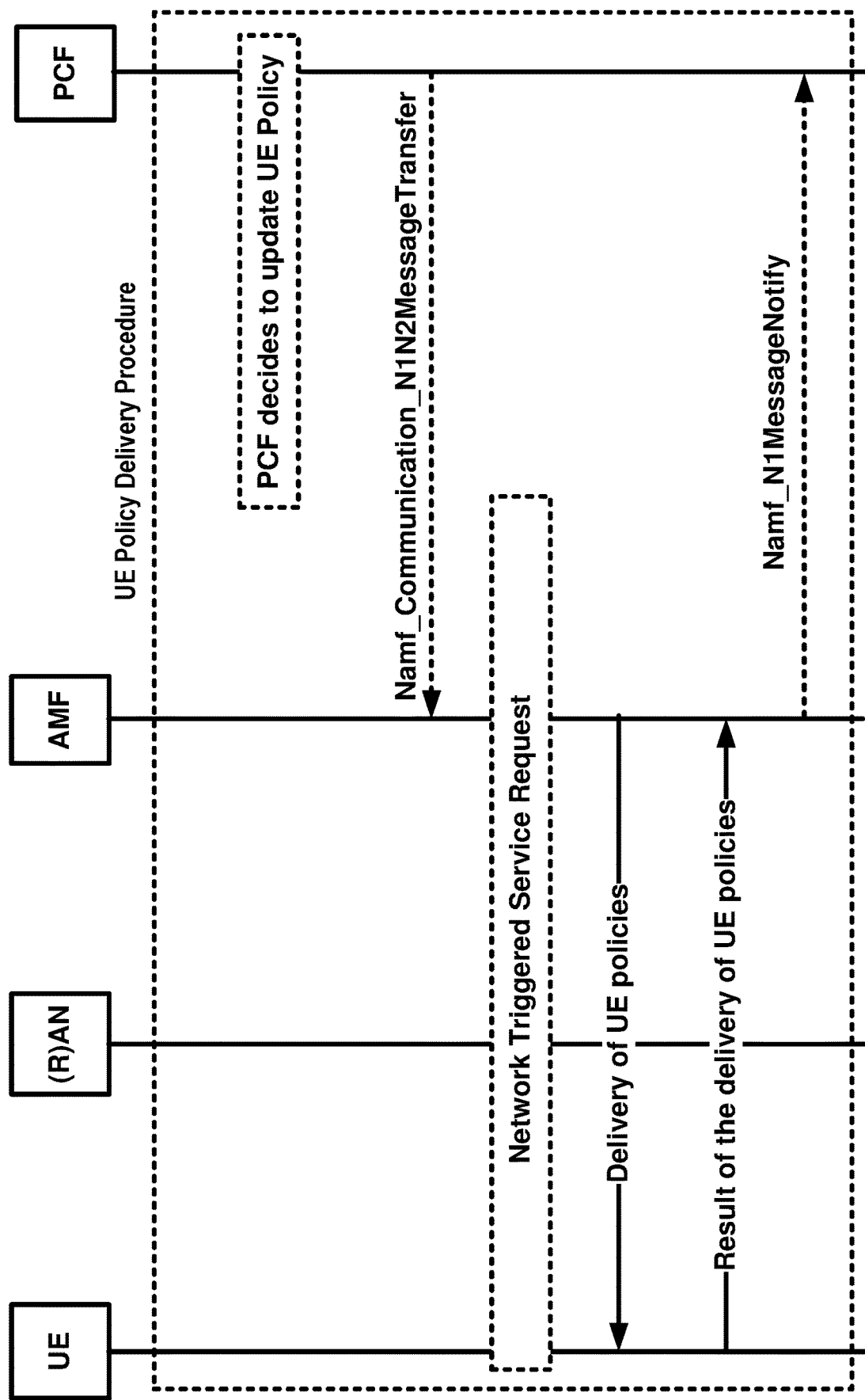
FIG. 23 is an example call flow as per an aspect of an embodiment of the present disclosure.

In an example, as depicted in FIG. 23, a policy delivery procedure may be employed. The policy delivery procedure may be employed to transmit the URSP to the UE. In an example the PCF may determine to update UE policy procedures based on triggering conditions such as: an initial registration, need for updating UE policy, and/or the like. In an example, for initial registration case, the PCF may compare the list of PSIs included in the UE access selection and PDU session selection related policy information in a Npcf_UEPolicyControl_Create request and may determine whether UE access selection and PDU session selection related policy information have to be updated and be included in the response to the AMF. In an example, for the network triggered UE policy update case (e.g. the change of UE location, the change of Subscribed S-NSSAIs, activation of a group, and/or the like), the PCF may check the latest list of PSIs to decide which UE access selection and/or PDU Session selection related policies have to be sent to the UE. The PCF may check if the size of the resulting UE access selection and PDU Session selection related policy information exceeds a predefined limit. If the size is under the limit, then UE access selection and PDU Session selection related policy information may be included in a single Namf_Communication_N1N2MessageTransfer service operation. If the size exceeds the predefined limit, the PCF may split the UE access selection and PDU Session selection related policy information in smaller, logically independent UE access selection and PDU Session selection related policy information ensuring the size of each is under the predefined limit. One or more UE access selection and PDU Session selection related policy information may be sent in one or more Namf_Communication_N1N2MessageTransfer service operations.

In an example, the PCF may invoke Namf_Communication_N1N2MessageTransfer service operation provided by the AMF. The message may comprise a SUPI, UE Policy Container, and/or the like. If the UE is registered and reachable by AMF in either 3GPP access or non-3GPP access, the AMF may transfer transparently the UE policy container to the UE via the registered and reachable access. If the UE is registered in both 3GPP and non-3GPP accesses and reachable on both access and served by the same AMF, the AMF may transfer transparently the UE Policy container to the UE via one of the accesses based on the AMF local policy. If the UE is not reachable by AMF over both 3GPP access and non-3GPP access, the AMF may report to the PCF that the UE Policy container may not be delivered to the UE using Namf_Communication_N1N2TransferFailureNotification. If AMF determines/decides to transfer transparently the UE Policy container to the UE via 3GPP access, e.g. the UE is registered and reachable by AMF in 3GPP access only, or if the UE is registered and reachable by AMF in both 3GPP and non-3GPP accesses served by the same AMF and the AMF decides/determines to transfer transparently the UE Policy container to the UE via 3GPP access based on local policy, and the UE is in CM-IDLE and reachable by AMF in 3GPP access, the AMF may start a paging procedure by sending a paging message to the UE. Upon reception of paging request, the UE may initiate the UE triggered service request procedure. If the UE is in CM-CONNECTED over 3GPP access or non-3GPP access, the AMF may send/transfer transparently the UE Policy container (e.g., UE access selection and PDU Session selection related policy information) received from the PCF to the UE. The UE Policy container may comprise URSP, and/or the like. The UE may update the UE policy provided by the PCF and may send the result to the AMF. If the AMF received the UE Policy container and the PCF subscribed to be notified of the reception of the UE Policy container, the AMF may forward the response of the UE to the PCF employing a Namf_N1MessageNotify, and/or the like. The PCF may maintain the list of PSIs delivered to the UE and may update the latest list of PSIs in the UDR by invoking Nudr_DM_Update (e.g., comprising SUPI, Policy Data, Policy Set Entry, updated PSI data) service operation, and/or the like.

A 5GLAN Group may be managed (e.g., created, modified, and removed) based on AF request or UE request. A UE that belongs to the 5GLAN Group may access the 5G LAN-type service corresponding to the 5GLAN Group.

The UE may access the 5G LAN-type service by establishing a PDU session. During establishment of the PDU Session, the UE may be authenticated/authorized for accessing the 5G LAN-type service. The 5G LAN-type service may support 5GLAN communication within the 5GLAN group by coordinating PDU sessions of the UEs, e.g., traffic routing between PDU sessions may take place within the 5GS.

The 5GS may support the 5G LAN-type service by establishing a user plane composed of one UPF or multiple interconnected UPFs. When the UEs within the 5GLAN group communicate with a physical LAN in the DN for one or more data services, an Ethernet transport service may be associated with the DN and may support connecting the UEs to the physical LAN in the DN.

The user plane of a 5G LAN-type service may comprise an access UP and a backbone UP. The access UP may comprise the UP path of a PDU Session, of which UP paths terminates at an anchor UPF (e.g., not to a DN). The backbone UP may comprise one anchor UPF or multiple anchor UPFs with one or multiple connections (e.g., Nx connections, tunnels, and/or the like) which may bridge the UP paths in the access UP with each other. The Nx connections in the backbone UP may be managed by the 5GC. Traffic routing over Nx in the backbone UP may be configured at the 5G LAN-type service level. The UPF(s) in the backbone UP may function as a router or a switch (Ethernet switch) and may treat the user plane path of the PDU session as the cable connecting the UE to one port/interface on the router or switch.

In an example, depending on implementation and operator's configuration, the backbone UP (e.g., comprising UPFs and Nx connections in between) may be pre-established before the UE requests PDU session for access to the 5G LAN-type service and updated/modified afterward. The Nx connections in the backbone UP may support IP traffic and/or Ethernet traffic and may be managed by the 5GC. An Nx connection may belong to a PDU session. The connection may be a per 5GLAN Group connection, shared by multiple PDU Sessions for support of traffic routing between those Sessions. Private communication (of 5G LAN-type service) is achieved by shared anchor UPF or by interconnecting two anchor UPFs via an Nx interface. The combination of two anchor UPFs and the Nx interface in between may be an Nx connection. One or more Nx connections may be further interconnected for the private communication in the same 5GLAN group (e.g., depending how many group member UEs are involved).

Figure 21:
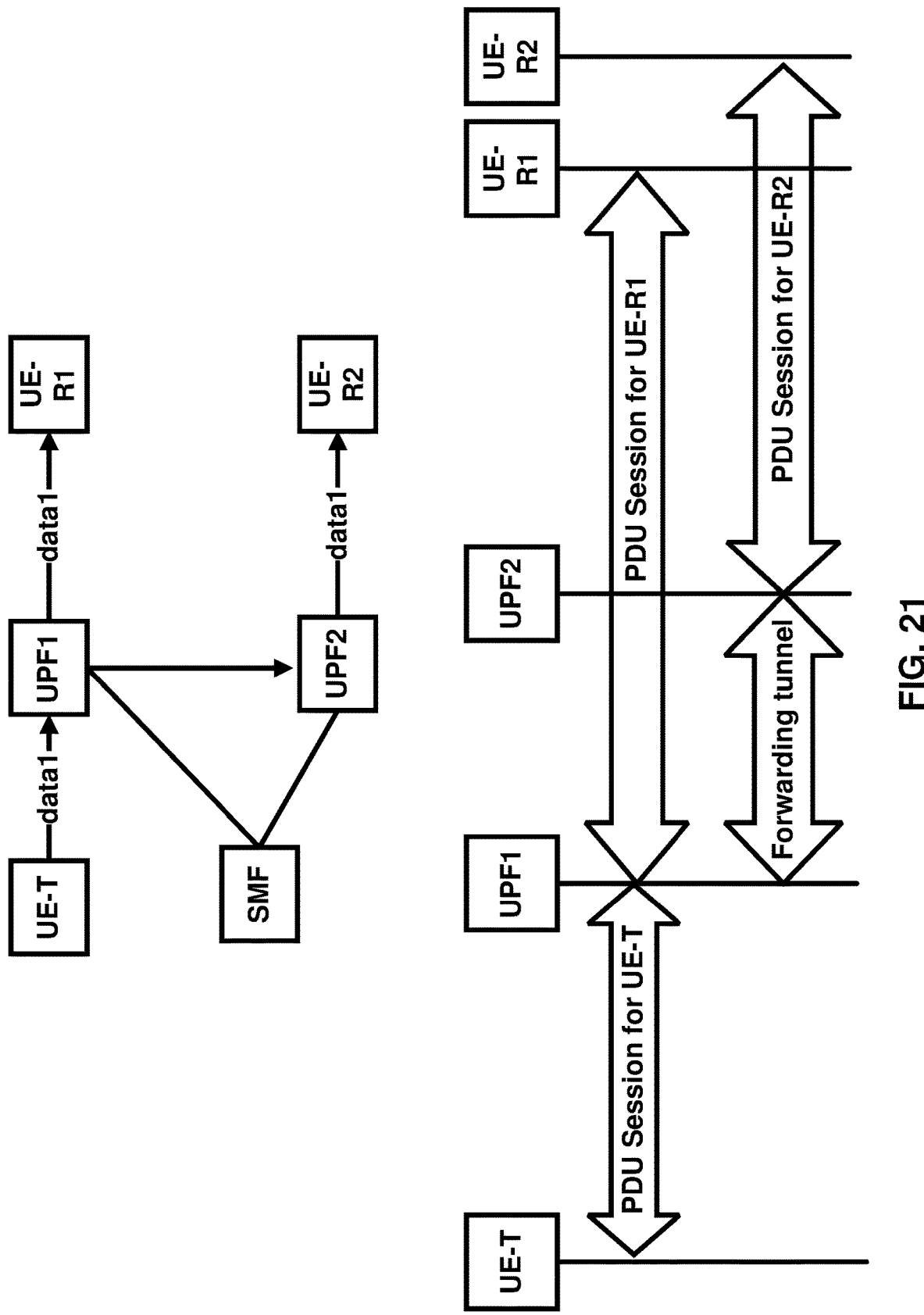
FIG. 21 is an example diagram as per an aspect of an embodiment of the present disclosure.

An example FIG. 21 depicts an example of user plane topology for one to many data communication. As depicted in FIG. 21, the group specific PDU Session may be terminated at the group member and the serving UPF. When a group is established by one AF or one UE, a group specific PDU Session may be established for each group member who are added into the group with the group creation. After the group creation, when a group member is added into the group, the group specific PDU Session may be established for the new joined member. The SMF may be responsible for establishing the forwarding tunnel between the UPF serving the new joined member and the UPFs serving the authorized transmitting members. The PDU Session for UE-T, PDU Session for UE-R1, forwarding tunnel on N9 interface for this group, PDU Session for UE-R2 compose the group data forwarding path. UPF1 may forward the data received from UE-T to UE-R1 and UPF2 according to group data forwarding path. If there are multiple UPFs (i.e. more than two UPFs) on the group data forwarding path, group forwarding tunnel may be established on each N9 interface on the group data forwarding path. UPF(s) detect one to many communication based on the destination address in the received data, e.g., if the destination address in the received data is broadcast/multicast address, then the UPF(s) may forward the data to the related group members.

Figure 22:
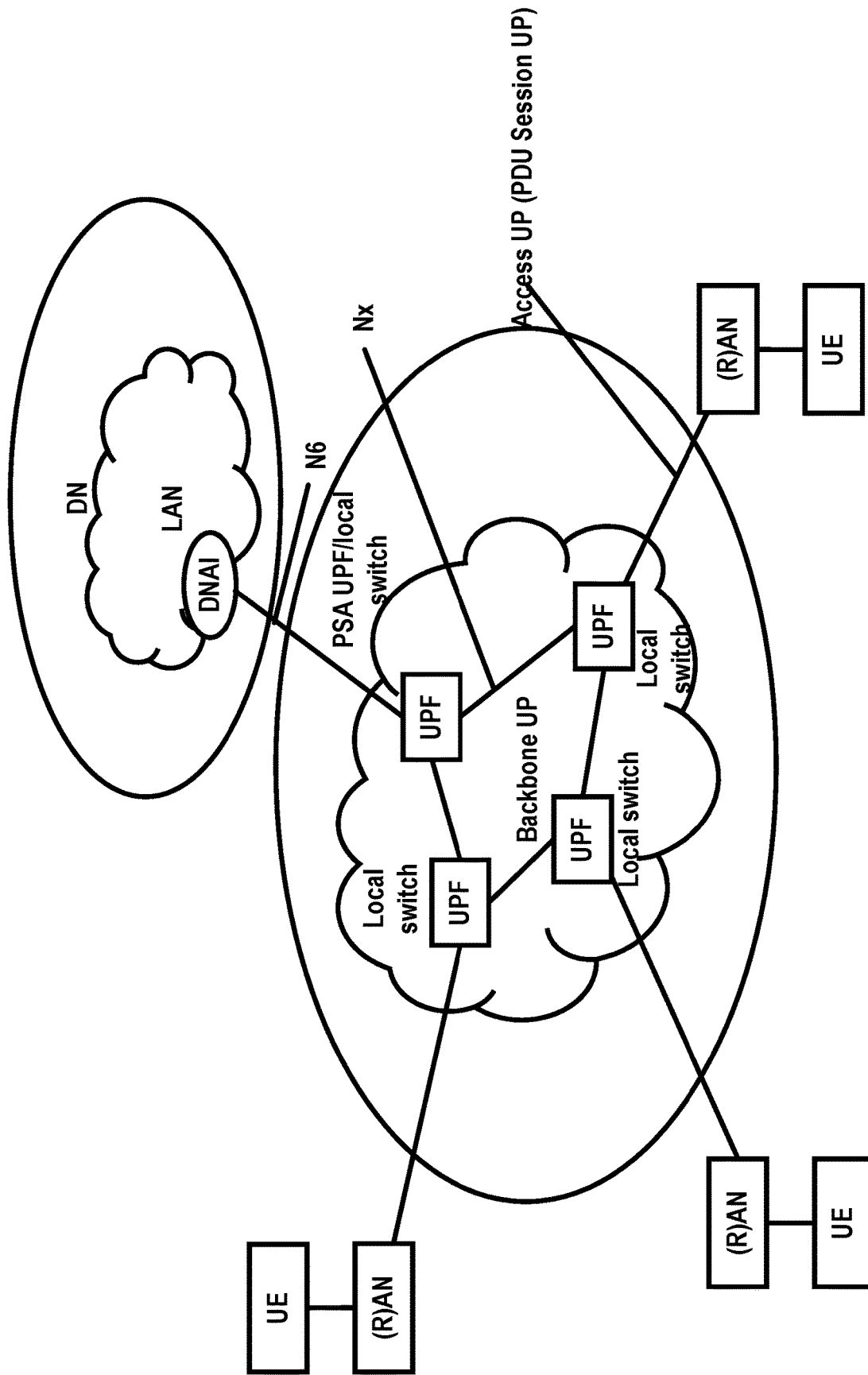
FIG. 22 is an example diagram as per an aspect of an embodiment of the present disclosure.

The access UP and the backbone UP may intersect at UPFs, which may be PSA UPFs from the access part point of view and BUAP (Backbone UP Access Point) UPFs from the backbone part point of view. Example FIG. 22 depicts the user plane architecture of 5GLAN communication framework.

In an example, an authorized entity, e.g., a UE or an AF, may interact with a GMF, UDM, UDR, NRF, and/or the like to manage a 5GLAN group. This may include to create, modify or remove a 5GLAN group, or to query information related to a 5GLAN group, for example, information such as IP address of a member UE in the 5GLAN group. In an example, when a UE interacts with the GMF, UDM, UDR, NRF, and/or the like, the UE may send a request for 5GLAN group management to the GMF, UDM, UDR, NRF, and/or the like, via the AMF, and the UE request may be authorized by the GMF according to subscription information, e.g. whether the UE is authorized to create a 5GLAN group. In an example, when an AF interacts with the GMF, the AF may send a request for 5GLAN group management to the GMF directly or via the NEF, depending on whether operator allows the AF to access the network directly. When the NEF is involved, the NEF may authorize the AF request if the AF request is not yet authorized. The request may comprise GPSI if the requesting entity is a UE, or AF-service-ID if the requesting entity is an AF, and 5G LAN-VN DNN. Depending on the management purpose, the request may further comprise type of traffic (e.g. IP type or Ethernet type) to be supported during 5GLAN communication, metadata of the 5GLAN group (e.g. describing the purpose of the 5GLAN group), identity information (e.g. GPSIs of the UEs to be added in or removed from the 5GLAN group), service restrictions (e.g., allowed area), information identifying the 5GLAN group (e.g., in the form of Internal group ID or External group ID), the types of information (e.g., information of member UEs) being queried, and/or the like. The GMF may validate the information provided by the entity, e.g., whether a member UE identified in the information is allowed to access the 5G LAN-type service, and manages the 5GLAN group according to the information. As a result of the 5GLAN group management operations, the context of the 5GLAN group is created, modified, or removed in the GMF, UDM, UDR, and/or the like or information being queried by the entity is identified from local storage of the GMF, UDM, UDR, and/or the like and sent back to the requesting entity. The GMF may update the 5GLAN group membership information to the UDM. The GMF may provide policy requirements (e.g., service restrictions) to the PCF. When creating a 5GLAN group, the GMF may allocate an ID to the 5GLAN group and may include the 5GLAN group ID in the response sent to the requesting entity. When a UE is added into the 5GLAN group, the GMF may allocate group credential for the UE, which is to be provided by the UE to the network as authentication and authorization information for accessing 5G LAN-type service for the 5GLAN group.

In an example, the wireless communication system, e.g., the 3GPP system, 5GS, 4G, LTE, and/or the like may be employed for group communication, UE to UE communication session, one UE to/from one or more UE(s) communication session(s), one to many communication, and/or the like.

Figure 24:
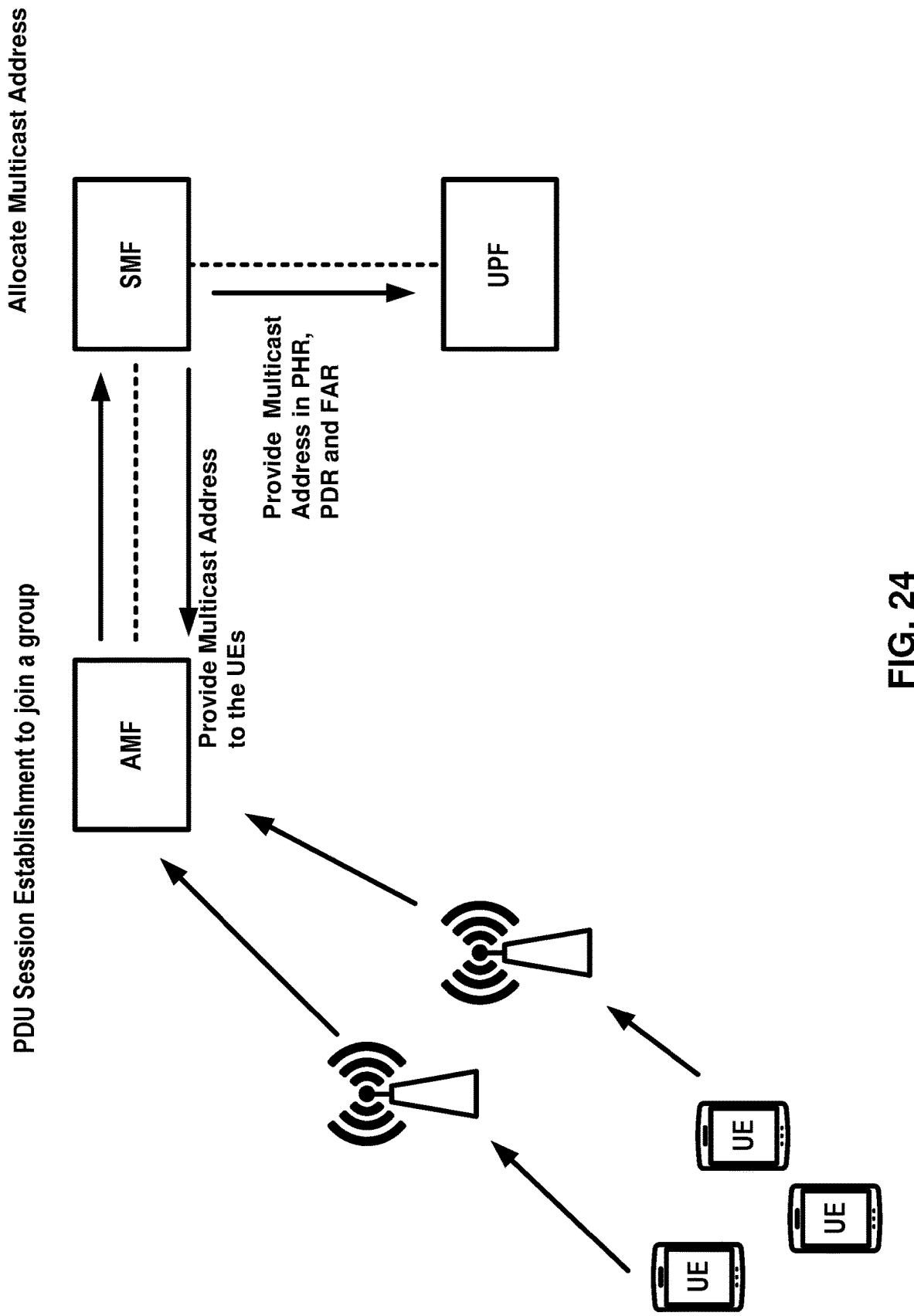
FIG. 24 is an example diagram as per an aspect of an embodiment of the present disclosure.

An example FIG. 24 depicts one or more UEs that may perform a PDU session establishment to join a group. The SMF allocates or retrieves the multicast information associated with the group and provide the multicast information to the UE members of the group. The SMF may provide the PDR, packet handling rules, and FAR to the UPF based on the multicast information.

Figure 27:
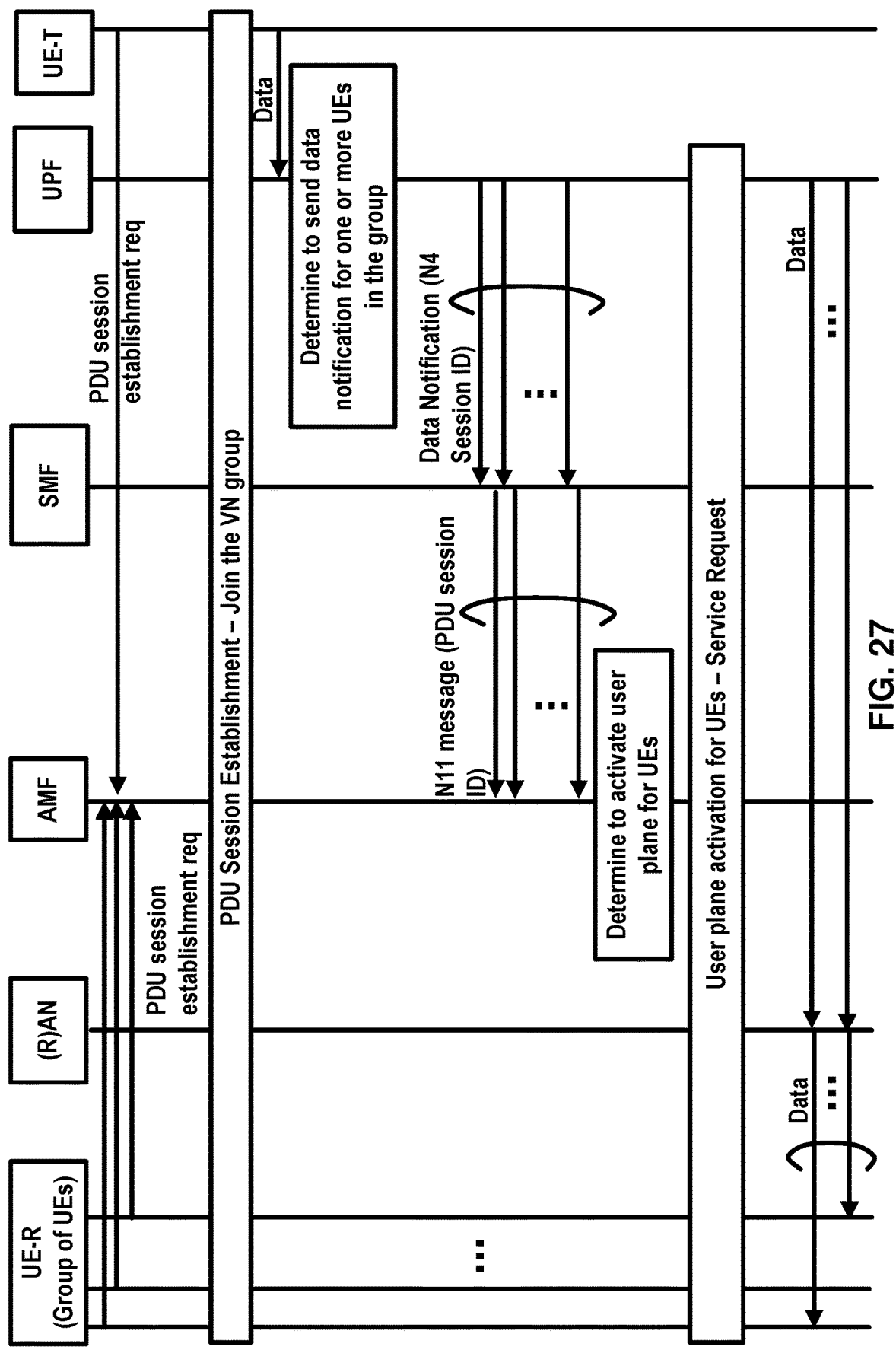
FIG. 27 is an example call flow as per an aspect of an embodiment of the present disclosure.

FIG. 27 depicts an example legacy system signaling when data packets for a group of UEs is received by the UPF. A UPF may receive data for a large group of wireless devices. In legacy systems, if the CN tunnel/user plane connection is not activated, data notification messages may be sent to the SMF. The number of data notification messages may correspond to the number of (inactive) wireless devices in the group. If there is a large number of inactive wireless devices, excessive reliance on data notification messages may cause signaling overload in the core network, leading to an inefficient utilization of resources. To address this problem, the present application employs new techniques for activating wireless devices while reducing the signaling load in the network.

For example, the UPF instead of sending a large number of data notification messages, may employ a different mechanism to signal the arrival of data packets for the group. The UPF is configured with a multicast address corresponding to the group, it may use the multicast address to reduce signaling. By sending a single data notification message comprising the multicast address to the SMF, the signaling overhead/overload for a large group may be mitigated.

If the SMF is configured with an association between the multicast address and the group of wireless devices in the group, it may employ the group information to assist the AMF to identify and activate the inactive wireless devices in the group. Just as signaling overload is reduced when using a multicast address for communication between the UPF and the SMF, group information may be employed to achieve similar reduction in signaling overhead when communicating between the SMF and the AMF. If the AMF is configured with the association between the group information and the wireless devices in the group, the AMF can identify and activate the inactive wireless devices of the group.

In an example embodiment as described in the present application, a UPF may receive data packets targeted to a group of UEs. The sender may be a transmitting wireless device, an application, an application server, and application function, and/or the like. When the UPF determines that the destination address is a multicast, and the data packet is targeted to a group of UEs, the UPF may send a single data notification to activate the UEs in the group. The single data notification may provide to the SMF multicast information, multicast address, and/or the like to determine the group of wireless devices, and the PDU sessions associated with the wireless devices of the group. The SMF may provide the group information or group identifier to the AMF. The group may be identified by a combination or one or more of a DNN, a S-NSSAI, a group ID, internal/external group id, and/or the like. The AMF may determine the UE members are determine an action based on the status of the UE such as reachability, connectivity, IDLE, CONNECTED, INACTIVE, and/or the like. The AMF may determine to notify the UEs via a base station, RAN, NG-RAN, wireless access point, and/or the like. The UEs upon receiving the notification may respond by performing a service request with the network.

Figure 25:
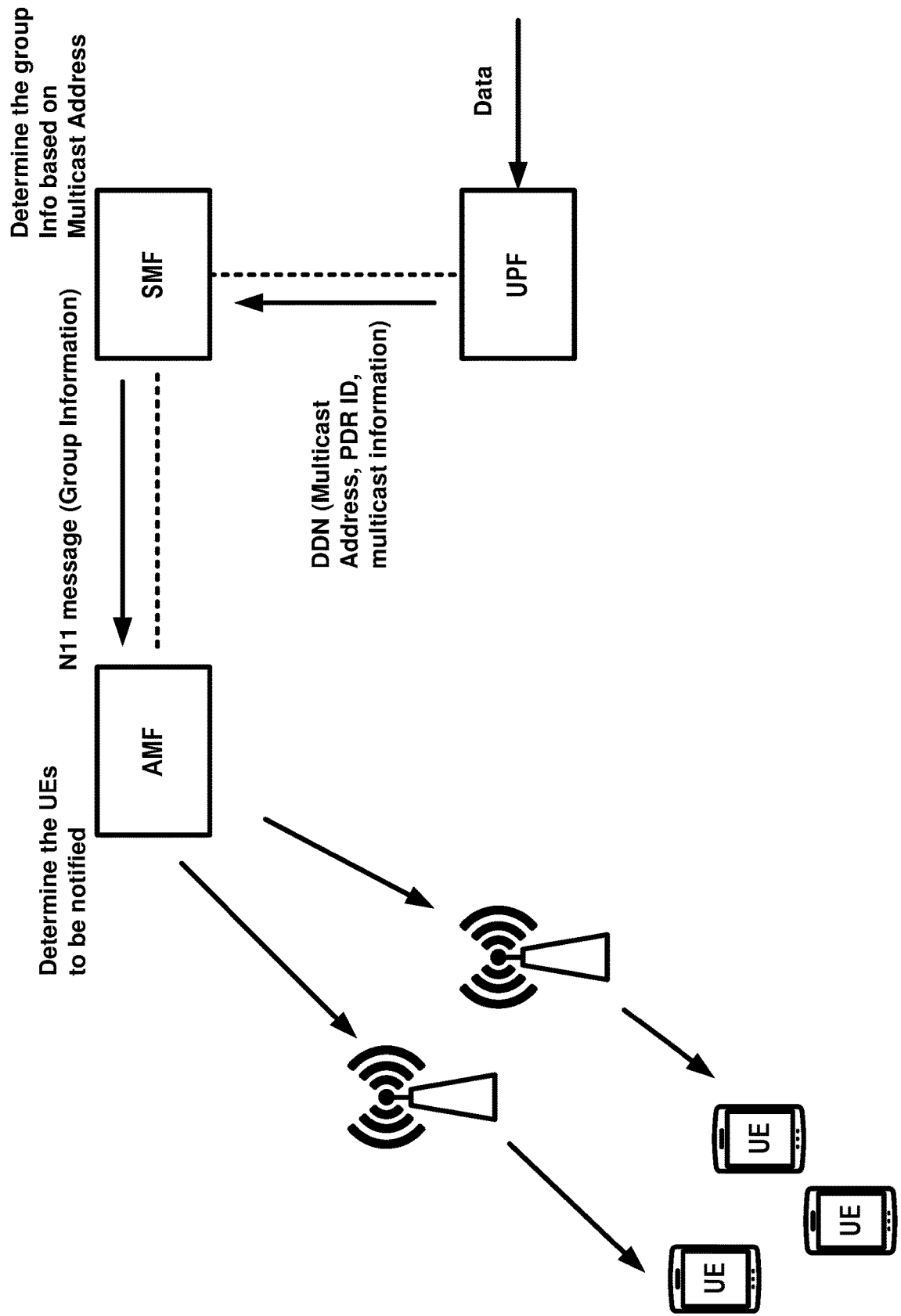
FIG. 25 is an example diagram as per an aspect of an embodiment of the present disclosure.
Figure 26:
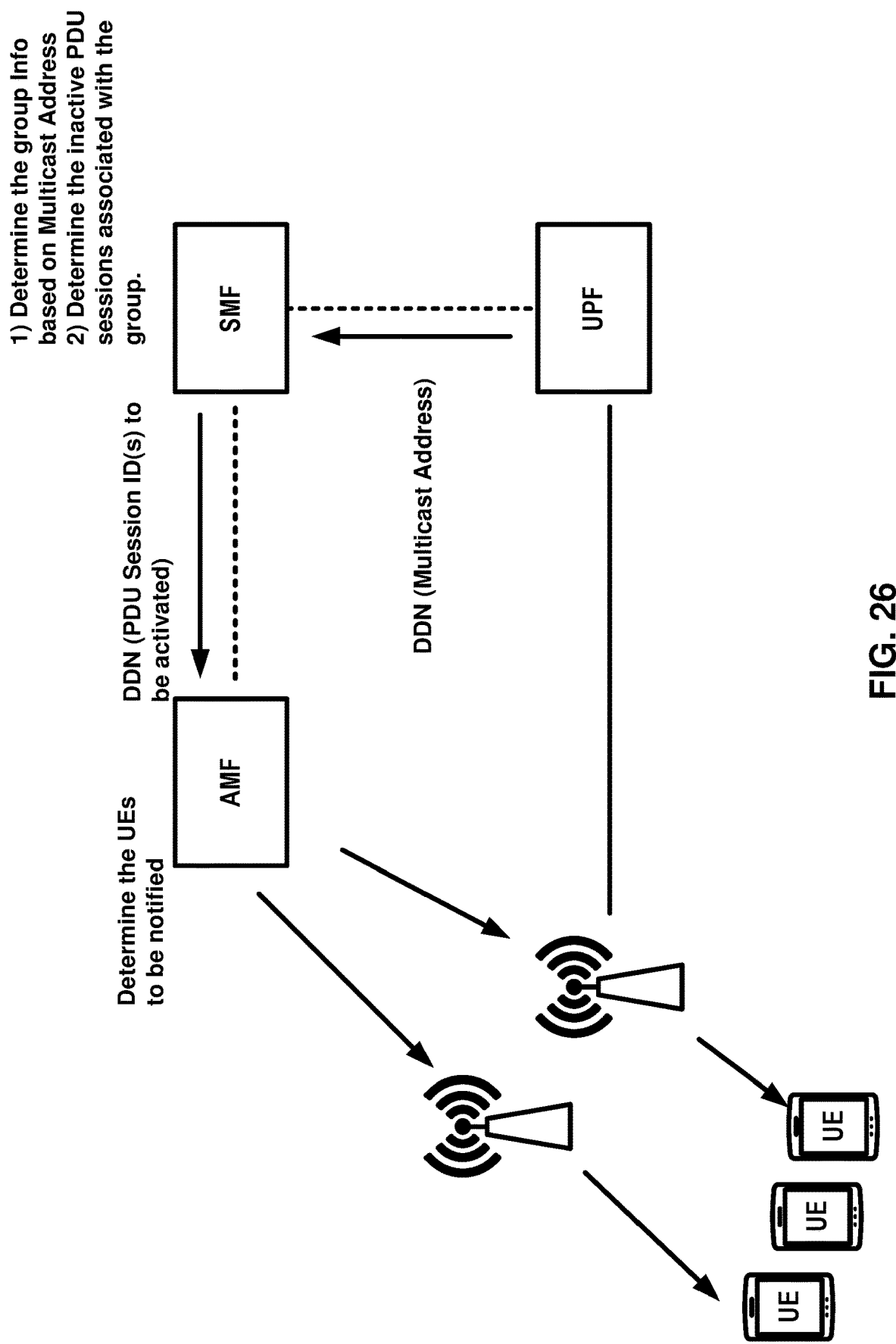
FIG. 26 is an example diagram as per an aspect of an embodiment of the present disclosure.

An example FIG. 25 depicts a UPF that is configured based on the multicast information, and receives data for the group associated with the multicast information. The UPF may send a data notification that may comprise multicast information, multicast address, a PDR ID associated with the group, and/or the like to the SMF. The SMF may determine a group information and notify the AMF to activate the group. The AMF may activate the UE members of the group that may require user plane connection/resources activation.

In an example embodiment, a VN group, a 5GLAN group communication, and/or the like may comprise communication among one or more wireless devices. The group communication may comprise multicast. The group communication may comprise anycast. The group communication may comprise geocast. The group communication may comprise broadcast. The group communication may comprise group communication/routing/switching. The multicast information may refer to an address. The multicast information may refer to an identity. The multicast information may refer to a determination/identification of the group communication. In an example, the multicast information may be a multicast address. The multicast information may be a multicast IP address. The multicast information may be a multicast MAC address. The multicast information may comprise an identifier of a receiving wireless device. The multicast information may comprise an identifier/identifiers/addresses of one or more wireless devices. The multicast information may comprise a subset of wireless devices of a group. In an example, the group may comprise one or more wireless devices. In an example, the group may comprise a group of wireless devices reachable via a domain. The group may comprise a group of wireless devices reachable via an IP domain. The group may comprise a group of wireless devices reachable via a multicast address. The group may comprise a group of wireless devices reachable via a network instance. The group may comprise a group of wireless devices reachable via a VLAN. The group may comprise a group of wireless devices reachable via a VLAN ID. The group may comprise a group of wireless devices reachable via an S-TAG. The group may comprise a group of wireless devices reachable via a C-TAG. The group may comprise a group of wireless devices reachable via a VLAN TAG. The group may comprise a group of wireless devices reachable via a group GTP tunnel identifier. The group may comprise a group of wireless devices reachable via a group GTP tunnel end point identifier. In an example, the network instance may be employed to separate IP domains. An IP domain may comprise an instance where UPF is connected to 5G-ANs in different IP domains overlapping UE IP addresses assigned by multiple Data Networks, and for transport network isolation in the same PLMN, and/or the like.

In an example embodiment, multicast information may comprise one or more multicast addresses. Multicast information may comprise a tunnel identifier of the group. Multicast information may comprise an AN tunnel (identifier) for the group. Multicast information may comprise one or more tunnel identifiers associated with members of the group. Multicast information may comprise a set of one or more UE members of the group. Multicast information may comprise an identifier of a UE member of the group (UE ID, SUPI, and/or the like). Multicast information may comprise an identifier/address of a UE acting as a VLAN switch/router and a port number that connects a VLAN group associated with the group to the network via the UE-T, a VLAN ID, V-TAG, C-TAG, S-TAG, VLAN TAG, and/or the like.

In an example embodiment, data notification may part of an N4 related procedure, PFCP session related procedure, N4 reporting to detection of arrival of packets, N4 reporting for detection of inactivity for PDU sessions of a group, and/or the like.

Figure 20:
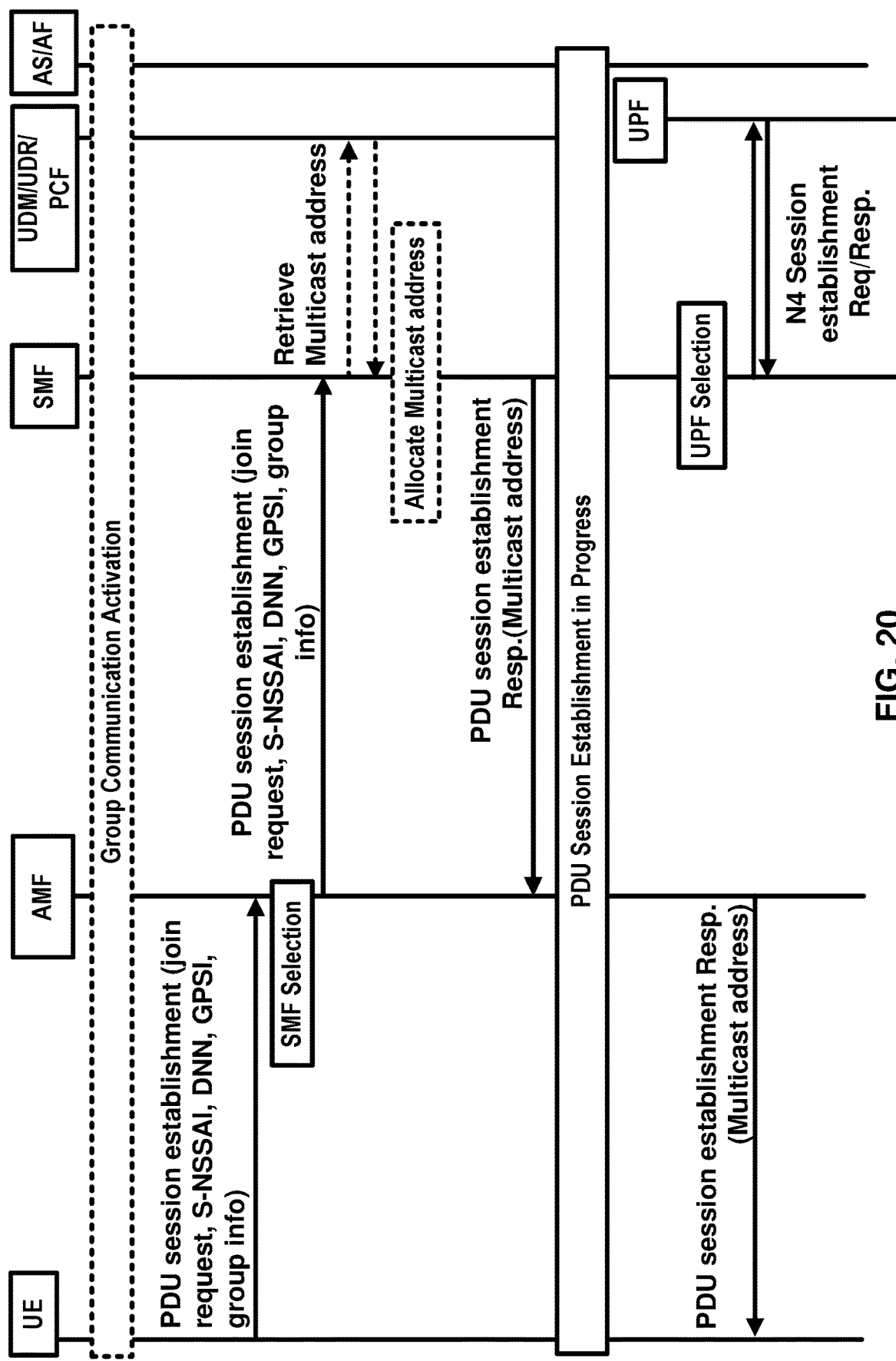
FIG. 20 is an example call flow as per an aspect of an embodiment of the present disclosure.

In an example embodiment the PDU session establishment procedure as depicted in FIG. 12 and FIG. 13, and FIG. 20 may be employed by a wireless device to join a virtual network VN group communication. In an example, when the UE sends to the AMF the NAS Message (or the SM NAS message), if the UE is establishing the PDU session for sending one to many communication data of a 5GLAN group, VN group, and/or the like it may indicate that it requests a multicast address, multicast information, and/or the like. The UE may indicate the group information within the N1 SM container. If the UE is establishing the PDU session for receiving one to many communication data of a 5GLAN group, it may indicate the group information and may indicate that it is a receiver of the group within the N1 SM container.

In an example embodiment, when the AMF receives the NAS message, if the request type indicates initial request and the UE subscription indicates the support for 5G LAN-type (e.g., VN group, and/or the like) service for the requested DNN, the AMF may select the SMF associated with the requested DNN in UE subscription data received from a UDM. The case where the request type indicating initial request and the UE subscription indicating the support for 5G LAN-type service for the requested DNN, and UE subscription received from the UDM during the registration or subscription profile update notification procedure does not contain SMF information corresponding to the requested DNN may constitute an error case, the AMF may reject the NAS message containing PDU Session Establishment Request from the UE with a cause indicating that the requested 5G LAN-type service is not supported.

In an example, when the SMF receives the PDU session establishment request if the request indicates the one to many communication, VN group, group communication, and/or the like establishment request for an indicated group, the SMF may allocate a 5GLAN group (VN group) unique multicast address (e.g., IP address for IP type PDU session, MAC address for Ethernet type, and/or the like). In an example, the SMF may obtain the address information for the one to many communication from 5GLAN group provision information (e.g., from a UDR, UDM, PCF, a repository function, a group management function, locally configured information, and/or the like).

In an example, during the PDU session establishment procedure, the SMF may perform the N4 session establishment or N4 session modification procedure. The SMF may sends the N4 session establishment/modification request to the UPF and may provide packet detection (e.g., PDR), forwarding (e.g., FAR), enforcement and reporting rules to be installed on the UPF for the PDU session. If CN tunnel info is allocated by the SMF, the CN Tunnel Info may be provided to the UPF. If selective user plane deactivation is required for the PDU Session, the SMF may determine the inactivity timer and may provide it to the UPF. The SMF may provide trace requirements to the UPF if it has received trace requirements. If the PDU Session is targeting to the DNN associated with a 5GLAN group, the SMF may create the packet detection and forwarding rules in order to bind the session or service data flow to the related 5G LAN-VN. The packets detection include session tunnel information, UE address, and/or the like and the packets forwarding rules may include the related VLAN ID, 5G LAN-VN ID, and/or the like. In an example, when the PDU session is for sending and/or receiving one to many communication data of a 5GLAN group, the SMF may provide the multicast address, multicast information, and/or the like to the UPF for detecting packets, and receiving packets from the PDU session or sending packets to the PDU session.

In an example, when the PDU session establishment is in progress, the SMF may send to the AMF the Namf_Communication_N1N2MessageTransfer message that may comprise the PDU Session ID, N2 SM information (PDU Session ID, QFI(s), QoS Profile(s), CN Tunnel Info, S-NSSAI from the Allowed NSSAI, Session-AMBR, PDU Session Type, User Plane Security Enforcement information, UE Integrity Protection Maximum Data Rate), N1 SM container (PDU Session Establishment Accept (QoS Rule(s) and QoS Flow level QoS parameters if needed for the QoS Flow(s) associated with the QoS rule(s), selected SSC mode, S-NSSAI(s), DNN, allocated IPv4 address, interface identifier, Session-AMBR, selected PDU Session Type, Reflective QoS Timer (if available), P-CSCF address(es), [Always-on PDU Session], allocated multicast address, the multicast address for one to many communication, the multicast information, and/or the like))). If multiple UPFs are employed for the PDU Session, the CN Tunnel Info may contain tunnel information related with the UPF that terminates N3.

In an example, during the PDU session establishment procedure, the UPF may provide the N4 session modification response to the SMF. If multiple UPFs are employed in the PDU Session, the UPF may be the UPF terminating N3. If the PDU Session is targeting to the DNN associated with the 5GLAN group, the SMF may create new packet handling rules (PHRs) including the UE address and the association to the downlink packet forwarding rules of the PDU Session. The SMF may initiate N4 PHRs management procedure to update the PHRs for the corresponding 5G LAN-VN group in the UPF.

In an example, during the PDU session establishment procedure, the AMF may send to the (R)AN the N2 PDU Session Request (N2 SM information, NAS message (PDU Session ID, N1 SM container (PDU Session Establishment Accept))). In an example, the N2 PDU Session Request, the N2 SM information, the NAS message, and/or the like may comprise the multicast address, multicast information, and/or the like of the 5GLAN group (VN group). The AMF may send the NAS message containing PDU Session ID and PDU Session Establishment Accept targeted to the UE and the N2 SM information received from the SMF within the N2 PDU Session Request to the (R)AN. The (R)AN may issue to the UE the AN specific signalling exchange with the UE that is related with the information received from SMF. For example, in case of a NG-RAN, an RRC Connection Reconfiguration may take place with the UE establishing the necessary NG-RAN resources related to the QoS Rules for the PDU Session request. The AN specific signalling exchange procedure may be employed to transmit the multicast information, multicast address and/or the like to the UE. The (R)AN may allocate (R)AN N3 tunnel Info for the PDU Session. The (R)AN may forwards the NAS message (multicast address, multicast information, the PDU Session ID, N1 SM container (PDU Session Establishment Accept)) to the UE.

In an example embodiment, upon successful establishment of the PDU session, the UPF may transmit the multicast information, multicast address, and/or the like associated with the 5GLAN, VN group, to the UE via a user plane connection. An advertising mechanism may be employed to transmit/deliver/send the multicast information of the group to the UE.

In an example embodiment, a network triggered service request procedure may be performed. The network triggered service request procedure may be employed when the network determined/needs to signal (e.g., N1 signalling to UE, Mobile-terminated SMS, User Plane connection activation for PDU Session(s) to deliver mobile terminating user data) with a UE. When the procedure is triggered by SMSF, PCF, LMF, GMLC, NEF or UDM, the SMF may be replaced by the respective NF. If the UE is in CM IDLE state or CM-CONNECTED state in 3GPP access, the network may initiate a Network Triggered Service Request procedure. If the UE is in CM-IDLE state, and asynchronous type communication is not activated, the network may send a paging request to (R)AN/UE. The paging request may trigger the UE triggered service request procedure (as depicted in FIG. 10 and FIG. 11) in the UE. If asynchronous type communication is activated, the network may store the received message and forward the message to the (R)AN and/or the UE (e.g., may synchronize the context with the (R)AN and/or the UE) when the UE enters CM-CONNECTED state. If the UE is in CM-IDLE state in non-3GPP access and if the UE is simultaneously registered over 3GPP and non-3GPP accesses in a PLMN, the network may initiate a network triggered service request procedure over 3GPP access. If the UE is in CM-IDLE state in 3GPP access and in CM-CONNECTED state in non-3GPP access, and if the UE is simultaneously registered over 3GPP and non-3GPP accesses in the same PLMN, the network may initiate a Network Triggered Service Request procedure for 3GPP access via non-3GPP access.

Figure 28:
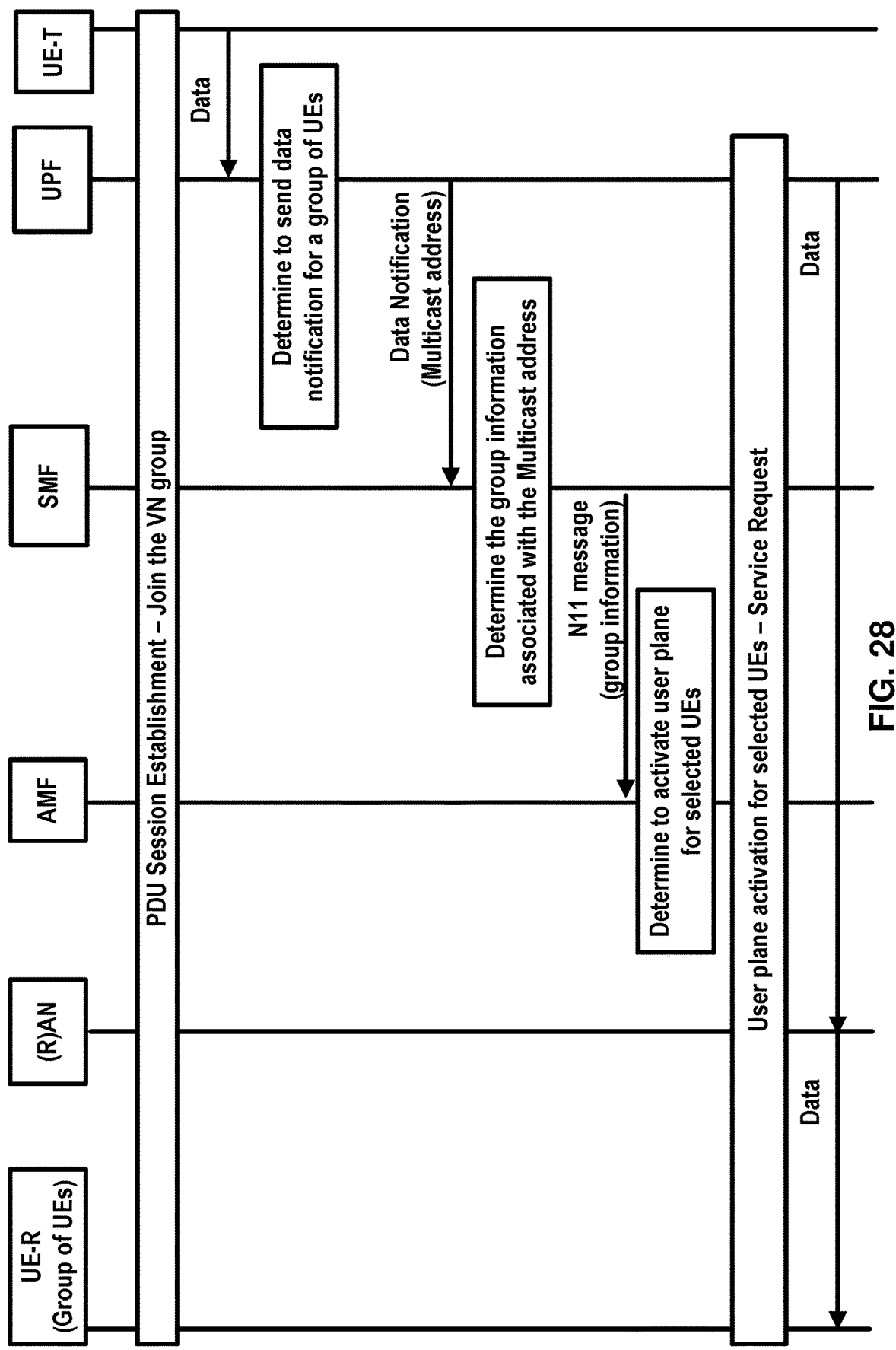
FIG. 28 is an example call flow as per an aspect of an embodiment of the present disclosure.
Figure 29:
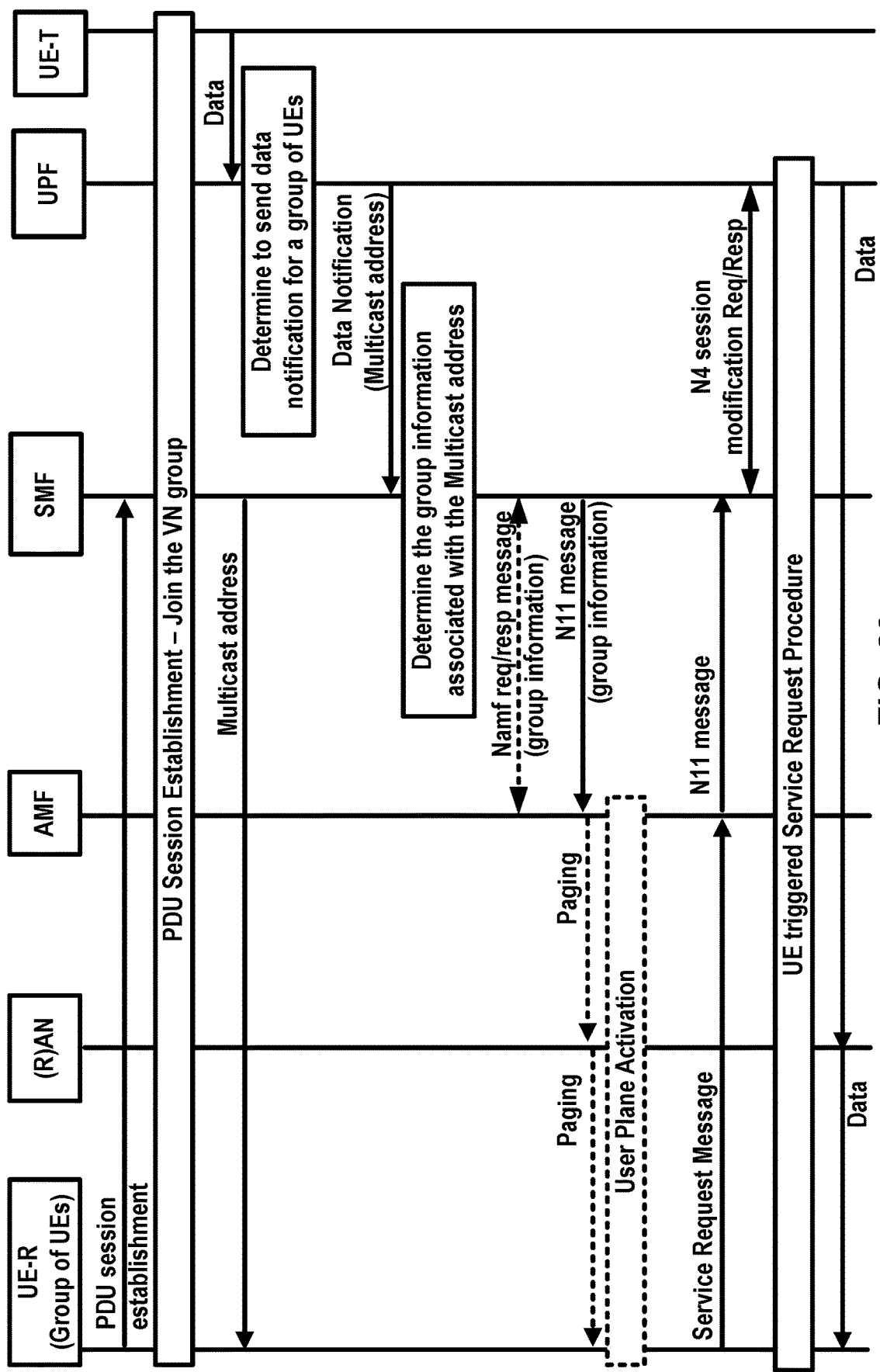
FIG. 29 is an example call flow as per an aspect of an embodiment of the present disclosure.
Figure 30:
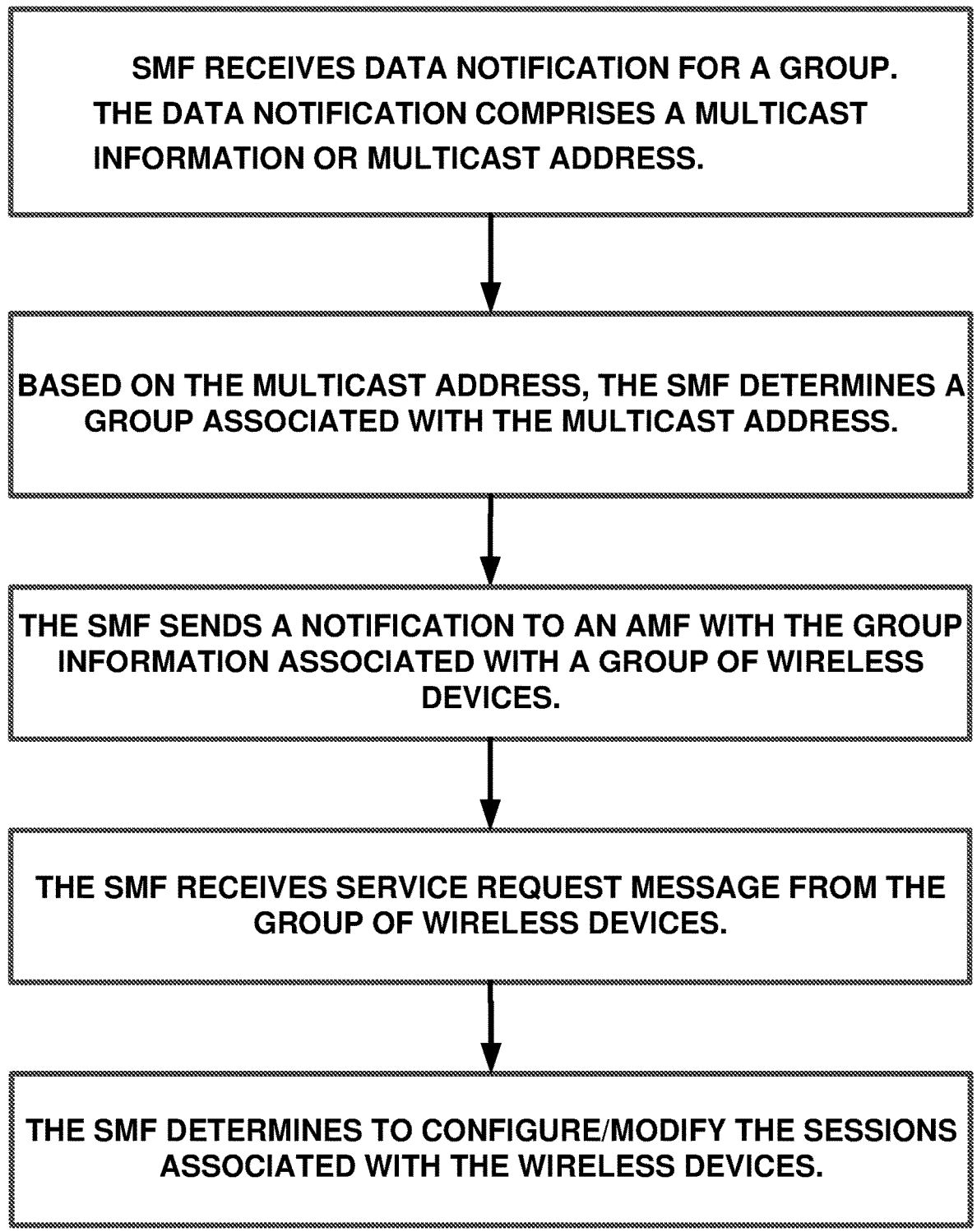
FIG. 30 is an example call flow as per an aspect of an embodiment of the present disclosure.
Figure 31:
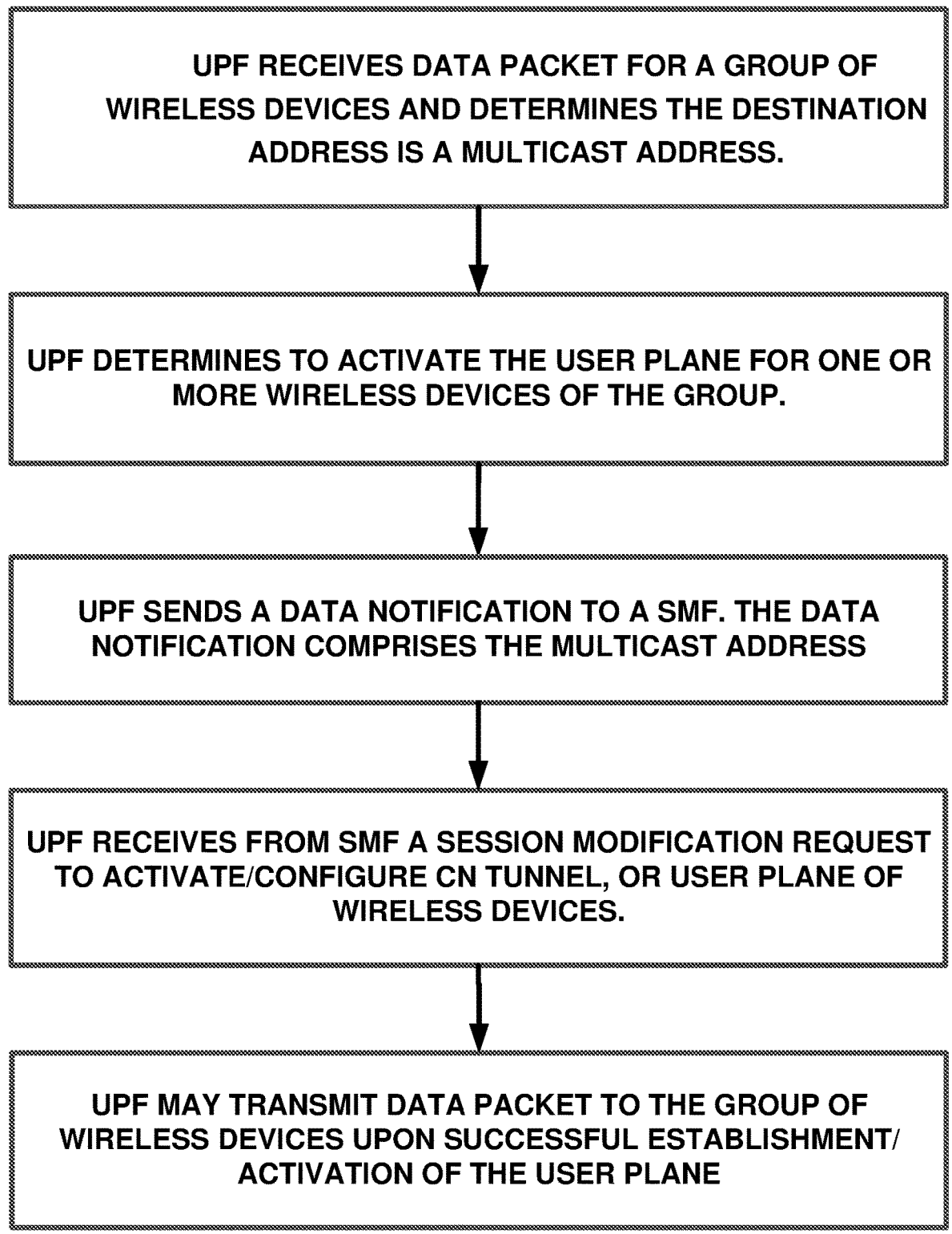
FIG. 31 is an example call flow as per an aspect of an embodiment of the present disclosure.
Figure 32:
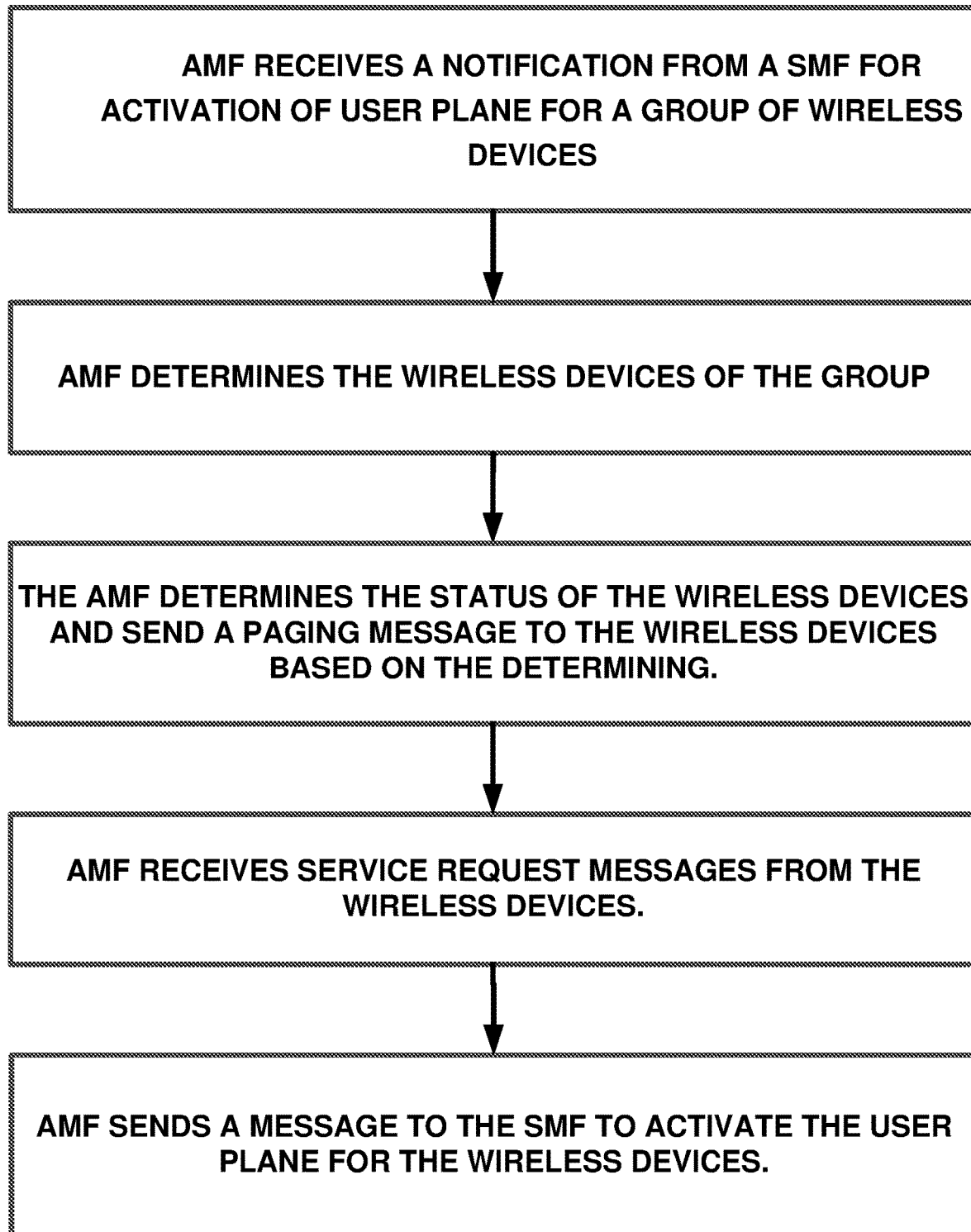
FIG. 32 is an example diagram as per an aspect of an embodiment of the present disclosure.

In an example embodiment as depicted in FIG. 28 and FIG. 29, a UPF may receive downlink data, data packets, and/or the like for a PDU Session, one or more PDU sessions associated with a multicast address, multicast information, a group, and/or the like. In an example, the UPF may receive the data packets from a transmitting wireless device that may be a member of VN group for a UE to UE communication, one to many communication, and/or the like. The UPF may determine that the data packets are for the VN group based on packet filters configured at the UPF. The UPF may determine that the data packets may be targeted to a group of receiving wireless devices. The UPF may determine that the multicast information may be employed to transmit the data packets to the group. The UPF may determine that data packets may be sent to a destination address that may be the multicast address. The UPF may determine that there is no AN Tunnel Info stored in UPF for the PDU Session, the one or more PDU sessions associated with a multicast address, multicast information, a group, and/or the like. The UPF based on the instruction from the SMF may buffer the downlink data, or forward the downlink data to the SMF. The UPF may receive the data packets from an intermediate UPF via an Nx interface. The intermediate UPF may serve the transmitting wireless device, one or more receiving wireless devices, or wireless devices associated with the group.

In an example, when the UPF determines that user plane connection for the group, or one or more UE member of the group is not activated, the UPF may send a data notification message to the SMF. In an example, the data notification message may comprise the multicast information. In an example, the data notification message may comprise the multicast address. In an example, the data notification message may comprise a PDR rule id, PDR ID, and/or the like associated with the packet detection rule for the group. In an example, the data notification message may comprise a network instance, an N4 session ID, and/or the like. In an example, the data notification message may comprise an N4 session ID associated with one of the sessions (PDU sessions) associated with the group, a UPF identifier, UPF address, and/or the like. In an example, the data notification message may comprise one or more N4 Session IDs associated with the multicast information or the group, information to identify the QoS Flow for the DL data packets, DSCP, and/or the like. In an example, upon arrival of the first downlink data packet for any QoS Flow, the UPF may send the data notification message to the SMF, if the SMF has not previously notified the UPF to not send the data notification to the SMF. If the UPF receives downlink data packets for another QoS Flow in the same PDU Session, the UPF may send another data notification message to the SMF. In an example, if paging policy differentiation feature is supported by the UPF and if the PDU Session type is IP, the UPF may include the DSCP in TOS (IPv4)/TC (IPv6) value from the IP header of the downlink data packet and the information to identify the QoS Flow for the DL data packet. In an example, the SMF may send to the UPF a data notification acknowledgment message.

In an example, the UPF may forward the (downlink) data packets towards the SMF if the SMF instructed the UPF and the SMF may buffer the data packets. If the Paging Policy Differentiation feature is supported by the SMF and if the PDU Session type is IP, the SMF may determine the paging policy indicator based on the DSCP in TOS (IPv4)/TC (IPv6) value from the IP header of the received downlink data packet and may identify the corresponding QoS Flow from the QFI of the received DL data packet.

In an example, the SMF may identify a corresponding group based on one or more elements of the data notification message.

In an example embodiment, when the SMF receives the data notification comprising the multicast information, multicast address, and/or the like, the SMF may map the multicast information or the multicast address to a group information, group identifier, and/or the like. In an example, the SMF may determine group information, group identifier associated with a group of wireless device based on the multicast information or the multicast address, and/or the like.

In an example, a UPF may be dedicated to the group. In an example, when the SMF receives data notification comprises the UPF identifier, UPF address and the N4 session ID, the SMF may identify the group and determine the group information, group identifier, and/or the like based on one or more elements of the data notification message.

In an example, the SMF may send to the AMF, an N11 message, e.g., Namf_Communication_N1N2MessageTransfer. The N11 message may comprise a SUPI, one or more PDU Session ID, N1 SM container (SM message), N2 SM information (QFI(s), QoS profile(s), CN N3 Tunnel Info, S-NSSAI), Area of validity for N2 SM information, ARP, Paging Policy Indicator, 5QI, N1N2TransferFailure Notification Target Address), or NF to AMF: Namf_Communication_N1N2MessageTransfer (SUPI, N1 message), and/or the like. In an example, the N11 message (e.g., Namf_Communication_N1N2MessageTransfer) may comprise the group information, the group identifier, identifiers of one or more wireless devices, a subset of group of wireless devices, and/or the like.

The SMF may determine whether to contact the AMF. The determining may be based on whether the SMF had previously been notified that the UE is unreachable, whether the UE is reachable only for regulatory prioritized service and the PDU Session is not for regulatory prioritized service, and/or the like.

In an example, the SMF may determine the AMF and may invokes the Namf_Communication_N1N2MessageTransfer to the AMF including the multicast information, group information, group identifier, multicast address, and/or the like. In an example, the Namf_Communication_N1N2MessageTransfer may comprise the PDU Session IDs of the one or more PDU Sessions. In an example, the SMF may determine the PDU Session ID based on the N4 Session ID.

In an example, if the SMF, while waiting for the user plane connection to be activated, receives any additional data notification message or, in the case that the SMF buffers the data packets, additional data packets for a QoS Flow associated with a higher priority (i.e. ARP priority level) than the priority indicated to the AMF in the previous Namf_Communication_N1N2MessageTransfer, or the SMF derive a different Paging Policy Indicator according to the additional Data Notification or the DSCP of the data packet, the SMF may invoke a new Namf_Communication_N1N2MessageTransfer indicating the higher priority or different Paging Policy Indicator to the AMF. In an example, if the SMF, while waiting for the user plane to be activated, receives a message from a new AMF other than the one to which the SMF invoked the Namf_Communication_N1N2MessageTransfer, the SMF may re-invoke the Namf_Communication_N1N2MessageTransfer towards the new AMF.

In an example, when supporting paging policy differentiation, the SMF may determine the paging policy indicator related to the group information, the group, the multicast information, and/or the like. The paging policy indicator may be determined based on downlink data that has been received from the UPF or triggered the data notification message, based on the DSCP. The SMF may indicate the paging policy indicator in the Namf_Communication_N1N2MessageTransfer.

In an example, the AMF may respond to the SMF. If the UE is in CM-IDLE state at the AMF, and the AMF is able to page the UE the AMF may send a Namf_Communication_N1N2MessageTransfer response to the SMF with a cause indicating attempting to reach UE which may indicate to the SMF that the N2 SM information, may be ignored by the AMF once the UE is reachable and the SMF may be asked to provide the N2 SM information again. In an example, while waiting for the UE to respond to a previous paging request, if the AMF receives an Namf_Communication_N1N2MessageTransfer Request message with the same or a lower priority than the previous message triggering the paging, or if the AMF has determined not to trigger additional paging requests for the UE based on local policy, the AMF may reject the Namf_Communication_N1N2MessageTransfer Request message. If the UE is in CM-CONNECTED state at the AMF then the AMF may send a Namf_Communication_N1N2MessageTransfer response to the SMF with a cause value indicating that N1/N2 transfer is successful. If the UE is in CM-IDLE state, and the AMF determines that the UE is not reachable for paging, the AMF may send an Namf_Communication_N1N2MessageTransfer response to the NF (e.g., SMF) from which AMF received the request message. In an example, the AMF may perform asynchronous type communication and may store the UE context based on the received message. If asynchronous type communication is invoked, the AMF may initiate communication with the UE and the (R)AN node when the UE is reachable e.g., when the UE enters CM-CONNECTED state. If the AMF has determined the UE is unreachable for the SMF (e.g., due to the UE in MICO mode or the UE is only registered over non-3GPP access and its state is CM-IDLE), then the AMF may reject the request from the SMF. The AMF may include in the reject message an indication that the SMF need not trigger the Namf_Communication_N1N2MessageTransfer Request to the AMF, if the SMF has not subscribed to the event of the UE reachability. The AMF may store an indication that the SMF has been informed that the UE is unreachable. If the UE is not in MICO mode and the AMF detects the UE is in a Non-Allowed Area unless the request from the SMF is for regulatory prioritized service, the AMF may reject the request from the SMF and may notify the SMF that the UE is reachable only for regulatory prioritized service. The AMF may store an indication that the SMF has been informed that the UE is reachable only for regulatory prioritized service. If the Registration procedure with AMF change is in progress when the old AMF receives the Namf_Communication_N1N2MessageTransfer, the old AMF may reject the request with an indication that the Namf_Communication_N1N2MessageTransfer has been temporarily rejected. Upon reception of an Namf_Communication_N1N2MessageTransfer response with an indication that its request has been temporarily rejected, the SMF may start a locally configured guard timer and wait for any message to come from an AMF. Upon reception of a message from an AMF, the SMF may re-invoke the Namf_Communication_N1N2MessageTransfer (with N2 SM info and/or N1 SM info) to the AMF from which it received the message. If the SMF determines/decides that the control plane buffering applies, the SMF may request UPF to start forwarding the downlink data PDU towards the SMF.

In an example, the SMF may respond to the UPF. The SMF may notify the UPF about the User Plane setup failure. If the SMF receives an indication from the AMF that the UE is unreachable or reachable only for regulatory prioritized service, the SMF may, based on network policies, either indicate to the UPF to stop sending Data Notifications, indicate to the UPF to stop buffering DL data and discard the buffered data, indicate to the UPF to stop sending Data Notifications and stop buffering DL data and discard the buffered data, or may refrain from sending further Namf_Communication_N1N2MessageTransfer message for DL data to the AMF while the UE is unreachable. Based on operator policies, the SMF may apply the pause of charging procedure. If the SMF receives an indication from the AMF that the Namf_Communication_N1N2MessageTransfer message requested from an SMF has been temporarily rejected, the SMF may, based on network policies, indicate to the UPF to apply temporary buffering.

According to an example embodiment, in response to receiving the N11 message from the SMF, the AMF may determine that one or more wireless devices associated with the group may in idle state CM-IDLE, require user plane activation, and/or the like. The determining, by the AMF, may be based on: the group information, multicast information, and/or the like. In an example, the AMF may determine the members of the group associated with the multicast information, PDU session IDs (associated with the VN group—receiving wireless devices) received from the SMF, or obtain the group information associated with the multicast information from a repository e.g., UDM/UDR, a group management function, a policy function, and/or the like. The AMF may determine from a list/set of UEs associated with the group or associated with the PDU session IDs received from the SMF, one or more UEs (wireless devices) that are in idle state and may send one or more paging messages to the one or more UEs in idle state. In an example, the AMF may determine to activate the user plane connection of the UEs that are associated with the group.

In an example embodiment, the AMF upon reception of the N11 message comprising the group information, may determine to activate one or more receiving wireless devices of the group. The AMF may perform paging procedure to page the receiving wireless devices of the group. The receiving wireless devices in response to the paging message may perform the UE triggered service procedure as depicted in FIG. 10 and FIG. 11. Upon completion of the service request procedure for the UEs, the UPF may forward the data packets (received from UE-T) to the group.

In an example, if a UE is in CM-CONNECTED state in the access associated with the PDU Session ID received from the SMF the UE Triggered Service Request procedure may be performed for the PDU Session (e.g., establish the radio resources and, in the case that the User Plane is to be activated, to establish the N3 tunnel) without sending a paging message to the (R)AN node and the UE. In an example, if the UE is in CM-IDLE state in 3GPP access and the PDU Session ID received from the SMF has been associated with 3GPP access and based on local policy the AMF decides to notify the UE through 3GPP access even when UE is in CM-CONNECTED state for non-3GPP access, the AMF may send a paging message to NG-RAN node(s) via 3GPP access. If the UE is simultaneously registered over 3GPP and non-3GPP accesses in the same PLMN, the UE is in CM-IDLE state in both 3GPP access and non-3GPP access, and the PDU Session ID is associated with non-3GPP access, the AMF may send a paging message with associated access "non-3GPP" to NG-RAN node(s) via 3GPP access. If the UE is in RM-REGISTERED state and CM-IDLE and reachable in 3GPP access, the AMF may send a paging message (e.g., comprising NAS ID for paging, Registration Area list, Paging DRX length, Paging Priority, access associated to the PDU Session, Enhanced Coverage Restricted information) to (R)AN node(s) belonging to the Registration Area(s) in which the UE is registered, then the NG-RAN node may page the UE, including the access associated to the PDU Session in the paging message if received from the AMF. If extended idle mode DRX was accepted by the AMF in the last registration procedure, the AMF may include extended idle mode DRX cycle length and paging time window in the paging message.

In an example, the AMF may be configured with different paging strategies based on the group information, multicast information, and/or the like. The AMF may be configured with different paging strategies based on different combinations of DNN, Paging Policy Indicator (if supported), ARP and 5QI, and/or the like. For RRC-inactive state, the paging strategies may be configured in the (R)AN for different combinations of group information, multicast information, paging policy indicator, ARP and 5QI, and/or the like. Paging Priority may be included when the AMF receives an Namf_Communication_N1N2MessageTransfer message with an ARP value associated with priority services (e.g., MPS, MCS), as configured by the operator. Paging Priority may be included when one paging priority level can be used for multiple ARP values. The mapping of ARP values to paging priority level (or levels) may be configured by operator policy in the AMF and in NG-RAN.

In an example, the (R)AN may prioritize the paging of UEs according to the paging priority. Paging priority may be based on the group information, multicast information, and/or the like. If the AMF, while waiting for a UE response to the paging request message sent without paging priority, receives an Namf_Communication_N1N2MessageTransfer message, which indicates an ARP value associated with priority services (e.g., MPS, MCS), as configured by the operator, the AMF may send another paging message with the suitable paging priority. For subsequent received Namf_Communication_N1N2MessageTransfer messages with the same or higher priority, the AMF may determine whether to send the paging message with suitable paging priority based on local policy. In an example, paging strategies may comprise: paging retransmission scheme (e.g., how frequently the paging is repeated or with what time interval), determining whether to send the Paging message to the (R)AN nodes during certain AMF high load conditions, whether to apply sub-area based paging (e.g. first page in the last known cell-id or TA and retransmission in all registered TAs), and/or the like.

In an example, the AMF and/or the (R)AN may support further paging optimizations in order to reduce the signalling load and the network resources used to successfully page a UE. The paging optimizations may comprise implementing by the AMF specific paging strategies (e.g., the N2 Paging message is sent to the (R)AN nodes that served the UE last), considering by the AMF information on recommended cells and NG-RAN nodes provided by the (R)AN at transition to CM-IDLE state, and/or the like. The AMF may take the (R)AN nodes related part of this information into account to determine the (R)AN nodes to be paged, and provides the information on recommended cells within the N2 Paging message to each of these (R)AN nodes. Paging optimizations may further comprise considering by the (R) The paging attempt count information provided by the AMF at paging. If the UE radio capability for paging information is available in the AMF, the AMF may add the UE radio capability for paging information in the N2 paging message to the (R)AN nodes. If the information on recommended cells and (R)AN nodes for paging is available in the AMF, the AMF may take that information into account to determine the (R)AN nodes for paging and, when paging a (R)AN node, the AMF may transparently convey the information on recommended cells to the (R)AN node. The AMF may include in the N2 paging message(s) the paging attempt count information. The paging attempt count information may be the same for all (R)AN nodes selected by the AMF for paging.

In an example, if the UE is simultaneously registered over 3GPP and non-3GPP accesses in the same PLMN, and the UE is in CM-CONNECTED state in 3GPP access and the PDU Session ID is associated with non-3GPP access, the AMF may send a NAS notification message containing the non-3GPP access type to the UE over 3GPP access and sets a notification timer. If the UE is simultaneously registered over 3GPP and non-3GPP accesses in the same PLMN, and the UE is in CM-CONNECTED state for non-3GPP access and in CM-IDLE for 3GPP access, and if the PDU Session ID is associated with 3GPP access, and based on local policy the AMF decides/determines to notify the UE through non-3GPP access, the AMF may send a NAS notification message containing the 3GPP access type to the UE over non-3GPP access and sets a notification timer.

In an example, the AMF may send to the SMF an Namf_Communication_N1N2Transfer Failure Notification. The AMF may supervise the paging procedure with a timer. If the AMF receives no response from the UE to the paging request message, the AMF may apply further paging according to any applicable paging strategy. The AMF may notify the SMF by sending Namf_Communications_N1N2MessageTransfer Failure Notification to the notification target address provided by the SMF, if the UE does not respond to paging, unless the AMF is aware of an ongoing MM procedure that prevents the UE from responding, e.g., the AMF receives an N14 Context Request message indicating that the UE performs Registration procedure with another AMF. When a Namf_Communication_N1N2Transfer Failure Notification is received, the SMF may inform the UPF and procedure for pause of charging at SMF may be performed.

In an example, if the UE is in CM-IDLE state in 3GPP access, upon reception of paging request for a PDU session associated to 3GPP access, the UE may initiate the UE triggered service request procedure. The AMF may invoke Nsmf_PDUSession_UpdateSMContext request to the SMF(s) associated with the PDU session identified in service request message. To support the buffered data forwarding, the SMF may instruct the UPF to establish a data forwarding tunnel between the old UPF and the new UPF or to the PSA. If the UE is in CM-IDLE state in both non-3GPP and 3GPP accesses, upon reception of paging request for a PDU Session associated to non-3GPP access, the UE may initiate the UE triggered service request procedure which may comprise the list of allowed PDU sessions that, according to UE policies and whether the S-NSSAIs of these PDU Sessions are within the Allowed NSSAI for 3GPP access, can be re-activated over the 3GPP access. If there is no PDU session that can be re-activated over the 3GPP access, the UE may include an empty List Of Allowed PDU Sessions. If the AMF receives a service request message from the UE via non-3GPP access (e.g., because the UE successfully connects to a non-3GPP access), the AMF may stop the paging procedure and may process the received service request procedure. If the AMF receives the service request message and the list of allowed PDU Sessions provided by the UE does not include the PDU Session for which the UE was paged, the AMF may notify the SMF that the UE was reachable but did not accept to re-activate the PDU session by invoking a Namf_EventExposure_Notify service.

In an example, if the UE is in CM-IDLE state in non-3GPP access and in CM-CONNECTED state in 3GPP access, upon reception of NAS Notification message over 3GPP access containing the non-3GPP Access Type, the UE may initiate the UE triggered service request procedure with the list of allowed PDU sessions that, according to UE policies and whether the S-NSSAIs of these PDU Sessions are within the Allowed NSSAI for 3GPP access, can be re-activated over the 3GPP access. If there is no PDU session that can be re-activated over the 3GPP access, the UE may include an empty list of allowed PDU sessions. When the AMF receives the service request message and the list of allowed PDU sessions provided by the UE does not include the PDU session for which the UE was notified, the AMF may notify the SMF that the UE was reachable but did not accept to re-activate the PDU Session by invoking Namf_EventExposure_Notify service. If the AMF receives a service request message from the UE via non-3GPP access (e.g., because the UE successfully connects to a non-3GPP access), the AMF may stop the notification timer and processes the received service request procedure.

In an example, if the UE is in CM-IDLE state in 3GPP access and in CM-CONNECTED state in non-3GPP access, upon reception of NAS notification message over non-3GPP access identifying the 3GPP access type, the UE may initiate the UE triggered service request procedure over the 3GPP access when 3GPP access is available. If the AMF does not receive the service request message before notification timer expires, the AMF may either page the UE through 3GPP access or notify the SMF that the UE was not able to re-activate the PDU session.

In an example, the UPF may transmit the buffered downlink data towards the UEs via (R)AN node(s) which performed the service request procedure. The network may send downlink signalling to the UE if the procedure is triggered due to request from other NFs.

In an example embodiment, a selective deactivation of UP connection for PDU sessions of a group may be employed. The procedure may be employed to deactivate UP connection (e.g., data radio bearer and/or N3 tunnel) for an established PDU Session of a UE in CM-CONNECTED state.

In an example, when an inactivity timer for a PDU session is provided by SMF during N4 Session Establishment/Modification procedure, and the UPF may detect that one or more PDU session have no data transfer for a period specified by the Inactivity Timer, it may report PDU Session Inactivity to the SMF. The report of PDU session inactivity may correspond to one or more PDU sessions of a group of wireless devices that may receive data packets based on the multicast information, multicast address, and/or the like. An N4 session report may be employed to report inactivity for a group of UEs. The N4 session report may comprise an N4 Session ID, a list of [Reporting trigger, Measurement information], and/or the like. The N4 session report may comprise the multicast information, the multicast address, and/or the like.

The SMF may determine the corresponding group based on one or more elements of the N4 session report. In an example, the SMF may determine that the UP connection of one or more PDU session(s) associated with the group may be deactivated. The determining may be based on the UPF detecting that the one or more PDU session(s) have no data transfer for a specified Inactivity period. The SMF may determine/decide to release the UPF of N3 terminating point. The SMF may initiate an N4 Session Release procedure to release the intermediate UPF of N3 terminating point. If there are multiple intermediate UPFs, this step can be performed for each UPFs to be released. The SMF may need to initiate N4 Session Modification procedure to the UPF (e.g., N9 terminating point or PDU Session Anchor) connecting to the released UPF. If the intermediate UPF(s) of N3 terminating point is released, the SMF may initiate an N4 session modification procedure towards the UPF (PDU Session Anchor or another intermediate UPF) connecting to the released UPF, indicating the need to remove AN Tunnel Info for N3 tunnel of the corresponding PDU Session. The UPF connecting to the released UPF may buffer the DL packets for the one or more PDU Session(s) or drop the DL packets for the PDU session or forward the DL packets for the one or more PDU session(s) to the SMF, based on buffering instruction provided by the SMF.

In an example, if the UPF of N3 terminating point is not released, the SMF may initiates an N4 session modification procedure indicating the need to remove AN Tunnel Info for N3 tunnel of the corresponding to the one or more PDU Session(s). In this case, the UPF may buffer the DL packets for the one or more PDU Session(s) or may drop the DL packets for the one or more PDU sessions or may forwards the DL packets for the one or more PDU sessions to the SMF, based on buffering instruction provided by the SMF. When the one or more PDU Sessions correspond to a LADN, the SMF may notify the UPF to discard downlink data for the one or more PDU Sessions and/or to not provide further Data Notification messages. The SMF may invoke the Namf_Communication_N1N2MessageTransfer service operation (PDU Session ID, N2 SM Information (N2 Resource Release Request (PDU Session ID))) to release the NG-RAN resources associated with the PDU Session. The AMF may send the N2 PDU Session Resource Release Command including N2 SM information (N2 Resource Release Request (PDU Session ID)) received from the SMF via N2 to the NG-RAN.

In an example, the Namf_Communication_N1N2MessageTransfer service operation may comprise a group information, group identifier, and/or the like as determined by the SMF. The NG-RAN may issue NG-RAN specific signalling exchange (e.g. RRC Connection Reconfiguration) with the UEs to release the NG-RAN resources related to the one or more PDU Sessions received from the AMF. When User Plane connections for the one or more PDU Sessions released, the AS layer in the UE may indicate it to the NAS layer. The NG-RAN may acknowledge the N2 PDU session resource release command to the AMF including N2 SM Resource Release Ack (User Location Information, Secondary RAT Usage Data). The AMF may invoke the Nsmf_PDUSession_UpdateSMContext service operation (N2 SM Information(Secondary RAT Usage Data)) to acknowledge the Namf service.

In an example embodiment, a session management function (SMF) may receive from a user plane function (UPF), a data notification message comprising a multicast address. The SMF may determine based on the multicast address, a group information associated with a group of one or more wireless devices. The SMF may send to an access and mobility management function (AMF), an activation request (e.g., N11 message, Namf message, and/or the like) comprising the group information. The activation request may indicate a request for activation of a user plane connection or user plane resources for at least one wireless device of the group.

In an example, when the AMF receives an N11 message from the SMF that comprises the group information, multicast information, multicast address, and/or the like, the AMF may retrieve/obtain/determine one or more wireless devices that are associated with the group based on one or more elements of the N11 message. The AMF may determine to activate the wireless devices of the group. The AMF may determine that one or more wireless devices of the group are in idle mode e.g., CM-IDLE. The AMF may send a paging message to the wireless devices in idle mode. The AMF may send a paging message to activate user plane connection for the wireless devices. The wireless devices in response to receiving the paging message may perform the UE triggered service request procedure.

The SMF may receive from the at least one wireless device, an activation request for user plane resources for a packet data unit (PDU) session of the at least one wireless device. The SMF may send to the UPF based on the activation request, a session modification request for the PDU session or N4 session of the at least one wireless device. The SMF may determine to activate an N4 session of the PDU session based on the group information. The data notification may indicate that the UPF has received data packets for the group.

In an example, the SMF may send to the UPF, a packet detection rule (PDR) comprising the multicast address. The PDR may comprise a forwarding action rule (FAR). The SMF may configure the UPF to send data packets to the group based on elements of the PDR and the FAR. In an example, the data notification message further comprises a packet detection rule identifier (PDR ID) associated with the group. In an example, the data notification message may comprise an N4 session id associated with a PDU session for the group, an identifier/address of a UPF associated with the group, and/or the like. The SMF may determine the group information based on the identifier/address of a UPF associated with the group, the N4 session ID, one or more elements of the data notification message, and/or the like. The SMF may determine the group information based on the PDR ID.

In an example embodiment, a user plane function (UPF) may receive from a wireless device, data packets for a group of wireless devices. The UPF may determine that a destination address for the data packets is a multicast address. The UPF may determine a multicast information. The UPF may determine to activate user plane connections/resources for the group of wireless devices. The UPF may send to a session management function (SMF), a data notification message comprising the multicast address, multicast information, and/or the like. The UPF may receive from the SMF, a session modification message indicating a request for activation of a user plane connection for at least one wireless device of the group. The UPF may send the data packets to the group and/or the at least one wireless device(s).

In an example, the sending the data packets may comprise sending the data packets to the group. The group may be identified by the multicast address. The sending the data packets may comprise sending the data packets to the at least one wireless device. The at least one wireless device may be identified by a subscriber permanent identifier (SUPI). The at least one wireless device may be identified by a PDU session associated with the at least one wireless device. The at least one wireless device may be identified by an N4 session associated with the at least one wireless device.

According to various embodiments, a device such as, for example, a wireless device, off-network wireless device, a base station, a core network device, a core network function, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

FIG. 33 is an flow diagram as per an aspect of an example embodiment of the present disclosure. At 3310, a user plane function (UPF) may receive, from a session management function (SMF), a session configuration message. The session configuration message may comprise a packet detection rule (PDR) for a group communication session. The PDR may comprise a multicast address mapped to a plurality of wireless devices associated with the group communication session. The PDR may comprise a forwarding rule for packets associated with the multicast address. Data packets comprising the multicast address may be received. Based on the PDR, the data packets may be sent to the plurality of wireless devices.

According to an embodiment, the plurality of wireless devices may be identified by a PDU session associated with at least one wireless device of the plurality of wireless devices. According to an embodiment, the plurality of wireless devices may be identified by an N4 session associated with at least one wireless device of the plurality of wireless devices.

According to an embodiment, the UPF may send, to the SMF, a data notification message for the data packets. The data notification message may comprise the multicast address. According to an embodiment, the data notification message may comprise an N4 session identifier of a PDU session associated with the group communication session. the data notification message may comprise an identifier of the PDR.

According to an embodiment, the multicast address may comprise a multicast IP address. The multicast address may comprise a multicast MAC address. According to an embodiment, the UPF may send, in response to a PDU session establishment request for the group communication session, multicast information to the plurality of wireless devices.

According to an embodiment, the forwarding rule may indicate whether to buffer the data packets. According to an embodiment, the forwarding rule may indicate an interface of the UPF for data packet forwarding.

In this specification, a and an and similar phrases are to be interpreted as at least one and one or more. In this specification, the term may is to be interpreted as may, for example. In other words, the term may is indicative that the phrase following the term may be an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often employed in combination to achieve the result of a functional module.

Example embodiments of the invention may be implemented using various physical and/or virtual network elements, software defined networking, virtual network functions.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using 5G AN. However, one skilled in the art will recognize that embodiments of the invention may also be implemented in a system comprising one or more legacy systems or LTE. The disclosed methods and systems may be implemented in wireless or wireline systems. The features of various embodiments presented in this invention may be combined. One or many features (method or system) of one embodiment may be implemented in other embodiments. A limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language means for or step for be interpreted under 35 U.S.C. 112. Claims that do not expressly include the phrase means for or step for are not to be interpreted under 35 U.S.C. 112.

What is claimed is:

1. A method comprising:
   sending, by a session management function (SMF) to a user plane function (UPF), a session configuration message comprising a packet detection rule (PDR) for a group communication session, wherein the PDR comprises:
      a multicast address mapped to a plurality of wireless devices associated with the group communication session; and
      a forwarding rule associated with the multicast address;
   receiving, by the SMF from the UPF, a data notification indicating multicast data arrival for the plurality of wireless devices associated with the multicast address; and
   sending, by the SMF to the UPF, a session modification request indicating downlink tunnel information for transmission of the multicast data by the UPF.

2. The method of claim 1, wherein the plurality of wireless devices is identified by a PDU session associated with at least one wireless device of the plurality of wireless devices.

3. The method of claim 1, wherein the plurality of wireless devices is identified by an N4 session associated with at least one wireless device of the plurality of wireless devices.

4. The method of claim 1, further comprising receiving, by the SMF from the UPF, a data notification message, the data notification message comprising the multicast address.

5. The method of claim 4, wherein the data notification message further comprises an N4 session identifier of a PDU session associated with the group communication session.

6. The method of claim 4, wherein the data notification message further comprises an identifier of the PDR.

7. The method of claim 1, wherein the multicast address comprises:
   a multicast IP address; or
   a multicast MAC address.

8. The method of claim 1, wherein the UPF sends multicast information to the plurality of wireless devices in response to a PDU session establishment request for the group communication session.

9. The method of claim 1, wherein the forwarding rule indicates whether to buffer data packets.

10. The method of claim 1, wherein the forwarding rule indicates an interface of the UPF for data packet forwarding.

11. A session management function (SMF) comprising:
    one or more processors;
    memory storing instructions that, when executed by the one or more processors, cause the SMF to:
       send, to a user plane function (UPF), a session configuration message comprising a packet detection rule (PDR) for a group communication session, wherein the PDR comprises:
          a multicast address mapped to a plurality of wireless devices associated with the group communication session; and
          a forwarding rule associated with the multicast address;
       receive, from the UPF, a data notification indicating multicast data arrival for the plurality of wireless devices associated with the multicast address; and
       send, to the UPF, a session modification request indicating downlink tunnel information for the multicast data.

12. The SMF of claim 11, wherein the plurality of wireless devices is identified by a PDU session associated with at least one wireless device of the plurality of wireless devices.

13. The SMF of claim 11, wherein the plurality of wireless devices is identified by an N4 session associated with at least one wireless device of the plurality of wireless devices.

14. The SMF of claim 11, wherein the instructions, when executed by the one or more processors, further cause the SMF to receive, from the UPF, a data notification message, the data notification message comprising the multicast address.

15. The SMF of claim 14, wherein the data notification message further comprises:

an N4 session identifier of a PDU session associated with the group communication session; and
an identifier of the PDR.

16. The SMF of claim 11, wherein the multicast address comprises:
a multicast IP address; or
a multicast MAC address.

17. The SMF of claim 11, wherein the UPF sends multicast information to the plurality of wireless devices in response to a PDU session establishment request for the group communication session.

18. The SMF of claim 11, wherein the forwarding rule indicates whether to buffer data packets.

19. The SMF of claim 11, wherein the forwarding rule indicates an interface of the user plane function for data packet forwarding.

20. A system comprising:
a user plane function comprising:
one or more first processors;
a first memory storing first instructions that, when executed by the one or more first processors, cause the user plane function to:
receive, from a session management function (SMF), a session configuration message comprising a packet detection rule (PDR) for a group communication session, wherein the PDR comprises:
a multicast address mapped to a plurality of wireless devices associated with the group communication session; and
a forwarding rule associated with the multicast address;
receive multicast data for the plurality of wireless devices associated with the multicast address; and
send, to the SMF and based on the receiving the multicast data, a data notification indicating multicast data arrival;
receive, from the SMF, a session modification request indicating downlink tunnel information for the multicast data;
send, based on the downlink tunnel information, the multicast data to the plurality of wireless devices; and
the session management function comprising:
one or more second processors;
a second memory storing second instructions that, when executed by the one or more second processors, cause the session management function to:
send, to the user plane function, the session configuration message comprising the packet detection rule (PDR) for the group communication session, wherein the PDR comprises:
the multicast address mapped to the plurality of wireless devices associated with the group communication session; and
the forwarding rule for packets associated with the multicast address;
receive, from the user plane function, the data notification; and
send, to the user plane function, the session modification request.

* * * * *